US008834266B2

(12) United States Patent  
Thorner

(10) Patent No.: US 8,834,266 B2
(45) Date of Patent: *Sep. 16, 2014

(54) METHODS AND APPARATUSES FOR GENERATING TACTILE FEEDBACK FOR GAMES AND SIMULATIONS

(71) Applicant: Craig Thorner, Brick, NJ (US)

(72) Inventor: Craig Thorner, Brick, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/711,585

(22) Filed: Dec. 11, 2012

(65) Prior Publication Data

US 2013/0165226 A1  Jun. 27, 2013

Related U.S. Application Data

(63) Continuation of application No. 11/929,426, filed on Oct. 30, 2007, now Pat. No. 8,328,638, which is a continuation of application No. 10/201,584, filed on Jul. 23, 2002, now abandoned, which is a continuation-in-part of application No. 08/935,762, filed on Sep. 23, 1997, now Pat. No. 6,422,941.

(51) Int. Cl.
*A63F 13/02* (2006.01)
(52) U.S. Cl.
USPC .............. 463/30; 463/36; 463/37; 463/38; 463/46; 463/47
(58) Field of Classification Search
USPC ............ 463/33–36, 40–42, 30, 46, 47
See application file for complete search history.

(56) References Cited

U.S. PATENT DOCUMENTS

| 7,755,602 B2 | 7/2010 | Tremblay |
|---|---|---|
| 7,969,416 B2 | 6/2011 | Tremblay |
| 8,368,641 B2 | 2/2013 | Tremblay |
| 2007/0030246 A1 | 2/2007 | Tremblay |

OTHER PUBLICATIONS

S-DD to Declarations of Craig Thorner, *Immersion v. Sony*, Case No. 02-0710, Sep. 2, 2005 (Decls. Previously Submitted).
Complaint and Jury Demand with Exhibits A-E, *Thorner v. Sony*, Case No. 09-cv-01894-GEB-DEA, Apr. 21, 2009.
Portions of Deposition of Riley Russell, *Immersion v. Sony*, Case No. 02-0710, Sep. 29, 2005.
Declaration of Kyle G. Freeman with Exhibit A, *Immersion v. Sony*, Case No. 02-0710, Jul. 29, 2005.
Deposition of John Romero, *Immersion v. Sony*, Case No. 02-0710, Sep. 29, 2005.
Declaration of Rollie Brown, *Immersion v. Sony*, Case No. 02-0710, Aug. 12, 2005.
Deposition of Alan Gottlieb, *Immersion v. Sony*, Case No. 02-0710, Sep. 23, 2005.
Deposition of Paul Heilman, *Immersion v. Sony*, Case No. 02-0710, Sep. 27, 2005.
Deposition of Matteo Marsala, *Immersion v. Sony*, Case No. 02-0710, Sep. 28, 2005.
Declaration of John Romero, *Immersion v. Sony*, Case No. 02-0710, Jul. 29, 2005.
Declaration of Craig Thorner, *Immersion v. Sony* with Exhibits A-L, Case No. 02-0710, Jul. 29, 2005.
Declaration of Dr. Allan Gottlieb, *Immersion v. Sony* with Exhibits A-H, Case No. 02-0710, Sep. 2, 2005.

*Primary Examiner* — Ronald Laneau
*Assistant Examiner* — Ross Williams
(74) *Attorney, Agent, or Firm* — Ryan Alley Intellectual Property Law

(57) ABSTRACT

A method and a device provide a tactile sensation. Devices include a plurality of actuators. The plurality of actuators includes first and second actuators. The first actuator is adapted to provide a first tactile sensation, and the second actuator is adapted to provide a second tactile sensation.

20 Claims, 50 Drawing Sheets

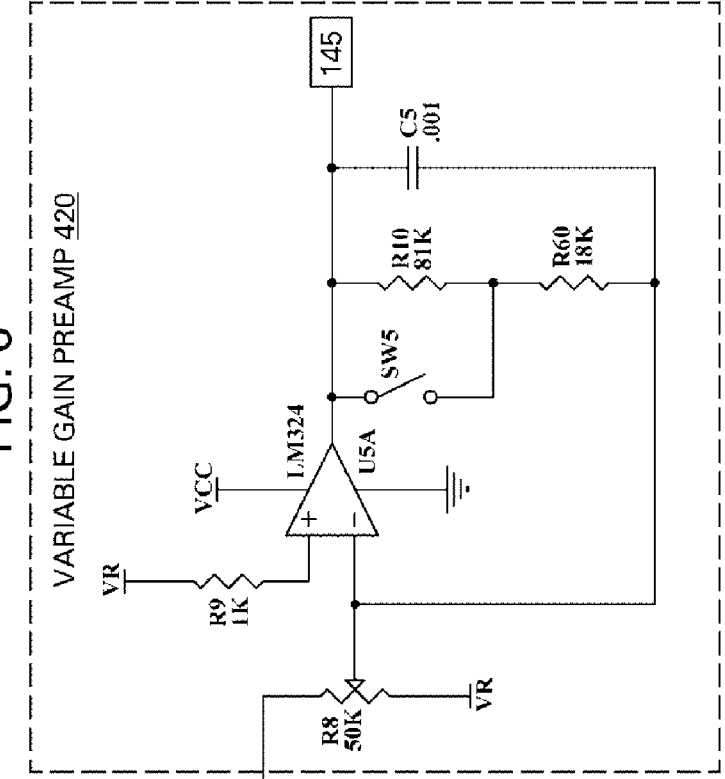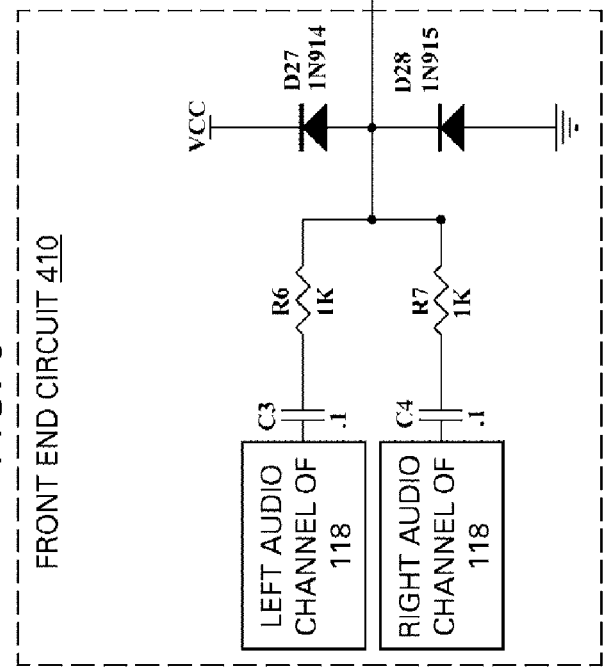

TREBLE AUDIO FILTER AND PEAK BUFFER 450

MIDRANGE AUDIO FILTER AND PEAK BUFFER 440

BASS AUDIO ANALYSIS 1120

DIGITAL AUDIO POST-PROCESSING 1065

GENERATE TACTILE SENSATION CONTROL SIGNALS 1070

DIGITAL CONTROL SIGNAL POST-PROCESSING 1060

FIG. 16   BATCH DATA TRANSMISSION HANDLER

FIG. 19  HOST INDEPENDENT AUDIO-ANALYSIS CALIBRATION ROUTINE 1900

SYSTEM ANALYSIS DISPLAY MULTIPLEXER 2000

HARWARE SWITCH MULTIPLEXER 2100

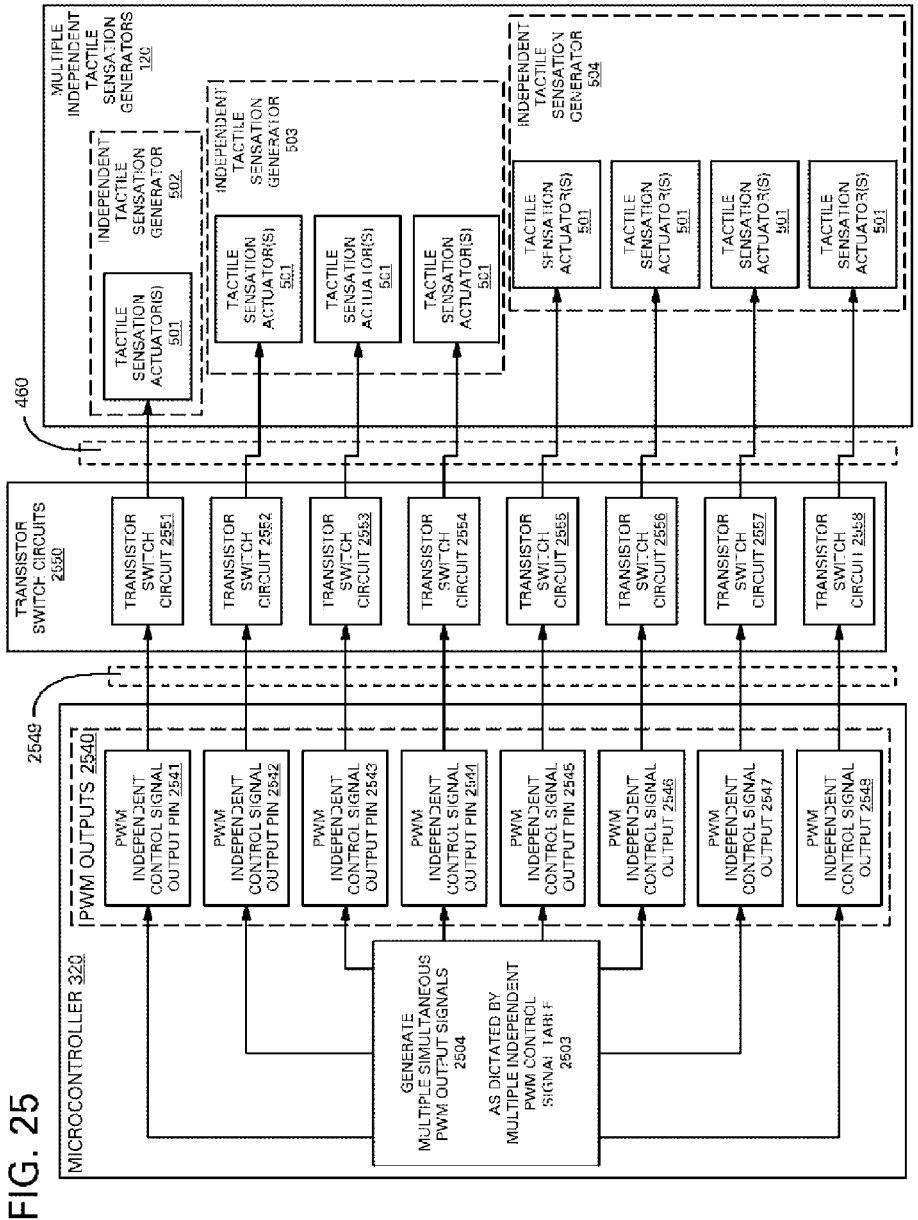

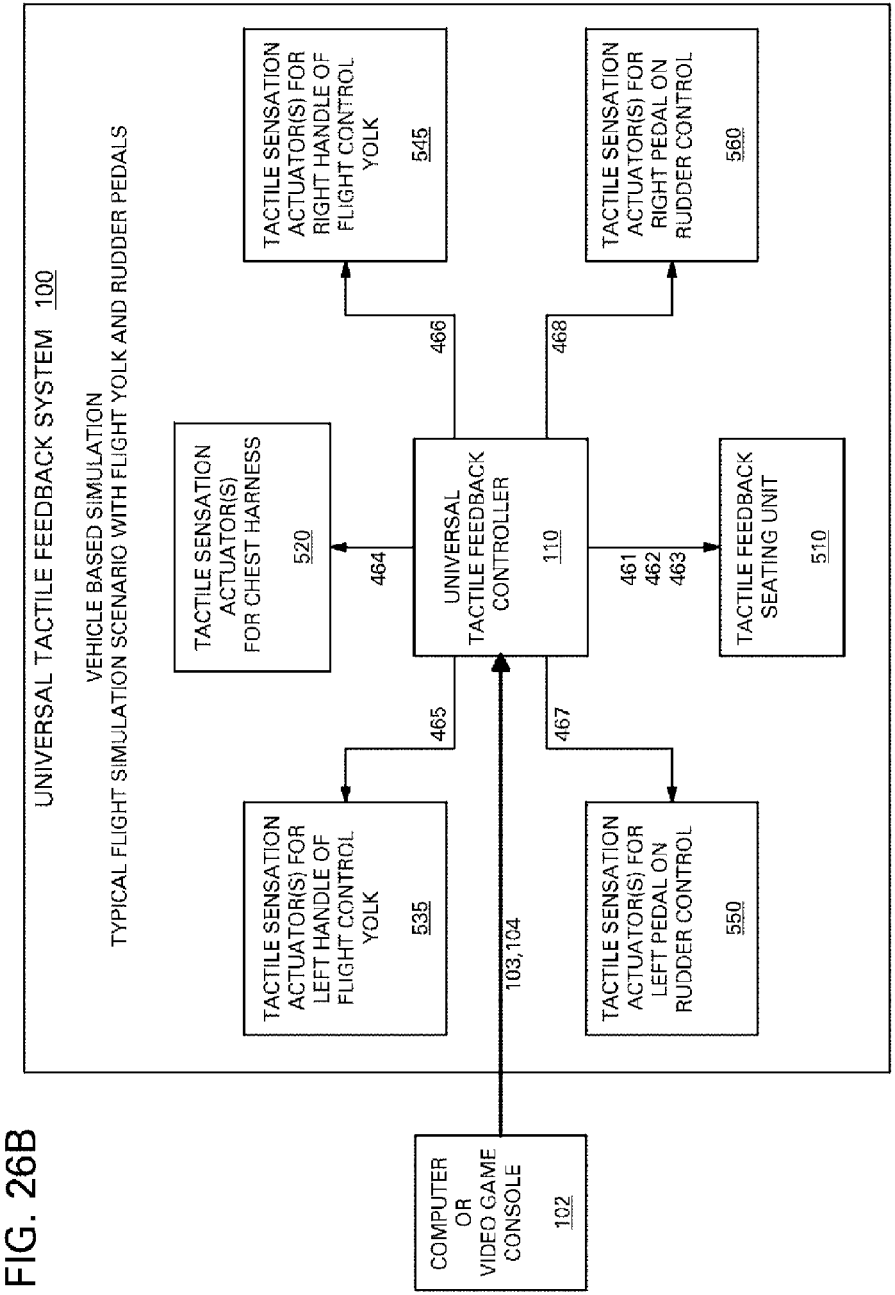

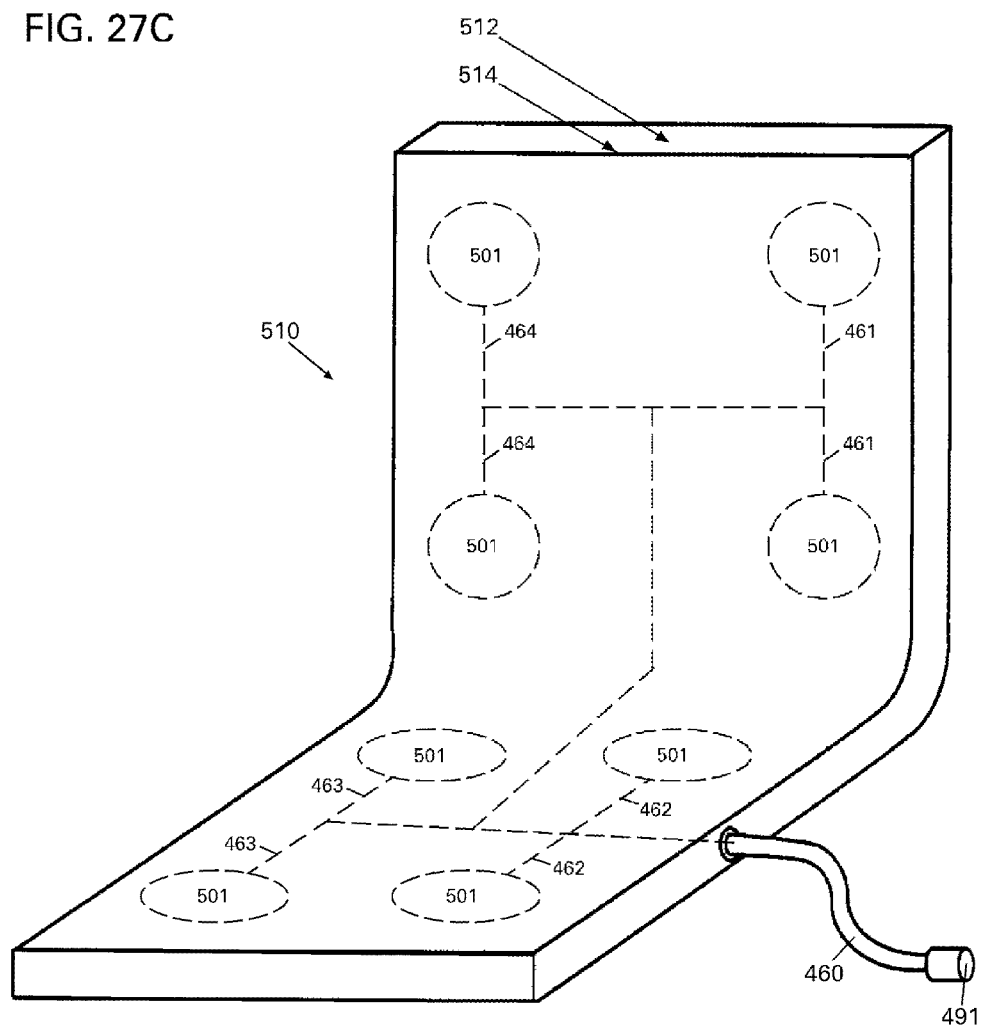

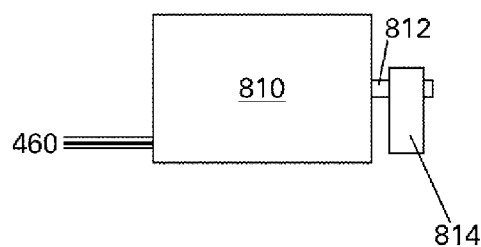
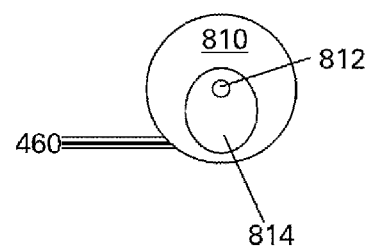
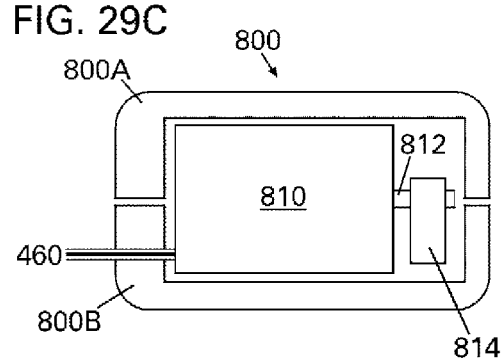
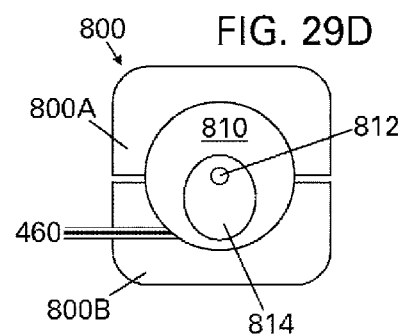
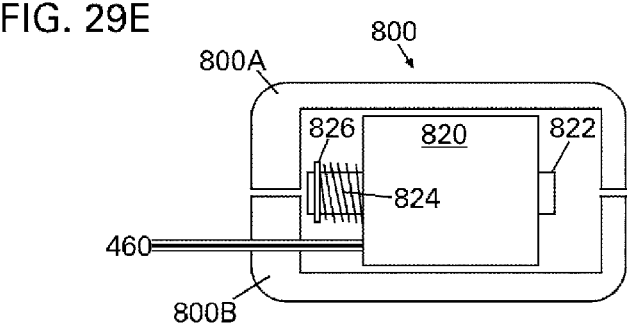

FIG. 46

QUADRANT 4
270 to 360 degrees

QUADRANT 4 SCALING FACTOR CALCULATION:

(step 1) take BANK VALUE IN DEGREES minus 270 yields a number 0 to 90
(step 2) then divide by 90 yields a number 0.000 to 1.000
(step 3) then add 1 to get the BANK SCALING FACTOR between 1.000 and 2.000

IN QUADRANT 4, APPLY BANK SCALING FACTOR
OF 1.00 to 2.000 AS FOLLOWS:

(step 4) RIGHT LEG = RIGHT LEG multiplied by BANK SCALING FACTOR
(step 5) LEFT LEG = LEFT LEG divided by BANK SCALING FACTOR

QUADRANT 1
0 to 90 degrees

QUADRANT 1 SCALING FACTOR CALCULATION:

(step 1) take BANK VALUE IN DEGREES minus 0 yields a number 0 to 90
(step 2) then divide by 90 yields a number 0.000 to 1.000
(step 3) then add 1 to get the BANK SCALING FACTOR between 1.000 and 2.000

IN QUADRANT 1, APPLY BANK SCALING FACTOR
OF 1.000 to 2.000 AS FOLLOWS:

(step 4) RIGHT LEG = RIGHT LEG divided by BANK SCALING FACTOR
(step 5) LEFT LEG = LEFT LEG multiplied by BANK SCALING FACTOR

QUADRANT 3
180 to 270 degrees

QUADRANT 3 SCALING FACTOR CALCULATION:

(step 1) take BANK VALUE IN DEGREES minus 180 yields a number 0 to 90
(step 2) then divide by 90 yields a number 0.000 to 1.000
(step 3) then add 1 to get the BANK SCALING FACTOR between 1.000 and 2.000

IN QUADRANT 3, APPLY BANK SCALING FACTOR
OF 1.000 to 2.000 AS FOLLOWS:

(step 4) RIGHT LEG = RIGHT LEG multiplied by BANK SCALING FACTOR
(step 5) LEFT LEG = LEFT LEG divided by BANK SCALING FACTOR

QUADRANT 2
90 to 180 degrees

QUADRANT 2 SCALING FACTOR CALCULATION:

(step 1) take BANK VALUE IN DEGREES minus 90 yields a number 0 to 90
(step 2) then divide by 90 yields a number 0.000 to 1.000
(step 3) then add 1 to get the BANK SCALING FACTOR between 1.000 and 2.000

IN QUADRANT 2, APPLY BANK SCALING FACTOR
OF 1.000 to 2.000 AS FOLLOWS:

(step 4) RIGHT LEG = RIGHT LEG divided by BANK SCALING FACTOR
(step 5) LEFT LEG = LEFT LEG multiplied by BANK SCALING FACTOR

METHODS AND APPARATUSES FOR GENERATING TACTILE FEEDBACK FOR GAMES AND SIMULATIONS

PRIORITY STATEMENT

This application is a continuation of, and claims priority under §120 to, U.S. patent application Ser. No. 11/929,426 (filed Oct. 30, 2007, now U.S. Pat. No. 8,328,638), which claims priority to U.S. patent application Ser. No. 10/201,584 (filed Jul. 23, 2002, now abandoned); and U.S. patent application Ser. No. 08/935,762 (filed Sep. 23, 1997, now U.S. Pat. No. 6,422,941). Each of these identified applications is incorporated herein in their entirety.

BACKGROUND

With the advent of low cost microprocessors and the explosive growth of the PC industry, electronic gaming has proliferated at a blinding rate. Games and simulations are now executed, in homes and arcades, on a vast array of available hardware platforms, where each hardware platform yields its own unique combination of complexity, and fidelity, and cost. Depending on a given hardware implementation, game players may have many different types of control input devices at their disposal that are used to interact with a game or simulation. For example, driving games and simulations may use any combination of control input devices such as steering wheels, gear shifters, and gas/brake/clutch pedal units. Flight games and simulations may use any combination of control input devices such as throttles, weapons controllers, joysticks, rudder pedals, and flight yolks. First person perspective action games may use any combination of joystick, mouse, or 3D control. In most cases, a person playing a game or simulation is sitting in a seat of some kind while interacting with the hardware control input devices.

In order for tactile sensation to be effectively implemented by a modern electronic gaming system, where there are so many inconsistencies between various hardware systems and their software applications, an entirely new approach is necessary. In order to be most effective, a gaming or simulation system configured to provide the illusion that all of the available disparate control input devices that control a given simulation are each part of a unified whole, and that they are not independent, physically disconnected devices. This is necessary to suspend the disbelief of the person who is interacting with the game or simulation system.

Due to the current and future countless implementations of computer based video game and simulation systems, and due to the continually expanding library of game and simulation applications that can be executed on such systems, a need exists in the art for a truly universal tactile feedback system that can function without regard to the specific apparatus, implementation, or application of any given system. Furthermore, a need exists in the art for a universal system that can accommodate currently existing and future control input devices, via simple and inexpensive tactile feedback actuators, that can be readily connected to or embedded within said devices, such that these disparate devices become part of a unified whole.

Additionally, a need exists in the art for a universal system that will function both with and without support by the host gaming apparatus, achieving said functionality by implementing both a reprogrammable audio analysis function, and/or a direct digital control function. Moreover, a need exists in the art for a tactile feedback seating unit, that is not based on a low frequency speaker system, such that vehicle based games and simulations can be more realistically rendered, both with and without support by the host gaming apparatus. Furthermore, a need exists in the art for a vest-based tactile sensation generator, such that both open-body games and vehicle based games can be more realistically rendered, both with and without support by the host gaming apparatus. Finally, a need exists in the art for a universal tactile feedback system, such that the complete system is versatile, inexpensive, reliable, lightweight, quiet, reconfigurable, reprogrammable, and expandable.

Accordingly, it is one of many objectives of some example embodiments to introduce a tactile feedback seating unit that can produce tactile feedback within a seat, that is not based upon a low frequency speaker system, that can function via host-independent digital audio analysis and/or host-dependent direct digital control, the digital signal not necessarily being specific to the actuators in the seat, but rather a general control signal for a distributed system, in order to represent tactile sensations occurring in real time within a computer generated game or simulation, such that the person sitting in the seat feels this representation, and the tactile feedback provided by such a system further enhances the believability of the simulation. It is an additional objective of some example embodiments to implement the tactile feedback seating unit as a self contained unit, where a plurality of tactile feedback actuators are embedded inside a semi-rigid sealed foam cushion, such that the unit is portable, lightweight and quiet, and can fit in almost any chair and function with almost any application.

The implementation of tactile feedback in computer gaming, simulation, and training systems, where "tactile feedback" refers to physical sensations that one feels while interacting with said systems, has heretofore been plagued by the fundamental limitation of poor developer support. Typically, software developers are pressed for both time and money, and they are under constant pressure to release their software into the marketplace as soon as is practicable. In this competitive field, it is difficult for any given developer to spend the time necessary to create thoughtful and artistic tactile feedback. With regard to tactile feedback, proper implementation is more of an art than a science. No right or wrong answer necessarily exists for how a particular tactile event should feel, such as driving a car on gravel or firing a fictional laser cannon in a fictional spacecraft. Therefore, much time can be spent (and from the developer's point of view, even wasted) in tweaking the subjective feel of the desired effects, ad infinitum. In the end, there is a vast difference between the quality of tactile feedback that was merely implemented into a given software application, and tactile feedback that was thoughtfully and artistically crafted to render effective results (given of course the limitations of the particular tactile feedback hardware in use). In cases where the code that renders tactile feedback is incorporated by any given developer into that developer's wares, it is difficult for that code to be upgraded at a later time once a given product is released, because developers are usually fighting the time constraints of the post-release cycle where updates to some given software are periodically released to fix bugs or add features that were left out of the original release (or are functioning with substantial deficits) due to time constraints in effect during the prerelease period. Ultimately, servicing the tactile feedback support is less than a priority to the developer, and the effectiveness of said tactile feedback suffers as a result. Furthermore, given the subjective nature of tactile feedback, its effectiveness and quality varies greatly in each title, application, and/or implementation.

With regard to the patent applications and patents for which this application is a continuation, much of the difficulty presented by lack of developer support has been overcome by AudioSense®, which is a sound analysis technology that generates tactile feedback in real time without developer support of any kind. However, AudioSense® has inherent limitations that are overcome and/or minimized by intelliVIBE®, which is the type of tactile feedback that has typically required developer support—and therefore, intelliVIBE® suffers from the very limitations described previously herein. U.S. patent application Ser. No. 08/409,327 (filed Mar. 23, 1995, now U.S. Pat. No. 5,669,818) and Ser. No. 08/309,763 (filed Sep. 21, 1994, now U.S. Pat. No. 5,684,722) are incorporated herein in their entirety by reference.

Until the innovation that is the subject matter of this patent application, software developers were relied upon to decide what events in their software required what sensations, and what the triggering mechanisms were for initiating those sensations. For example, Immersion Corporation of 801 Fox Lane, San Jose, Calif. 95131 USA (NASDAQ: IMMR) markets and licenses technologies collectively falling under the trademark name TouchSense™. In using TouchSense™, developers can utilize a toolkit known as "Immersion Studio" (as of this writing, currently in version 4.1.0). When using Immersion Studio, developers can more easily create tactile effects, but are relied on to determine the subjective artistic tactile feel of those effects, and when such effects are to be rendered. This is precisely the burden that this patent application is intended to relieve.

Therefore, a need exists in the art for a relatively quick and simple method by which any given software developer is required only to activate a simple shared data structure, which will provided real-time telemetry to an external executable, application, function, or code segment (known as an "intelliVIBE® module"), which in turn will itself generate the necessary tactile feedback control signals via general purpose algorithms that are shaped by said telemetry, thereby relieving the developer of the most substantial burdens of supporting an interface such as intelliVIBE®, and/or Immersion Corporation's TouchSense™, and/or any other proprietary methodology for generating tactile feedback. For reference, throughout this application, the terms "tactile feedback" should be understood to include and be synonymous with the terms "force feedback". In much the same way that AudioSense® audio analysis technology allows tactile feedback hardware to function with no support whatsoever from any given developer of any given software title, application, or hardware system, this telemetry based method allows intelliVIBE® (and other similar interfaces) to self-generate effective and thoughtful tactile feedback with minimal, simple, and one-time-only support by any given developer. Furthermore, due to the telemetry basis for the tactile feedback, the teachings herein can be applied to other areas, such as remotely piloted vehicles, remotely controlled vehicles, UAVs (Unmated Aerial Vehicles), spacecraft, and other types of tele-operated or tele-presense vehicles, where telemetry is available or can be provided, thereby producing effective tactile feedback for the operators or spectators of such vehicles.

SUMMARY

The present invention provides a method and corresponding apparatus for providing tactile feedback. Example embodiment tactile feedback systems may include a software application, a tactile feedback controller, and a plurality of tactile sensation generators. The innovative method herein provides that any given software application can provide simple telemetry about its current state to a shared memory data structure, and subsequently leave all the burden of producing tactile feedback to an externally operating thread that employs general purpose algorithms and graphically adjustable scaling factors and configuration options to yield effective and appropriate tactile feedback without further effort by the given software application. It is a simple one-time only operation for any given software developer to implement the telemetry support. Thusly, the tactile feedback so produced is achieved with very low burden to the software developer. Additionally, should no telemetry be provided by a given software application, the innovative method herein has the means to self-generate its own telemetry by examining the state of the host computer's control input devices (e.g., keyboard, mouse, joystick, etc.), and to use said self-generated telemetry as the basis for applying real-time directional scaling to tactile feedback simultaneously produced via real-time audio analysis. An example embodiment system can produce tactile feedback via the combination of real-time audio analysis with simultaneous directional scaling produced by real-time self-generated telemetry in combination with pre-defined general purpose algorithms. This capability is achieved at a zero burden, that is, with no effort whatsoever nor any acknowledgement of its existence from the perspective of the developers of any given software application, yet yields results that resemble very carefully and thoughtfully crafted tactile feedback.

More specifically, the tactile feedback method and apparatus is provided in an example embodiment comprised by (1) a software application (currently known as the Tactile Feedback System Control Panel or TFS Control Panel), which configures the Tactile Feedback System (TFS) and handles the intelliVIBE® modules, each of which is adapted to handle the telemetry provided by any given software title, application, or system, and provides a graphical user interface for adjusting the available tactile feedback parameters that descend from the provided telemetry, (2) a tactile feedback controller (this example embodiment is currently known as the TFS2 (Tactile Feedback System version 2.0) which incorporates cooperative AudioSense® and intelliVIBE® capabilities, and (3) a plurality of tactile sensation generators, the current example embodiment of which is a tactile feedback seat known as the TFSU (Tactile Feedback Seating Unit) and a tactile feedback vest (U.S. Pat. No. 5,565,840) known by the trademark name FLAKjaket™

Some example embodiments can provide a tactile feedback system for computer based video games and simulations. More specifically, the tactile feedback system comprises a tactile feedback controller and a plurality of tactile sensation generators.

The tactile feedback controller serves to receive and interpret signals representative of the actions of a particular video game or simulation from a computer or gaming console. The tactile feedback controller produces one or more control signals that are necessary to control one or more tactile sensation generators to effect tactile sensations that correlate to the actions of the video game. The tactile feedback controller can be operated in two different modes, e.g., a host-independent or hostdependent mode.

The host-independent mode allows the tactile feedback controller to interpret the audio signals from a video game to generate the control signals for the tactile sensation generators. Under this mode of operation, the tactile feedback controller is able to use the audio signals to properly decipher the actions of the video game, independent of any control signals from the video game. This mode allows the example embodiment tactile feedback system to operate without the direct support of the video game developer, and without regard to the specific hardware that is used to run any given computer game or simulation. Therefore, this mode is called the "host-independent" mode of operation.

The host-dependent mode allows the tactile feedback controller to receive and process digital control signals from a video game to generate control signals for the tactile sensation generators. This requires that the control signals from the video game be designed specifically for the tactile feedback system. The tactile feedback controller processes the control signals from the video game and causes the proper tactile sensations to be generated, thereby physically imitating the current actions of the video game. This mode requires specific accommodation by the host gaming hardware and software to function. Therefore, this mode is called the "host-dependent" mode of operation.

Regardless as to its mode of operation, the tactile feedback controller has the capability to process signal data and to simultaneously activate one or more tactile sensation generators to simulate the desired action. Namely, the tactile feedback controller appraises the desired action called for by the control signals from the video game and then assesses the best combination of the available tactile sensation generators to effect the tactile sensations associated with the desired action.

Furthermore, an example embodiment tactile feedback system allows for customization by the user. A set of parameters can be adjusted to allow the user to tailor how the tactile feedback controller will process the control signals from the video game, e.g., amplification, time delays, duration of sensations, and etc. In fact, an example embodiment tactile feedback system allows a user to calibrate each of these parameters to satisfy individual preferences or to account for differences in current or future computer systems. The desired setting for these parameters can be saved for each user and/or for each video game.

Finally, a set of novel tactile sensation generators and/or tactile sensation generator kits for modifying existing computer peripherals are disclosed. The tactile sensation generators include a tactile sensation seating unit, a tactile sensation chest harness, and various tactile sensation actuators that can be attached to or embedded within various control input devices and/or non-interactive surfaces in contact with the user. These tactile sensation generators are coupled to the tactile feedback controller and, in combination therewith, form an example embodiment tactile feedback system.

BRIEF DESCRIPTION OF THE DRAWINGS

Example embodiments can be readily understood by considering the following detailed description in conjunction with the accompanying drawings, in which like reference characters represent like features in example embodiments, in which:

FIG. 5 depicts a circuit diagram of the front end circuit;

FIG. 6 depicts a circuit diagram of the variable gain preamplifier;

FIG. 25 is a functional block diagram of both the multiple independent PWM control signal generation component and the PWM outputs of an example embodiment system;

FIG. 26B depicts a second of four control input device hardware suites;

FIG. 27C illustrates a tactile feedback seating unit with eight actuators;

FIG. 29A illustrates a DC motor which has an offset weight on its shaft, in a side view;

FIG. 29B illustrates a DC motor which has an offset weight on its shaft, in a front view;

FIG. 29C illustrates a DC motor in a housing, in a side view;

FIG. 29D illustrates a DC motor in a housing, in a front view;

FIG. 29E illustrates a solenoid in a housing, in a side view;

FIG. 46 depicts the actual mathematical algorithm used to generate an aircraft's roll scaling factor based upon the aircraft's current quadrant as in FIG. 45, and how to utilize said scaling factor once derived from the roll telemetry data.

DETAILED DESCRIPTION

Figure 1:
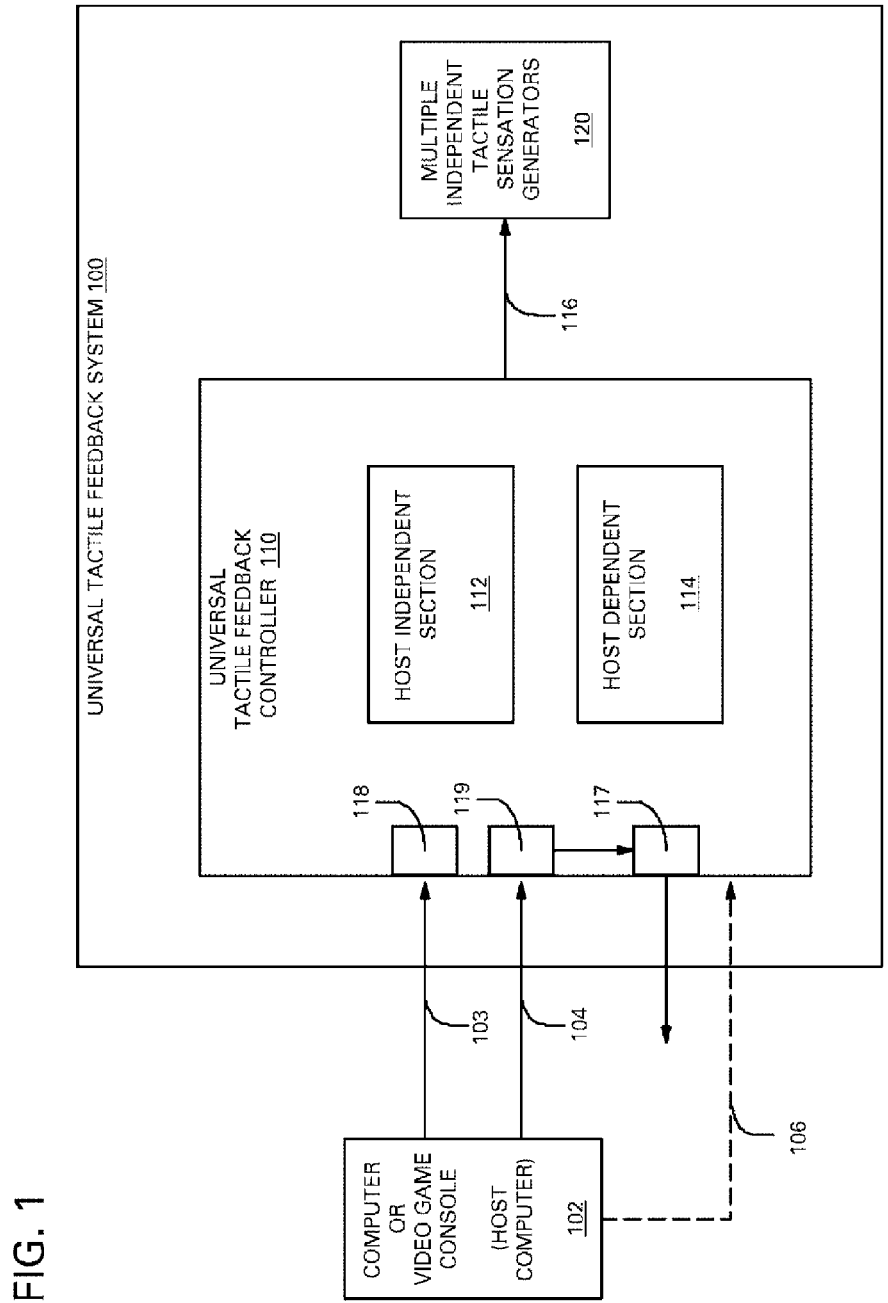
FIG. 1 depicts a block diagram of an example embodiment tactile feedback system.

This is a patent document, and general broad rules of construction should be applied when reading and understanding it. Everything described and shown in this document is an example of subject matter falling within the scope of the appended claims. Any specific structural and functional details disclosed herein are merely for purposes of describing how to make and use example embodiments. Several different embodiments not specifically disclosed herein fall within the scope of the appended claims; as such, the claims may be embodied in many alternate forms and should not be construed as limited to only example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to in a spatial or physical relationship, as being "connected," "coupled," "mated," "attached," or "fixed," to another element, it can be directly connected or coupled to the other element or intervening elements may be present. In contrast, when an element is referred to as being "directly connected" or "directly coupled" to another element, for example, there are no intervening elements present. Other words used to describe the relationship between elements should be interpreted in a like fashion (e.g., "between" versus "directly between", "adjacent" versus "directly adjacent", etc.). Similarly, a term such as "communicatively connected" includes all variations of information exchange routes between two devices, including intermediary devices, networks, etc., connected wirelessly or not.

As used herein, the singular forms "a", "an" and "the" are intended to include both the singular and plural forms, unless the language explicitly indicates otherwise with words like "only," "single," and/or "one." It will be further understood that terms like "have," "having," "comprises," "comprising," "includes," and/or "including," when used herein, specify the presence of stated features, steps, operations, elements, ideas, and/or components, but do not themselves preclude the presence or addition of one or more other features, steps, operations, elements, components, ideas, and/or groups thereof.

It should also be noted that the structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, so as to provide looping or other series of operations aside from the single operations described below. It should be presumed that any embodiment having features and functionality described below, in any workable combination, falls within the scope of example embodiments.

The present disclosure claims priority to and incorporates several previously-prosecuted US patent applications. Any disclaimers, redefinitions, statements made during prosecution, amendments, and/or other limiting actions occurring in connection with other applications are disclaimed and inapplicable to the current disclosure unless expressly repeated during the prosecution of the current application.

FIG. 1 depicts a high level block diagram of a tactile feedback system 100 interfacing with a computer system or video game console 102 (hereinafter host computer). The host computer 102 is connected to the tactile feedback system 100 by electrical connections 103 and 104 which may carry analog or digital signals respectively. In fact, signals from the host computer can be passed to the tactile feedback system using other types of communication channels 106, e.g., channels that employ infrared radiation, radio wave or sound wave. If these communication channels are used, then the corresponding receivers may be implemented on the tactile feedback system, e.g., RF receiver, IR receiver or a microphone.

Thus, it should be understood that the configuration of having the host computer 102 coupled to the tactile feedback system 100 is only illustrative and not limiting. Namely, the host computer 102 can be implemented as any device that is capable of sending the necessary control signals (e.g., a speaker broadcasting the sounds from a video game), such that the tactile feedback system is capable of operating one or more tactile sensation generators.

The tactile feedback system 100 comprises a tactile feedback controller 110 and one or more tactile sensation generators 120. In the example embodiment, the tactile feedback controller 110 is connected by power distribution cables 116 to multiple independent tactile sensation generators 120. However, example embodiments are configurable such that only control signals are forwarded to the tactile sensation generators, where each generator is able to be activated under its own power source.

The tactile feedback controller 110 comprises a host independent portion 112 and a host dependent portion 114. Namely, the host-independent portion allows the tactile feedback controller 110 to interpret the audio signals from a video game to generate the control signals for the tactile sensation generators. Under this mode of operation, the tactile feedback controller is able to use the audio signals to properly decipher the actions of the video game, independent of any control signals from the video game.

In contrast, the host-dependent portion allows the tactile feedback controller 110 to receive and process the control signals from a host computer 102 to generate the control signals for the tactile sensation generators. Namely, the control signals from the host computer 102 is designed specifically for the tactile feedback system.

In an example embodiment, electrical connection 103 represents the audio cable (stereo or mono) that carries the analog audio signal produced by the host computer 102. More specifically, the host computer 102 has one of its audio output ports, e.g., an amplified or line-level ⅛ inch stereo output connector, connected via line 103 to an input port 118 of the tactile feedback controller 110.

Similarly, electrical connection 104 represents a cable that carries the digital signal produced by the host computer 102 to an input port 119 of the tactile feedback controller 110. In this example embodiment, the digital cable 104 is a parallel cable, e.g., a DB25 to DB25 "straight through" male to male cable. However, it should be understood that example embodiments can be implemented with any type of digital cables, port configurations and various other transmission protocols (such as RS-232 DB9 serial or USB universal serial bus, PCMCIA card connector and cable, coaxial cable, and the like).

Furthermore, a pass through port 117 is coupled to port 119 to allow the signals carried on the electrical connection 104 to pass through port 119. This pass through port allows multiple tactile feedback controllers 110 to be daisy chained to support additional tactile sensation generators. This pass through port also serves to pass non-tactile sensation related signals to other peripherals, e.g., a printer.

In an example embodiment, twelve (12) pins on the electrical connection 104 are employed to communicate with the tactile feedback controller 110. Namely, an example embodiment employs a 12-bit bus for communication with a communication format having a 4-bit control word and an 8-bit data word. Throughout this disclosure, the physical locations for the 4-bit control word and 8-bit data word on line 104 are referred to as PORT A and PORT B, respectively.

It should be understood that although an example embodiment employs a 12-bit bus for communication, buses of any size can be implemented. Generally, the selection of a communication protocol and bus size is governed by the requirements of a particular application. For example, a more powerful microcontroller may have sufficient I/O pins to allow a communication format greater than 12 bits.

Furthermore, bidirectional communication can also be implemented between the host computer 102 and the tactile feedback controller 110. Such bidirectional communication would allow the tactile feedback controller 110 the ability to transmit internal status, verification and operating data to the host computer system 102.

The present 12-bit communication bus is used for two separate and distinct types of communication: sending batch data transmissions and sending host-dependent direct digital control signals. Batch data transmissions allow the host computer 102 to send configuration data in real time to the tactile feedback controller 110. These batch data transmissions may include such information as default settings, user preferences, device configurations, application specific audio analysis parameters, system analysis display modes, which are described in detail below.

The other type of communication that occurs over the 12-bit bus (comprised of 4-bit PORT A and 8-bit PORT B) is the transmission of control signals necessary to support the host-dependent mode of operation. If the software application executing on the host computer 102 supports this mode of operation, the user can place the tactile feedback controller 110 in the host-dependent mode by flipping a mode select switch. In this mode of operation, control signals necessary to operate the various tactile sensation generators are derived from the control signals received from the host computer 102.

Alternatively, the tactile feedback controller 110 can be implemented such that it is able to automatically select its optimal mode of operation, e.g., the presence or absence of a start code from the host computer or the detection of a valid signal by the host independent section 112. In an example embodiment, a mode select toggle switch is implemented to select one of two possible positions, e.g., host-independent mode or host-dependent mode. This switch can be activated at any time by a user to select the desired mode, even while the system is in use.

Figure 2:
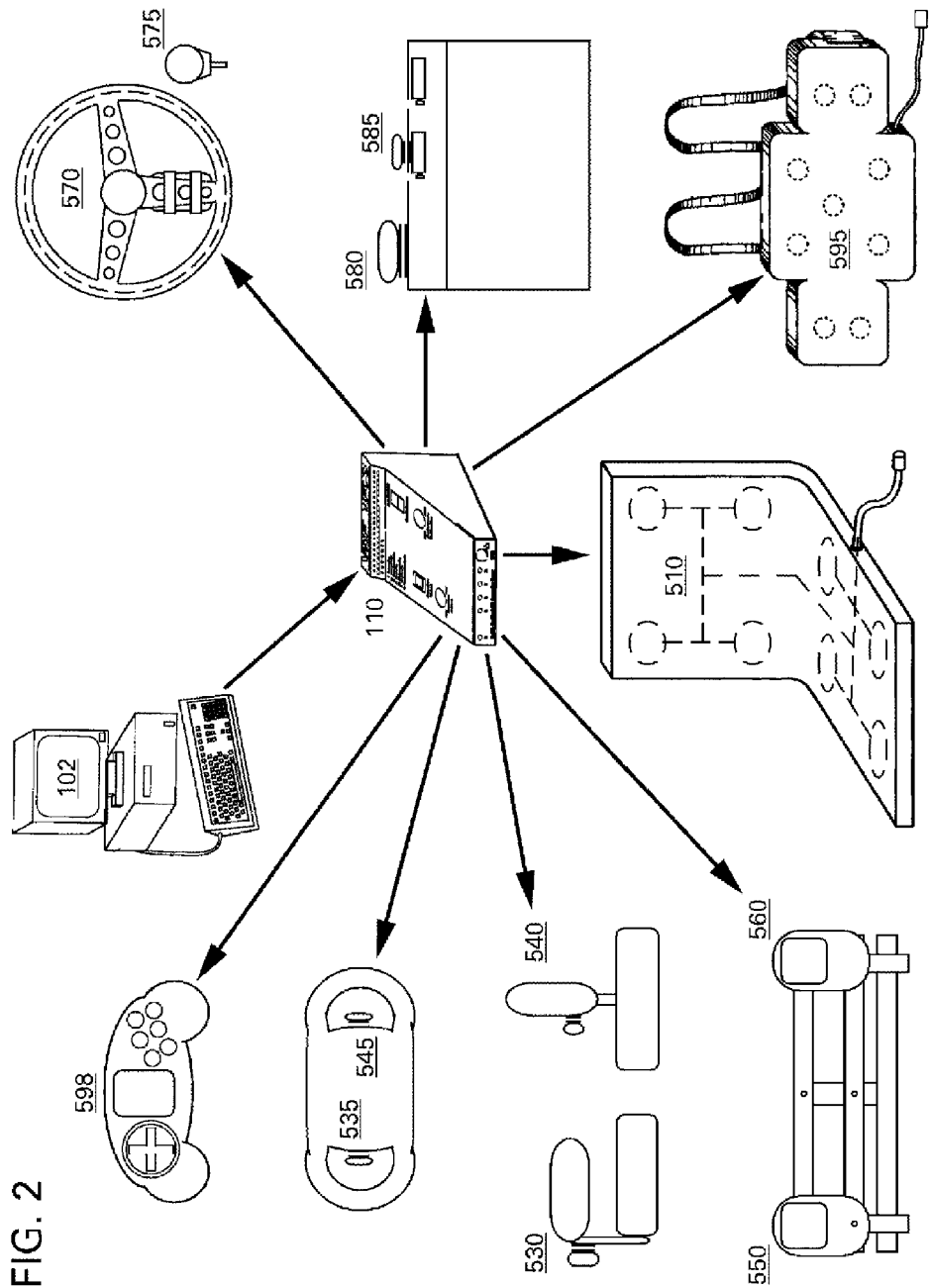
FIG. 2 depicts an illustrative configuration of an example embodiment tactile feedback system.

FIG. 2 depicts an illustrative configuration of an example embodiment tactile feedback system 100. Namely, a host computer 102 is coupled to the tactile feedback controller 110 which, in turn, is coupled to one or more tactile sensation generators 120. The tactile sensation generators may include a tactile sensation seating unit 510, a tactile sensation chest harness 520, a tactile sensation enhanced throttle 530, a tactile sensation enhanced joystick 540, a tactile sensation enhanced flight yolk with a left handle 535 and a right handle 545, tactile sensation enhanced rudder pedals with a left pedal 550 and a right pedal 560, a tactile sensation enhanced steering wheel 570, a tactile sensation enhanced shift knob 575, tactile sensation enhanced driving pedals 585 extending from a pedal base unit 580, a vest-based tactile sensation generator 595, and a tactile sensation enhanced hand-held game controller 598. Each of these tactile sensation generators is discussed later in this disclosure.

Figure 3:
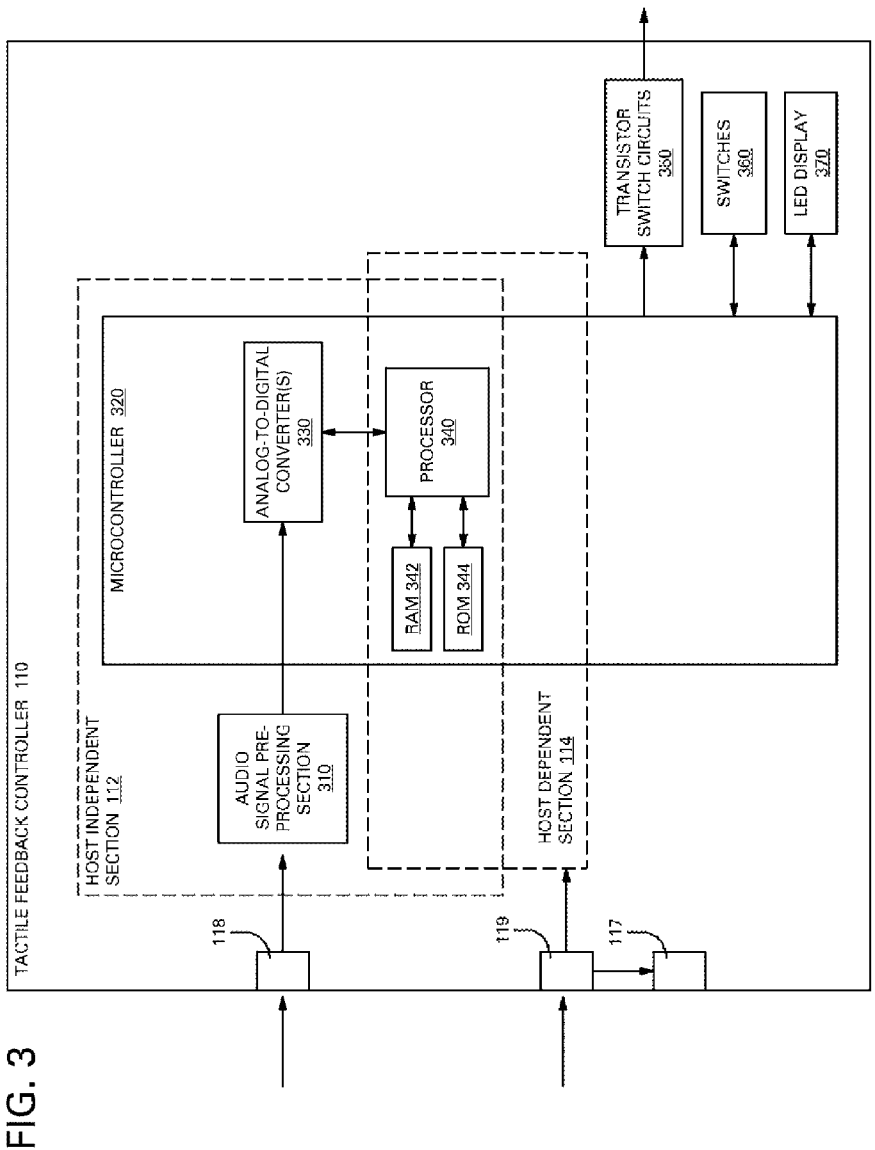
FIG. 3 depicts a block diagram of an example embodiment tactile feedback controller.

FIG. 3 depicts a block diagram of tactile feedback controller 110. More specifically, the tactile feedback controller 110 comprises a plurality of ports 117-119, an audio signal preprocessing section 310, a microcontroller 320, transistor switch circuits 350, a plurality of switches 360, and a display 370. The microcontroller 320 is illustrated as having one or more analog-to-digital converters 330, memories (random access memory 342 and read only memory 344) and a processor 340.

Referring to FIG. 3, host independent section 112 and host dependent section 114 are illustrated in dashed boxes. Since these sections share common resources, the dashed boxes serve to illustrate the components that are implemented within each section. More specifically, in the host-independent mode of operation, the audio signal is received into the tactile feedback controller via port 118. The audio signal is initially processed by an audio signal pre-processing section 310. This section serves to filter and separate the audio signal into one or more filtered audio signals that are more amenable to manipulation by the microcontroller 320.

The analog audio signals leaving pre-processing section 310 are then sampled by analog-to-digital converters (ADCs) 330 to produce digital signals that are processed and analyzed by the processor 340 to generate the control signals for the tactile sensation generators. The processing of the audio signals are generally performed under the control of the microcontroller 320 using the appropriate software application residing in the ROM 344.

In the host-dependent mode of operation, the digital signals are received into the tactile feedback controller 110 via port 119. Specifically, port 119 comprises a 4-bit input port and an 8-bit input port which are designed to receive control and data signals from the host computer 102. For simplicity, the 4-bit port is referred to as PORT A, and the 8-bit port is referred to as PORT B. If a valid 12-bit signal is received by PORT A and PORT B, then the 12-bit signal is analyzed by the processor 340 to generate the control signals for the tactile sensation generators.

However, if the combined 12-bit signal indicates a batch data transmission, then the microcontroller 320 is alerted that one or more configuration functions are being requested by a user. Various configuration functions are described later in this disclosure.

Next, control signals for the tactile sensation generator (derived from either the host-independent mode or the host-dependent mode), are converted into multiple independent pulse width modulation (PWM) control signals that are sent via TTL circuit lines to the transistor switch circuits 350, to drive one or more tactile sensation generators 120 that are connected to the tactile feedback controller 110.

Additionally, a display 370 (20 LEDs) is coupled to the microcontroller 320 for providing a visual aid to a user who is performing a configuration function or who is simply monitoring the status of the tactile feedback controller 110. More specifically, the display allows the user to see the internal activity of the tactile feedback controller 110, by activating the LEDs in a manner that illustrates the status of many different types of information. This information may include real time audio sampling data, real time audio analysis data, direct digital signal control data, and various parameters that control aspects of the tactile feedback generated by the tactile feedback controller 110. Although an example embodiment has implemented this display as a horizontal strip of 20 rectangular LEDs, this display can be implemented in many different ways or not at all.

For example, an alphanumeric liquid crystal display (LCD) having two (2) display lines of 12 characters can be used to display a parameter name on the first LCD display line, and the parameter's numerical value on the second LCD display line, followed by some unit label (e.g., seconds, percent, amplification, reduction, and the like, as necessary). Furthermore, simple messages such as "YES", "NO", and other words can also be displayed on such an alphanumeric display, when appropriate.

Finally, tactile feedback controller 110 further incorporates a plurality of switches 360, which include a mode select switch, a function select switch, and a rotary encoder switch. The functions of these switches are described in greater detail below. Although some example embodiments utilize three hardware switches, those skilled in the art will realized that any number of switches, or no switches at all, can be implemented in other example embodiments.

Figure 4:
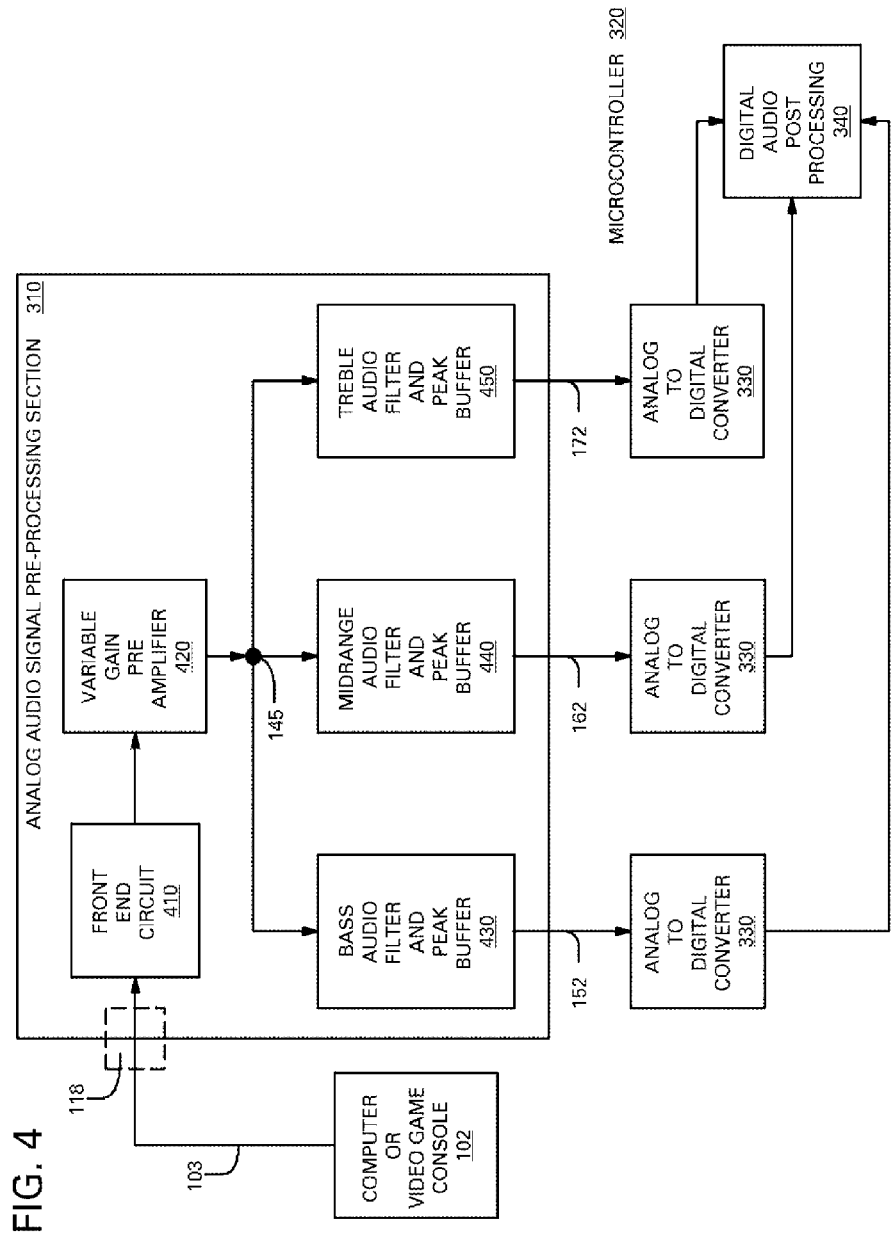
FIG. 4 depicts a block diagram of the audio signal preprocessing section.

FIG. 4 depicts a block diagram of the audio signal preprocessing section 310. The audio signal preprocessing section 310 comprises a front end circuit 410, a variable gain preamplifier 420, and three separate audio filters/buffers 430-450.

More specifically, a stereo audio signal from the host computer 102 enters the front-end circuit 410 within which the stereo audio signal is combined into a composite signal.

Namely, host computer 102 sends an audio signal via audio cable 103, comprising a left audio channel and a right audio channel. The front end circuit 410 contains a mixer for combining both channels of a stereophonic audio signal to form a composite audio signal, a high pass filter for limiting noise that is below the audio band, e.g., lower than 20 Hz, and a diode signal limiter for limiting (clipping) the amplitude of the input signal to protect the audio signal preprocessing section 310 from overly powerful audio signal inputs. A detail circuit diagram of the front end circuit 410 is depicted in FIG. 5.

The output from the front end circuit 410 then enters a variable gain preamplifier 420. The variable gain preamplifier 420 establishes the dynamic range of the analog audio signal preprocessing section 310. Namely, the tactile feedback controller 110 provides the user with a calibration knob that varies the resistance provided by a potentiometer, which, in turn, determines the gain of the variable gain preamplifier 420. For example, if the gain of the variable gain preamplifier 420 is set too high, the audio signal has a tendency to saturate and, consequently, the usefulness of the audio signal is compromised. Alternatively, if the gain of the variable gain preamplifier 420 is set too low, the audio signal does not have sufficient dynamic range to provide useful data to the host-independent section 112. A detail circuit diagram of the variable gain preamplifier 420 is depicted in FIG. 6.

FIG. 6 illustrates a switch SW5 to address audio output signal of different strengths. Namely, a host computer 102 may typically produce an audio signal in two different types of audio output signal strengths, e.g., amplified "speaker" outputs and non-amplified "line level" outputs. Most audio output cards allow a computer user to select a signal strength that is optimal for his or her audio equipment. However, older audio output cards often provided only amplified audio output signal strength on a single connector. Amplified "speaker" audio output typically provides 4 watts of amplification at 8 ohms resistance. In cases where the host computer 102 only has one audio output jack, the single output can be split via a readily available Y-type adapter that will provide two output jacks from the single pre-existing jack. Thus, the Y-adapter provides one connector for the user's speakers, and a second connector for the user to couple the host computer to the tactile feedback controller 110.

The second type of audio output signal strength is non-amplified "line level" audio output, which is commonly used by stereo equipment. This audio output signal strength is typically meant for an external stereo amplifier, such that the audio output of the host computer 102 can be broadcast from the user's home stereo system. Similarly, the line level output jack can also be split, when necessary, with a Y-type adapter.

In order to accommodate these different audio signal strengths, the tactile feedback controller 110 provides a small two position switch (depicted as SW5 in FIG. 6), that changes the gain of the variable gain preamplifier 420 as appropriate for the audio output signal strength provided by the host computer 102. This small switch is labeled SPKR and LINE, and is set by the user to match the signal provided by the audio output jack on the host computer 102.

In the SPKR position, the switch is closed, which effectively bypasses a gain inducing resistor. (R10 of FIG. 6) within the variable gain preamplifier 420, thereby reducing the range of amplification available to the variable gain preamplifier 420. In the LINE position, the switch is open, which effectively incorporates the otherwise bypassed gain inducing resistor (R10 of FIG. 6), thereby increasing the range of amplification available to the variable gain preamplifier 420. In this manner, the variable gain preamplifier 420 can maintain a useful range of amplification that is appropriate for the SPKR or LINE signal strength. Thus, without this feature, the variable gain preamplifier 420 would often be at its limits, e.g., at a low amplification setting when used with an amplified SPKR signal, and at a high amplification setting when used with a non-amplified LINE signal, but rarely in the middle of its effective range.

Figure 7:
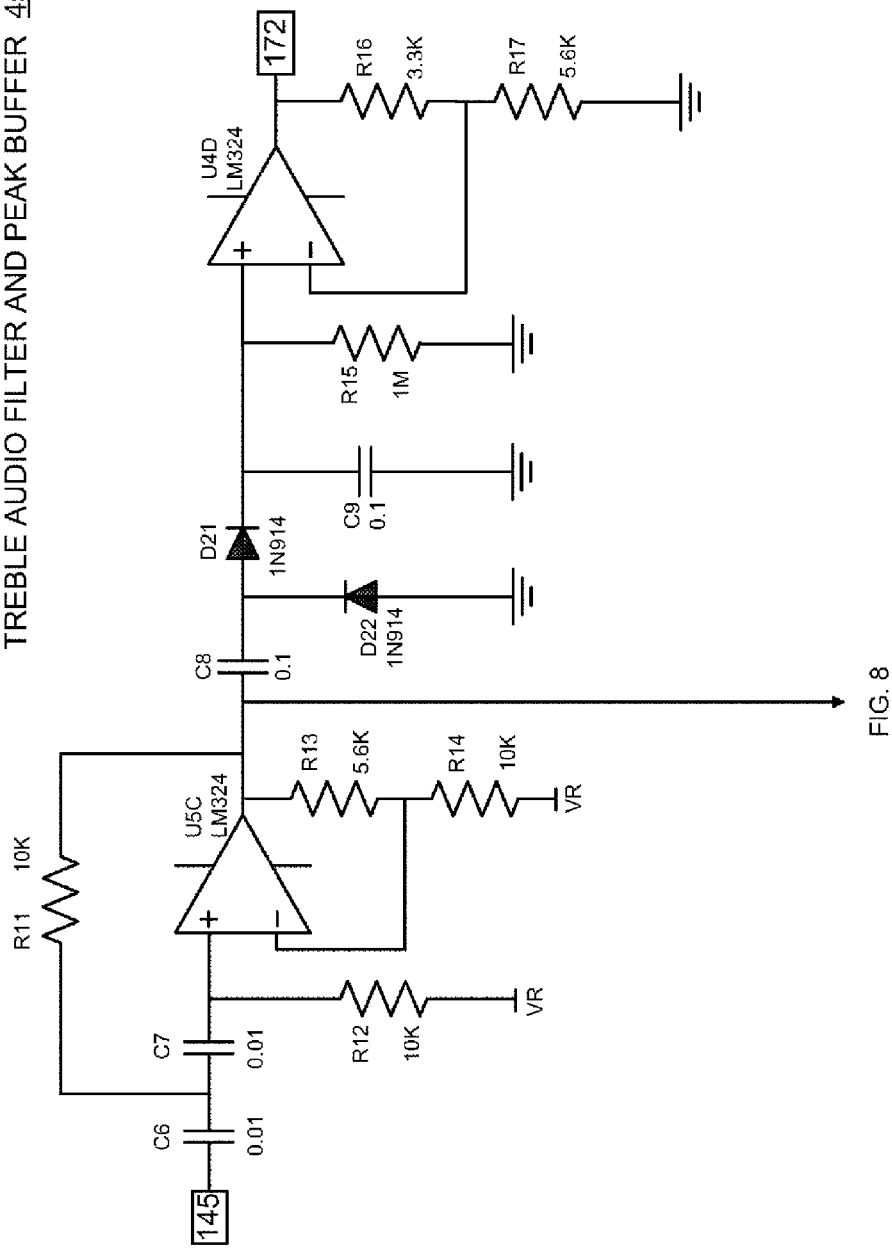
FIG. 7 depicts a circuit diagram of the treble audio filter and peak hold buffer.
Figure 8:
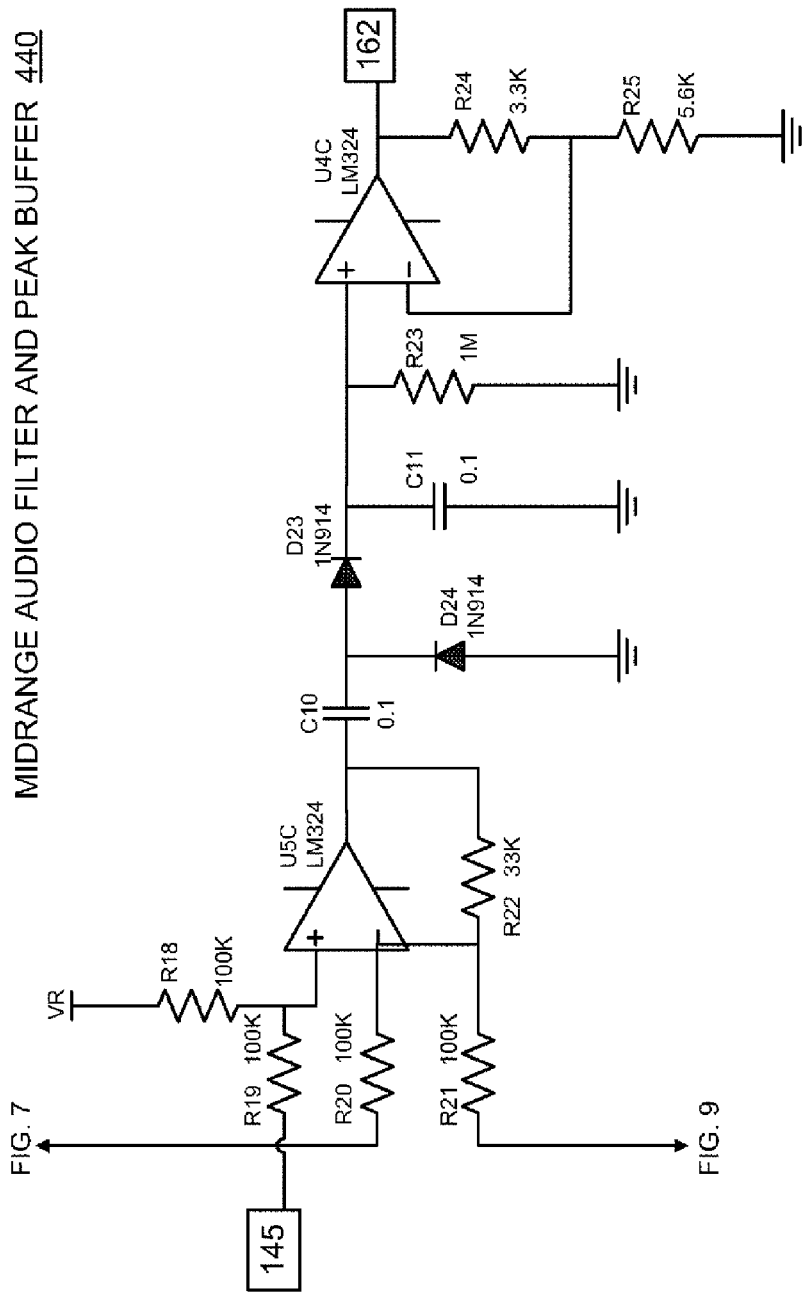
FIG. 8 depicts a circuit diagram of the midrange audio filter and peak hold buffer.
Figure 9:
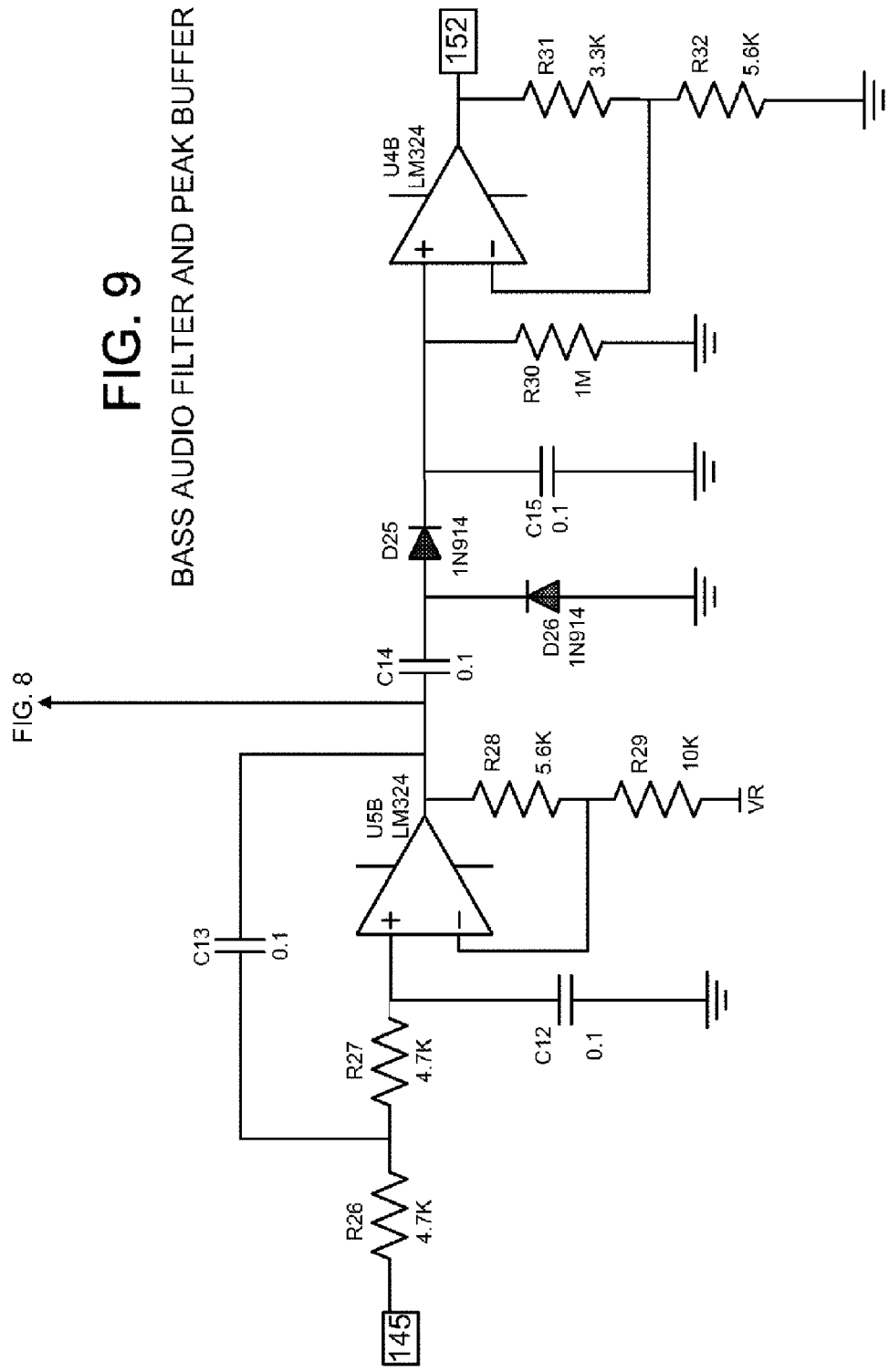
FIG. 9 depicts a circuit diagram of the bass audio filter and peak hold buffer.

Referring back to FIG. 4, the variable gain preamplifier 420 simultaneously feeds, via line 145, to three separate audio filters/peak hold buffers 430-450 that split the resulting audio signal into independent bass, midrange, and treble analog audio information streams. Namely, the original stereo audio signal exits the audio signal preprocessing section 310 as three independent audio signals, composed of an analog bass signal on line 152, an analog midrange signal on line 162, and an analog treble signal on line 172. Detail circuit diagrams of the treble audio filter and peak buffer 450, midrange audio filter and peak buffer 440, and the bass audio filter and peak buffer 430, are depicted in FIGS. 7-9 respectively.

The bass audio filter and peak hold buffer 430 uses a low pass filter that passes low frequencies, e.g., below 338 Hz. The treble audio filter and peak hold buffer 450 uses a high pass filter that passes high frequencies, e.g., above 1.6 KHz. In an example embodiment, the midrange audio filter and peak hold buffer 440 uses a difference amplifier that removes the combined signals of the bass and treble audio filters from the signal that exits the variable gain preamplifier 420. Namely, the midrange filter yields an audio signal that is essentially what remains after the bass and treble frequencies have been isolated, combined, and then subtracted from the main signal. This reduces the overlapping roll-off that occurs as the frequency responses of the high and low pass filters fade out and extend beyond their respective frequency cutoff properties. This ensures that the bass 430, midrange 440, and treble 450 filters will yield independent signals that do not suffer from too much frequency intersection.

Alternatively, a bandpass filter could be used in place of the difference amplifier, in order to specifically pass a tunable band illustratively centered at 1.2 KHz. It should be understood that example embodiments can be implemented using other filter designs.

Each of the filtered bass, midrange, and treble signals enters a peak buffer, which allows the respective filtered audio signals to stabilize by charging a capacitor in each buffer, that then discharges at a relatively rapid rate. It is important for the three analog to digital converters 330 on the microcontroller 320 to sample stable signals, but the primary purpose of these buffers is not to control the decay rate of the audio signal. The decay rate of each of the filtered audio signals is determined by its own variable decay parameter that is used by the processor 340 in processing the sampled audio signal data. Thus, upon exiting the audio filters and peak hold buffers, each filtered audio stream is fed into its own analog to digital converter (ADC) 330.

Figure 10:
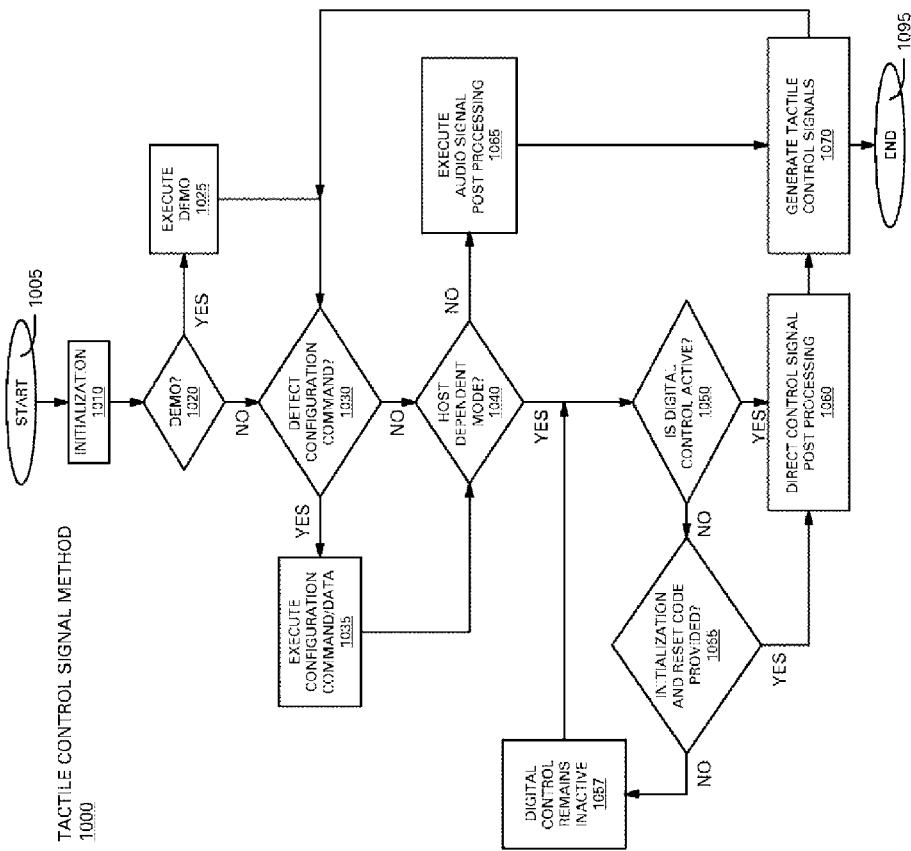
FIG. 10 depicts a flow chart of a method for generating control signals for tactile sensation generators under a host independent and host dependent modes of operation.

FIG. 10 illustrates a flow chart of a method 1000 for generating control signals for tactile sensation generators under a host independent mode or a host dependent mode of operation. Method 1000 starts in step 1005 and proceeds to step 1010, where the tactile feedback controller 110 is initialized. The initialization step executes a power on reset sequence for the microcontroller 320 which may include a RAM/ROM and I/O hardware initialization. Namely, the integrity of the RAM is verified and default information, such as stored variables and various tables, are loaded from the ROM and into the RAM of the microcontroller 320.

In step 1020, method 1000 queries whether the user wishes to invoke a special demonstration mode of the tactile feedback system. If the query is positively answered, then method 1000 proceeds to step 1025, where a demonstration is presented to the user where various tactile sensation generators (including the LED display) are activated in a predetermined sequence. If the query is negatively answered then method 1000 proceeds to step 1030, where the method 1000 queries whether configuration command is detected.

Generally, the demonstration mode is designed to be skipped, by default, unless the user performs the specific action that requests it. More specifically, an example embodiment system checks to see if a specific button, the "Function Select" switch, is depressed by the user during the power on reset sequence. In fact, the stored demonstration in the ROM can also be used as a manufacturing test to verify newly manufactured tactile feedback controllers. By implementing a predetermined sequence that is designed to exercise all features of the tactile feedback controller and to activate every available tactile sensation generators, the demonstration sequence can be used to detect malfunction. The demonstration lasts approximately 90 seconds.

Returning to step 1030, method 1000 queries whether a configuration command is detected. More specifically, configuration commands are provided in the form of a batch data transmission. Batch data transmissions carry data that allows various operational parameters of the system to be reconfigured in real time. These batch data transmissions begin with a multi-stage trigger (code), which alternatively strobes back and forth between two predetermined values. If the data present on the input ports of the tactile feedback controller 110 is identified as a trigger strobe for a batch data transmission, then method 1000 proceeds to step 1035 where the configuration commands/data within the batch data transmission are executed. Examples of functions that can be executed at this step include: 1) changing display modes of various internal variables on the LED display (See Appendix A for a list of such display modes), 2) setting various tactile sensation generator power output parameters, and 3) setting any of the audio postprocessing parameters at discussed below in step 1065. Once all the configuration commands/data are serviced by the tactile feedback controller 110, method 1000 proceeds to step 1040.

In step 1040, method 1000 queries whether host dependent mode is selected. If the query is negatively answered, then method 1000 proceeds to step 1065, where audio signal postprocessing is executed. If the query is affirmatively answered, then method 1000 proceeds to step 1050, where method 1000 determines if digital control is active.

Namely, if the tactile feedback system is set in the host-independent audio analysis mode, method 1000 executes the digital audio post processing procedure. If the tactile feedback system is not set in the host-independent audio analysis mode, then the system is in the host-dependent direct control mode by default.

In step 1050, method 1000 queries whether digital control has been previously activated since the last power on reset. Namely, method 1000 determines if a specific start code has been received at PORT A and PORT B. The specific start code indicates that a software application on the host computer 102 is attempting to send digital signals to the tactile feedback controller 110. More importantly, the initial reception of this start code would have initialized the host dependent section 114 of the tactile feedback controller 110. Such initialization places the host dependent section 114 in condition to receive control signals from the host computer. This start code is employed to keep the direct digital control mode from erroneously reacting to data on the parallel printer port bus that may not be intended for the tactile feedback controller 110. This may occur if devices other than tactile feedback controllers 110 are daisy chained along the parallel bus, such as printers, tape back up drives, portable SCSI devices, and so on. If the query is affirmatively answered, e.g., direct digital control was previously activated, method 1000 proceeds to step 1060 where direct control signal postprocessing is executed. If the query is negatively answered, method 1000 proceeds to step 1055.

In step 1055, method 1000 queries whether a start code has been received and whether initialization is presently in progress. Namely, it is possible that although host dependent section 114 is not in condition to receive control signals from the host computer at step 1050, but it may be in active condition pending the completion of initialization that is currently in progress. If the query is affirmatively answered, then step 1055 proceeds to step 1060. In other words, method 1000 checks if the previously read data from the digital input ports represents a predetermined initialization and reset code. If so, direct digital control is activated, and method 1000 proceeds to step 1060 where the digital control signal postprocessing is executed.

If the query is negatively answered, then step 1055 proceeds to step 1050 and waits for the activation of the host dependent section 114. Namely, if the appropriate initialization and reset code is not present, digital control remains inactive, and returns to step 1050.

It should be noted that step 1060 and can be called to service new data on the digital input ports by two primary means: polling the input ports for new data, or responding to hardware interrupts generated by the microcontroller 320 as determined by the capability of the selected microcontroller. This polling and/or interrupt response occurs to insure that no vital digital control signal data is missed.

In step 1070, method 1000 receives either postprocessed audio signals from step 1065 or postprocessed direct digital signals from step 1060. Using these postprocessed signals, method 1000 generates the necessary and appropriate control signals for the various tactile sensation generators 120. It should be understood that method 1000 will continue to operate until the tactile feedback controller 110 is turned off.

Figure 11:
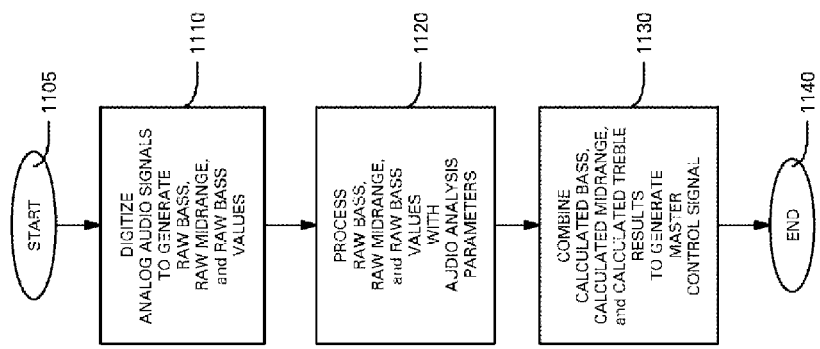
FIG. 11 is a flow chart for the method of post-processing the audio signals.

FIG. 11 is a flow chart for the method 1065 of postprocessing the audio signals, e.g., the digital audio post-processing step 1065 of FIG. 10. Method 1065 starts in step 1105 and proceeds to step 1110 where the raw audio signals on paths 152, 162 and 172 are digitized as illustrated in FIG. 4 above. Namely, analog to digital converters (ADC) 330 produces a set of three raw digital signals, BASS audio signal, MIDRANGE audio signal and TREBLE audio signal.

In step 1120, the set of three raw digital signals, BASS audio signal, MIDRANGE audio signal and TREBLE audio signal are respectively processed with a set of BASS, MIDRANGE and TREBLE audio analysis parameters (see FIG. 12), which yields a calculated BASS result, a calculated MIDRANGE result, and a calculated TREBLE result.

In step 1130, these three individual calculated audio results are combined to yield a single host-independent master control signal from audio signal postprocessing analysis, which is then placed into the internal RAM based digital control signal table (discussed below) for generating the control signals for the various tactile sensation generators. In an example embodiment, the calculated signals are combined by simply selecting a value corresponding to the highest value among the three calculated values. However, other methods can be employed, e.g., a weighted average calculation. Finally, in step 1140, method 1065 ends or returns to step 1070 of FIG. 10.

Figure 12:
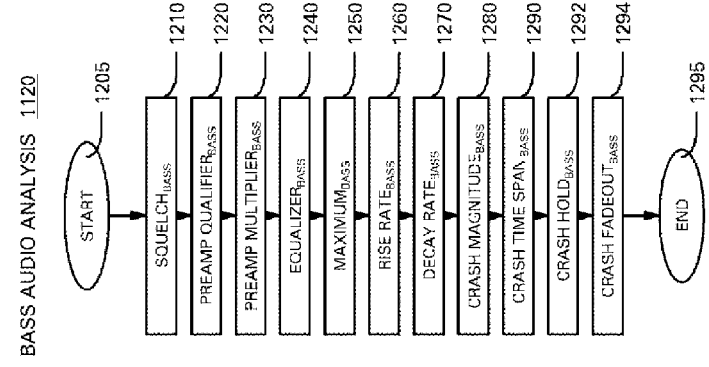
FIG. 12 is flow chart of a method for processing raw audio signals with a plurality of audio analysis parameters.

FIG. 12 is a flow chart of a method 1120 for processing the raw audio signals with a plurality of audio analysis parameters. Namely, the set of three raw digital signals, BASS audio signal, MIDRANGE audio signal and TREBLE audio signal in step 1110 of FIG. 11 are modified in accordance with a set of audio analysis parameters. Although there are a total of 33 parameters, e.g., 11 for each audio band (BASS, MIDRANGE, and TREBLE), FIG. 12 only illustrates 11 parameters since these same parameters are applied to all three raw signals, with the exception of having different audio band specific values for each raw signal. Thus, although FIG. 12 uses the audio band specific subscripts to identify the audio band of BASS, it should be understood that the subscripts imply that BASS specific default values were employed to process the raw BASS signal. Thus, although parameters with the same name have the same function, the actual value of each parameter is individually programmable for each of the three available audio bands, and only affects the audio band to which its subscript specifically applies. Namely, FIG. 12 illustrates the audio analysis parameters that are used to produce the three individual calculated audio results. It should be noted that example embodiments are not limited by the number of parameters that are employed.

The process by which these parameters are applied to each raw digital audio sample begins by copying the raw digital audio samples into three individual buffers within the RAM 342 of the microcontroller 320. These buffers are referred to as the calculated bass result, the calculated midrange result, and the calculated treble result. Each of these three buffers carries the cumulative results of the calculations that are performed as the specific parameters of each parameter set illustrated in FIG. 12 are applied to change the values within the three buffers. This essentially yields three constantly changing calculated audio result buffers while the original raw digital audio samples remain unchanged. In this fashion, the original raw digital audio samples are stored and made available for later use by other calculations within the digital audio post-processing method. Ultimately, the three buffers emerge from the three audio analysis parameter sets as the final audio band specific calculated audio results.

Returning to FIG. 12, method 1120 starts in steps 1205 and proceeds to step 1210 where the parameter Squelch is applied to the raw signal. The SQUELCH parameter provides a means of ignoring audio signals that have an amplitude that is less than some desired threshold, e.g., 2% of the maximum signal value.

To illustrate, for an 8-bit digital audio sample, the maximum value is 255 in binary. Thus, a 2% threshold equates to approximately a value of 5 (0.02×255). If a raw digital sample is less than its appropriate SQUELCH parameter, the appropriate calculated result is forced to zero. If the raw digital sample is greater than or equal to its appropriate SQUELCH parameter, the appropriate calculated result is set equal to the original raw digital sample.

In step 1220 and 1230, the next two parameters are PREAMP QUALIFIER and PREAMP MULTIPLIER, which function as a pair. These two parameters function together to provide a means of preamplifying quiet sounds by some factor, while leaving louder sounds unaffected. This is useful, for example, in helicopter simulations, where the sound of the rotor blades spinning in the background can generally impart some useful velocity or engine activity cue, but such sound is typically very quiet so as not to be overwhelming during the simulation. These two audio analysis parameters effectively allow these quiet sounds to be preamplified, such that the velocity or engine activity cue can be translated into useful tactile feedback, while not affecting louder sounds in the same manner. These two steps operate by comparing the current calculated audio result, either bass signal, midrange signal, or treble signal to its appropriate PREAMP QUALIFIER. If any given calculated audio result is higher than its appropriate PREAMP QUALIFIER, the calculated audio result is disqualified for preamplification, and its PREAMP MULTIPLIER is not implemented. However, if any given calculated audio result is lower than its appropriate PREAMP QUALIFIER, the calculated audio result is qualified for preamplification, and therefore multiplied (e.g., amplified) by its PREAMP MULTIPLIER. The result of this calculation cannot be larger than the PREAMP QUALIFIER value that qualified the multiplication in the first place. If the result of this calculation is larger than the PREAMP QUALIFIER value, the result is set equal to the PREAMP QUALIFIER value. This eliminates the possibility that quiet sounds will become over amplified.

In step 1240, the next parameter is the EQUALIZER. This step allows a current calculated audio result to be reduced or amplified, e.g., equalized, by some factor. Specifically, the equalizer provides for effectively multiplying any given calculated audio result by any number between 0.00 and 8.00, with 0.03 increments. This yields approx. 32 levels of reduction from 0% to 97% of the original value in approximately 3% steps (e.g., multiplying any given calculated audio result by any number between 0.00 and 0.97). This also yields approx. 265 levels of amplification from 103% to approximately 800% of the original value in approximately 3% steps (e.g., multiplying any given calculated audio result by any number between 1.03 and 8.00 in 0.03 steps). Although this equalizer range is very effective, example embodiments may include any default values or how this function is mathematically or otherwise implemented, and/or to the resolution and limits of such calculations.

In step 1250, the next parameter is MAXIMUM. This parameter limits the result of the EQUALIZER multiplication result to some highest allowed value, or maximum, e.g., no higher than 75% of the maximum level. The MAXIMUM parameter limits high equalization results when relatively high amplitude signals are generated by the host computer 102. The MAXIMUM parameter is useful when high equalization values are used, and affected upon high amplitude audio signals.

In step 1260, the next parameter is the RISE RATE. This parameter establishes a maximum allowable rise rate between two sequential audio samples. If the difference between a current digital audio sample and its corresponding prior sample is a positive value that exceeds the RISE RATE parameter, e.g., a value corresponding from 20 ms. to 2 seconds, then the RISE RATE parameter is added to the prior of the two sequential samples, and the result is used in place of the most recent calculated audio result, thereby effectively yielding a reduced rise rate, in accordance with the RISE RATE parameter.

In step 1270, the next parameter is the DECAY RATE. This parameter establishes a maximum allowable decay rate between two sequential audio samples. If the difference between a prior digital audio sample and its corresponding current sample is a positive value that exceeds the DECAY RATE parameter, then the DECAY RATE parameter is subtracted from the prior of the two sequential samples, and this result is used in place of the most recent calculated audio result, thereby effectively yielding a reduced decay rate, in accordance with the DECAY RATE parameter.

In steps 1280-1294, the last four parameters function together to provide a means of interpreting various audio amplitude inducing simulated events, and subsequently generating an appropriately strong tactile response. Essentially, it is very important to recognize abrupt increases in audio amplitude over some number of sequential digital audio samples. In games or simulations, any number of generally traumatic events can occur that will require a very powerful response by the tactile feedback controller 110 when it is operating in its host-independent audio analysis mode. For example, a simulated car being driven by the simulation user may bump another simulated car, or crash into a simulated object at a high velocity. Likewise, a simulated enemy missile or other simulated offensive/defensive weapon may strike a simulated vehicle being piloted by the simulation user. These types of simulated events, and others like them, are typically accompanied by an abrupt and varied rise in the amplitude of some appropriately provided sound effect (hereafter referred to as a "crash" event). However, this rise in audio amplitude may not inherently have enough power, and/or may not last long enough, to cause a powerfully appropriate tactile feedback event to match the simulated event.

In order to rectify this shortcoming, in steps 1280 and 1290 the next two parameters, CRASH MAGNITUDE and CRASH TIME SPAN, together allow the combined magnitude and time span of an abrupt rise in the digitally sampled audio to generate a "crash" response. The tactile feedback resulting from this "crash" response is then controlled by the last two parameters in step 1292 and 1294, CRASH HOLD and CRASH FADEOUT. The CRASH MAGNITUDE parameter establishes the minimum rise in sampled audio amplitude that will qualify as a "crash" event. The CRASH TIME SPAN parameter establishes the maximum time allowed for an acceptable CRASH MAGNITUDE rise to develop. For example, these parameters may look for a rise in amplitude of 30% of the maximum possible amplitude, over a 0.125 second time span. Together, these two parameters across all three audio bands provide for a very powerful and versatile method of detecting events that require strong tactile feedback responses. If a sound event generates a rise in audio amplitude that exceeds the CRASH MAGNITUDE parameter within the allowed CRASH TIME SPAN, a "crash" event is triggered. In such a case, the specific calculated audio result for the audio band in which the crash event occurred is set to its highest possible value, and is not subject to limitation by the previously explained MAXIMUM parameter. This highest possible value is maintained within the appropriate calculated audio result for the time specified in the CRASH HOLD parameter, e.g., 0.25 sec. After the CRASH HOLD time expires, the CRASH FADEOUT parameter specifies the time, e.g., 0.1 sec., that it will take to decay this highest possible output down to zero. This step allows "crash" tactile feedback responses to range from hard hitting, instantly decaying jolts, to instantly peaking and slowly decaying waves. The decay in the "crash" event is preempted by new data if subsequent audio samples generate a new rise in audio amplitude. In this manner, strong tactile feedback responses can be shaped as desired, and will be divorced entirely from the inherent strength and duration of the original "crash" sound event.

Once all three calculated audio results are processed with all of their respective parameters, method 1120 ends in step 1295 or returns to step 1130 of FIG. 11, where the three individual values are combined to yield a host-independent master control signal from audio analysis. In turn, this audio-derived control signal is then placed into the device 0 "master device" entry in the internal RAM based digital control signal table for power distribution as discussed below. It should be noted that the signal residing within the "master device" entry in the internal RAM is regarded as the master control signal, regardless as to how this signal was generated. Namely, this signal can be generated by both the host mode or the host dependent mode. Thus, a signal extracted from this "master device" entry (device 0) shall be referred to as the master control signal.

Figure 13:
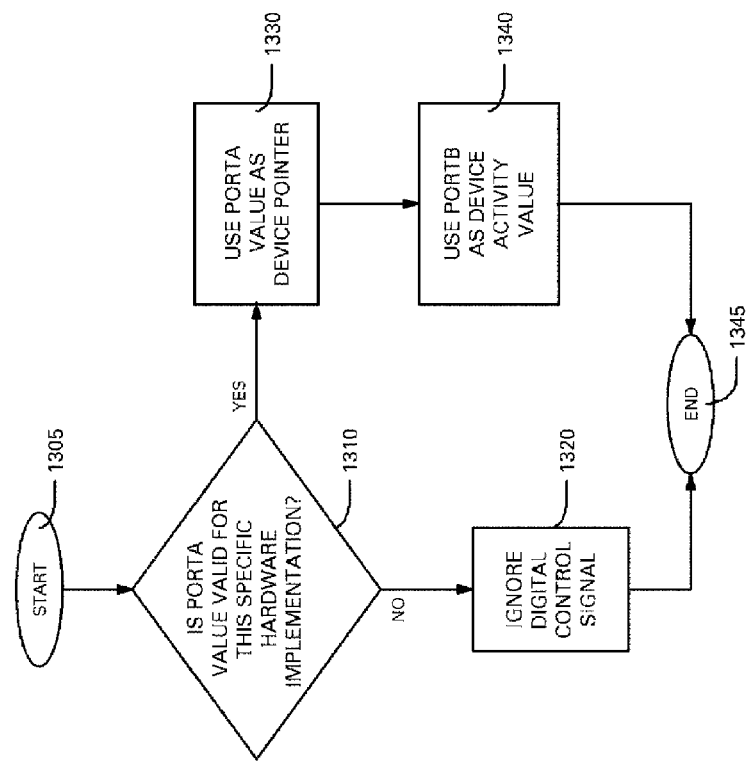
FIG. 13 is a flow chart of a method of post-processing the direct control signal.

FIG. 13 is a flow chart of a method 1060 for direct control signal postprocessing. Namely, it is a flow chart that illustrates the processing step of 1060 in FIG. 10. Method 1060 processes digital control signal data generated by the host computer 102 that is received from PORT A and PORT B in real time. This digital control signal data can be implemented in numerous ways, with each approach carrying different types of information within the transmitted data. For example, the digital control signal may be a simple, single code, that causes a course of events to occur within the microcontroller 320. The digital control signal can be a set of values, which may include some tactile feedback effect identification number, and some parameters to define the effect, such as intensity, duration, step value, the included actuators, and so on. The only limitation on the implementation of any given communications protocol content is that the host computer 102 and the tactile feedback controller 110 may be in agreement as to the particular syntax of the implemented communications protocol. Namely, the structure of the digital control signal that is generated by the host computer 102 may be intelligible to the tactile feedback controller 110. This is accomplished by programming the microcontroller 320 inside the tactile feedback controller 110 with codes that are stored in its ROM 344, that are compatible with some predetermined communications protocol, and, simultaneously, programming the application that will execute on the host computer 102 with the same predetermined protocol. In this manner, the tactile feedback controller 110 and the host computer 102 can communicate using a common protocol with regard to the direct digital control signal. It should be understood that example embodiments are not limited by the selection or implementation of any particular communication protocol.

In an example embodiment, the digital control signal has two distinct components: a "device value" and a "device activity value" appearing in PORT A and PORT B respectively. The device value designates the specific device that is to be affected by the accompanying device activity value. The device activity value, appearing on PORT B, designates the amount of tactile feedback that is to be generated by the designated device (PORT A). In an example embodiment, the device value is transmitted on the 4-bit control signal, and the device activity value is transmitted on the 8-bit data signal. Accordingly, PORT A is a 4-bit port that can receive any value between 0-15, and PORT B is an 8-bit port that can receive any value between 0-255. Therefore, the PORT A device value can be any number between 0-15, and the PORT B device activity value can be any number between 0-255. Together, PORT A and PORT B represent a 12-bit communications bus between the host computer 102 and the tactile feedback controller 110. However, if a wider communications bus is implemented, the device pointer (PORT A) may have a greater numerical range, as follows: a 5 bit PORT A would allow device pointer values between 0-31, a 6 bit PORT A would allow device pointer values between 0-63, and so on. As the bus width gets greater, any number of data lines on that bus can be designated as PORT A, and any number of data lines can be designated as PORT B, or their respective equivalents. additionally, if bidirectional data lines are utilized, any number of available bi-directional lines can be designated as PORT A, PORT B, or their respective equivalents. Thus, example embodiments can employ communication buses of different sizes and type.

The device values physically implemented by any single tactile feedback controller 110 are generally limited to the number of I/O pins that are provided for Pulse Width Modulation (PWM) control signal output. Therefore, it is likely that the range of possible device values transmitted over PORT A may outnumber any given single implementation of PWM control signal generation output pins. In an example embodiment, the microcontroller 320 has 8 I/O pins designated as control signal output pins.

Although the current 4-bit PORT A is permitted to transmit up to 16 different device pointer values, the microcontroller 320 can only provide 8 I/O pins. As a result, it is entirely possible for a transmitted PORT A device value to designate a specific device that is not physically implemented by any given tactile feedback controller 110 that may receive that device value. In such cases, that specific control signal is ignored by each tactile feedback controller 110 for which that signal is invalid.

An example embodiment system may be designed in such a way that many tactile feedback controller 110 can be daisy chained together, by providing a pass-through parallel port 117 on each controller. In this manner, each and every tactile feedback controller 110 connected to the same communication bus will receive the same control signal, including the same device pointer value. However, each tactile feedback controller 110 may control a completely different and independent set of tactile sensation generators, by only responding to some subset of the possible device pointer values that it may receive. Tactile sensation generator hardware that is connected to one tactile feedback controller 110 may not be present on another controller. Each microcontroller 320 has some limited number of available I/O pins that individually control the transistor switch circuits 350 that subsequently power some configuration of multiple independent tactile sensation generators 120. Therefore, different tactile feedback controllers 110 can be designed to respond to some subset of the possible device pointer codes that it may receive. If a device pointer value is received that is not implemented by a specific tactile feedback controller 110, then that device pointer and its accompanying activity value will be ignored by that specific controller.

Returning to FIG. 13, method 1060 starts in step 1305 and proceeds to step 1310 where method 1060 queries whether the received PORT A device value is valid in view of the current specific hardware implementation. If the query is negatively answered, e.g., if the PORT A device value is not valid for the specific hardware implementation, then method proceeds to step 1320 where the entire digital control signal is ignored. If the query is affirmatively answered, e.g., if the PORT A device value is valid for the current specific hardware implementation, method 1060 proceeds to step 1330, where the PORT A device value is accepted as a valid device pointer.

In step 1340, the PORT B value is then accepted as the device activity value (for the device that is pointed to by PORT A). Method 1060 then ends in step 1345 or returns to step 1070 of FIG. 10, where control signals for the tactile sensation generators 120 are generated.

Figure 14:
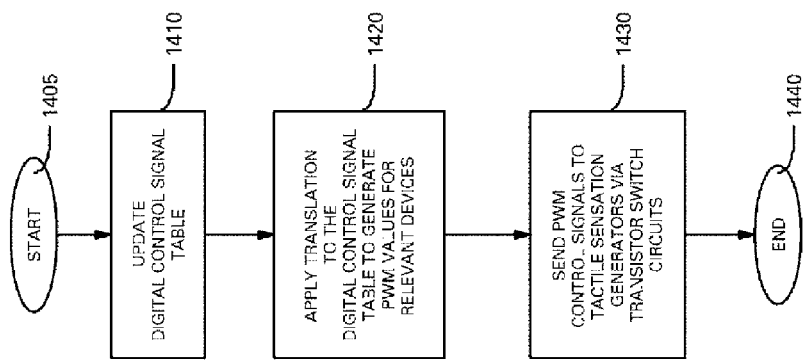
FIG. 14 is a flow chart of a method for generating control signals for tactile sensation generators.

FIG. 14 is a flow chart of a method 1070 for generating control signals for tactile sensation generators. Namely, it is a flow chart that illustrates the processing step of 1070 in FIG. 10. Method 1070 starts in step 1405 and proceeds to step 1410, where device values and device activity values are written to a digital control signal table (1510 shown in FIG. 15) in the RAM 342 of the microcontroller 320. Namely, under the host dependent mode, the PORT A device value designates a specific numbered entry in an internal RAM based digital control signal table (illustrated in FIG. 15) that ultimately stores the PORT B device activity value. In this manner, an internal digital control signal table is maintained within the microcontroller 320 that holds all of the digital control signal data that is generated by the host computer 102.

The internal RAM based digital control signal table was initialized with zeros upon the last power on reset. Therefore, the default "device activity" value of each entry in the digital control signal table is a zero. The only event that can change the value of an entry in the digital control signal table is a valid digital control signal. The PORT A device value actually points to the numbered entry in the table that is to be changed. The PORT B activity value is the actual value that is inserted into the appropriate device entry in the digital control signal table. In other words, the PORT B value is put into the digital control signal table at the device entry pointed to by PORT A. These table updates occur in real time when the host computer 102 changes its digital output signal, by hardware interrupts triggered by interrupt driven input ports on the microcontroller 320, or by polling the input ports at frequent intervals as determined by the ROM code within the microcontroller 320.

In step 1420, the values in the digital control signal table 1510 are then translated into power output entries within a second internal RAM table, the multiple independent PWM control signal table 1530. Although the power output values that populate the PWM control signal table are derived from the entries in the digital control signal table, they do not descend directly from the digital control signal table. In every case, each device specific activity value is processed by its own device specific power output parameters (table 1520 of FIG. 15) before filling its appropriate entry in the PWM control signal table. These power output parameters give each device its specific properties.

In step 1430, method 1070 sends the relevant PWM control signals to the relevant tactile sensation generators via the transistor switch circuits 350. Finally, method ends in step 1440. In an example embodiment, the method 1000 of FIG. 10 continues until the tactile feedback controller 110 is turned off.

The translation is subjected to two unique functions. A unique property of the direct digital control mode used by the tactile feedback controller 110 is that device values do not necessarily have to be actual tactile feedback devices. Pseudo-devices can be used to make controlling any and all connected tactile feedback devices as easy as possible. An example embodiment uses two pseudodevices, but makes no specific exclusion to using additional pseudo-devices that may have some practical value. The two pseudo-devices that are used by the example embodiment of the direct digital control mode are device 0 and device 9. Device 0 serves as a "master device", and device 9 serves as a "direct control shortcut". These pseudo-devices are absent from the PWM control signal table because they are not actual tactile feedback devices that use PWM output signals.

Device 0, the "master device", does not apply to any specific device connected to the tactile feedback system, but rather generally applies to every device connected to the system. When the tactile feedback controller 110 is initialized upon a power on reset, the internal RAM based digital control signal table is filled with zeros. The only way these default initial zero values can be changed is if a valid control signal provided by the host computer 102 intentionally changes them. Therefore, only devices that are receiving direct digital control signals may have their initial zero device activity values replaced with new device activity values. Therefore, any and all specific devices that are ignored by the software application that is executing host computer 102 will indefinitely retain their initial zero device activity values. However, all devices that have zero values in their device activity value entries will follow all device activity values that are sent to the "master device", or device 0, via line 1540 of FIG. 15. Furthermore, in order for the direct digital control mode to become active, method 1000 (software loop) checks for an initialization and reset code. The initialization and reset code is PORT A=0, PORT B=1. Therefore, the initialization and reset code required to activate the direct digital control mode is essentially the command pair: device 0, activity 1. The parallel port is a latching port, in that these values will be latched and held by the parallel port until they are changed. Assuming that no additional commands from the host computer 102 change the PORT A device value, the device value will stay latched as device 0, e.g., the "master device". As the host computer 102 sends new activity values to PORT B, the digital control signal post-processing method (step 1060 of FIG. 10) will continue to read PORT A as 0, and PORT B as the most recent activity value sent by the host computer 102. The digital control signal post-processing method will then update the device 0 slot in the internal RAM based digital control signal table with the new PORT B activity value. This process will repeat as often as PORT B is updated. The net result of these PORT B updates is a digital control signal table loaded with its default zero values for all devices 1-15, but with a constantly changing device 0 "master device" activity value. When the translation of the digital control signal table 1510 occurs, the first value from the digital control signal table to be subject to PWM translation is the device 1 activity value entry.

Figure 15:
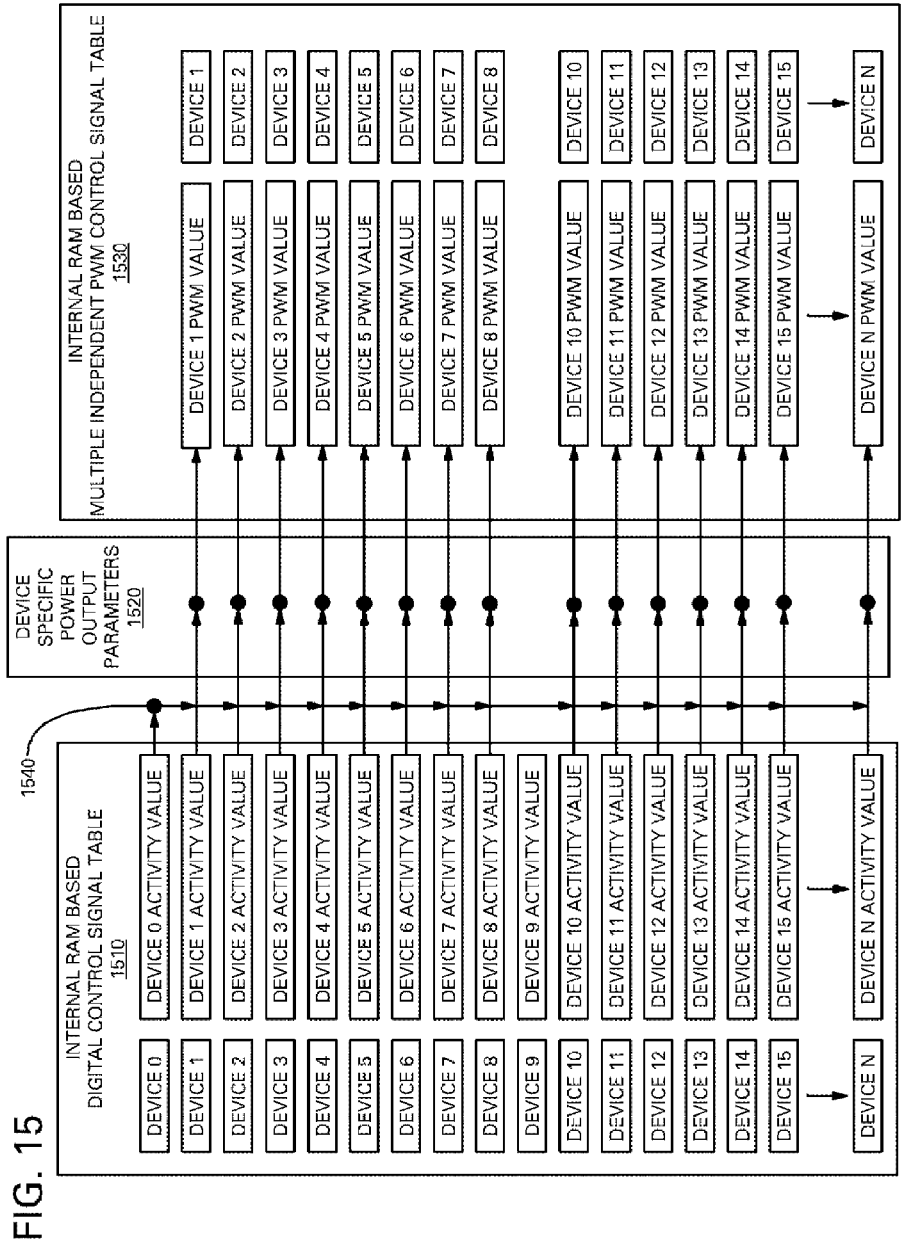
FIG. 15 is a block diagram illustrating the relationship between the digital control signal table, device specific power output parameters table and the PWM control signal table.

Referring now to FIG. 15, the device 1 activity value will be some number between 0 and 255 (an 8 bit value, as determined by the bus width of PORTB). If the device 1 activity value is zero, the device 0 activity value is used for PWM translation in lieu of the device 1 zero activity value. If the device 1 value is non-zero, the device 1 activity value itself is used for PWM translation. This process is repeated for all of the device activity entries (device 2-device N) in the digital control signal table 1510 as each one gets translated into a PWM value for the PWM control signal table 1530. This process, illustrated by line 1540 of FIG. 15, is how the "master device" device 0 propagates throughout all of the devices that are in the "follow the master" mode (e.g., having a zero in their activity value entry). As each device specific activity value is translated into a PWM value, it is processed by various device specific power output parameters 1520 that ultimately produce the final device specific PWM value in the PWM table 1530.

There is a vast array of tactile sensation actuators 501 that can be used by example embodiments. Electric motors, solenoids, hydraulic rods and pistons, pneumatic valves, and piezoelectric transducers are just a few examples. Each of these various types of actuators can exists in many different sizes, with many different power requirements and operating ranges of power consumption for each implementation. In order to accommodate the wide range of electromechanical devices that can be controlled by the universal tactile feedback controller 110, each specific device type can impose limits on the power signals that it will accept. This is accomplished by reprogrammable device specific power output parameters 1520. Although an example embodiment uses three device specific power output parameters 1520 for each device, no specific limitation is to be inferred with regard to additional device specific power output parameters that may be useful for any given specific type of device or actuator that may be implemented by example embodiment systems.

The first device specific power output parameter 1520 is determined by the main power supply voltage in use by the universal tactile feedback controller 110, and the power supply range that is appropriate for any given tactile sensation actuator 501. In order to tailor the power supply voltage so that it becomes appropriate for any given device, a "duty cycle" power output parameter is used. For example, if the main power supply applied to a given device specific transistor switch circuit 2551-2558 (see FIG. 25) is 20 volts, and a specific tactile sensation actuator 501 that is to be driven by that transistor switch circuit 2551-2558 has been rated for a 12 volt power supply, a device specific power output "duty cycle" parameter can scale the provided device activity value to 60% of its original value before inserting it within the appropriate device entry in the PWM control signal table 1530. This will effectively create an average maximum power level of 12 volts, which is the rated power range for the tactile sensation actuator in question. By multiplying any given device activity value by a device specific "duty cycle" power output parameter 1520 (e.g., a number between 0.00 and 1.00 in 0.03 increments), the universal tactile feedback controller 110 can use one power supply to support many different devices. Furthermore, the "duty cycle" can be set above 100%, to increase the power to any given tactile sensation actuator when that device is operating at less than the actual provided voltage (e.g., you can not convert a 20 volt signal into a 40 volt signal by setting its duty cycle at 200%). Allowing device specific duty cycle parameters can reduce the complexity and cost of the universal tactile feedback system 100 by allowing a single main power supply to support the individual power requirements of many different devices. However, example embodiments make no exclusion to using individual power supplies or regulated voltage lines for each device that may be implemented in example embodiments. In fact, an example embodiment may use two voltage sources in order to limit reliance on "duty cycle" parameter implementation. If a main power supply voltage of 20 volts was being used to drive a tactile sensation actuator 501 with a maximum operating voltage of 5 volts, that device would have to use a 25% duty cycle parameter. Although this setting can be used, it would effectively reduce the maximum possible pulse width "ON" time to no more than ¼ of its normal "ON" time at a 100% duty cycle. This may create "choppy" actuation within the actuator, as it would be receiving 20 volts for 25% of the time, and 0 volts for 75% of the time, for a PWM average of 5 volts. A potentially better implementation would be a supply voltage of 10 volts at 50% duty cycle, which is why the example embodiment incorporates just such a second voltage line.

The second device specific power output parameter 1520 is determined by the user's personal intensity preferences with regard to the desired intensity that is to be generated by any given tactile sensation actuator 501. Due to the different types and numbers of tactile sensation actuators that can be simultaneously driven by the universal tactile feedback controller 110, the user may desire to individually reduce or increase the tactile feedback generated by any given actuator. Although the "duty cycle" parameter sets the operating range of voltage that can be applied to any given actuator, the duty cycle setting is determined solely by the power requirements of a specific actuator. The "personal intensity preference" device specific parameter is determined solely by the user's personal preference with regard to the tactile feedback produced by any given specific tactile sensation actuator 501. This parameter is implemented in a similar way to the duty cycle parameter, in that the device activity value is multiplied by the appropriate device specific intensity parameter (e.g., a number between 0.00 and 2.00 in 0.03 increments).

The third device specific power output parameter 1520 is a "minimum activation value" which determines the activity threshold below which any given device will remain off. In an example embodiment, the minimum activation value parameter is not applied to non-zero device activity values, as non-zero device activity values necessarily mean that a given device is currently under direct digital control. If a device has a zero device activity value in the digital control signal table 1510, then that device is being ignored by the host computer for as long as the zero activity value is present (e.g., that device is in the "follow the master" mode). For example, imagine a device that has a minimum activation value of 70%. As long as the master device (device 0) activity value is less than 70% of the possible maximum value, the PWM value for that device in the PWM control signal table 403 will always be zero, and that device will remain OFF. If and only if the master device (device 0) activity value equals or exceeds the 70% minimum activation value for the specific device in question, will the PWM value in the PWM control signal table 1530 accept the master device's activity value for implementation by that specific device. In that case, the accepted activity value (that is greater than or equal to the minimum activation value) will still be subject to the other device specific power output parameters 1520 for that device.

Additional device specific power output parameters 1520 that may be implemented can be range specific power manipulation values, that reduce or amplify the power generated by a given device by some value that is determined by the power output level of that device. For example, if a device is following the master device, and the activity value of the master device is between 0% and 25%, the given device might reduce this value by 50% before implementing the value. If the activity of the master device is between 25% and 65%, the given device might reduce this value by 20% before implementing the value. If the activity of the master is between 65% and 100%, the given device might amplify this value by 120% before implementing the value. This is but one illustrated possibility of additional device specific power output parameters, which are not specifically limited by this disclosure.

FIG. 15 illustrates the relationship between the digital control signal table 1510, device specific power output parameters table 1520 and the PWM control signal table 1530. The "master device" takes effect when the internal RAM based digital control signal table 1510 is translated into another table, the internal RAM based multiple independent PWM control signal table 1530. Each time the translation step is executed, the PWM control signal table is loaded with actual Pulse Width Modulation (PWM) power output values that descend from the digital control signal table 1510. If a device activity value other than master device (device 0) is a zero, the activity value from the master device is translated into a device specific PWM value according to the appropriate device specific power output parameters 1520, and is then loaded into the multiple independent PWM control signal table 1530 in place of the absent device specific direct control signal.

In other words, the device specific PWM values that actually control the power output of every tactile sensation actuator connected to the system will follow the "master device" activity value for each and every device that has a zero activity value. Thus, the master device activity value is translated into a device specific PWM value by filtering the master activity value through various device specific power output parameters 1520 that control how each and every device follows the master activity value.

For example, if ten independent tactile sensation generators are all connected via daisy chained tactile feedback controllers, and all ten tactile sensation generators have zero values in their respective internal RAM based digital control signal tables, all ten tactile sensation generators will follow the single master device activity value in their own unique manner, as determined by their own device specific power output parameters. Therefore, all devices that have a zero in their activity value table entry will "follow" the "master device", via line 1540 of FIG. 15. Every other device with a non-zero activity value in its digital control signal table 1510 entry will not follow the master device activity value. Any device (excluding pseudo-devices such as 0 and 9) that has a non-zero value in its digital control signal table entry 1510, will follow its own device specific activity value, which exempts that device from following the master device's activity value.

Device activity values, coming in via 8-bit PORT B, can be any 8-bit value from 0 to 255. An activity value of 0 tells any given device to "follow" the "master device". An activity value of 1 is always OFF, e.g., generating no tactile feedback. Any activity value between 2 and 255 generates tactile feedback in direct proportion to that value, where an activity value of 2 represents the smallest possible tactile feedback, and an activity value of 255 represents the greatest possible tactile feedback. Any activity value given to a specific device is always processed by that device's specific power output parameters when the PWM control signal table 1530 gets filled. Any specific device will immediately enter its "follow the master" mode upon receiving an activity value of zero. Alternatively, any specific device will immediately enter its direct control mode upon receiving some non-zero value. In this way, the host computer 102 can take direct control of some specific device for some temporary time frame, and then place that device back into its "follow the master" mode when it is through dispensing that specific device's control signal. Device 9, the "direct control shortcut", does not apply to any specific device connected to the system, but rather generally applies to every device that is presently under direct control, e.g., not in its "follow the master" mode. Essentially, it provides a quick and simple means of simultaneously addressing every single device entry in the internal RAM based digital control signal table 1510 that is occupied by a non-zero value. For example, if a system was implemented wherein eight individual tactile sensation generators were all under device-specific direct control, and none were in the "follow the master" mode, all eight could be turned off with a single command that addressed the "direct control shortcut" pseudo-device (e.g., device code 9). Sending the single command pair "device 9, activity 1" (equivalent to PORT A 9, PORT B 1) will turn all such devices off, by loading each directly controlled device's digital control signal table 1510 activity entry with same activity value (PORT B=1) that was sent to device 9 (PORT A=9). The processing that accomplishes this occurs entirely within the microcontroller 320, and does not require any additional digital control signal data from the host computer 102.

Figure 16:
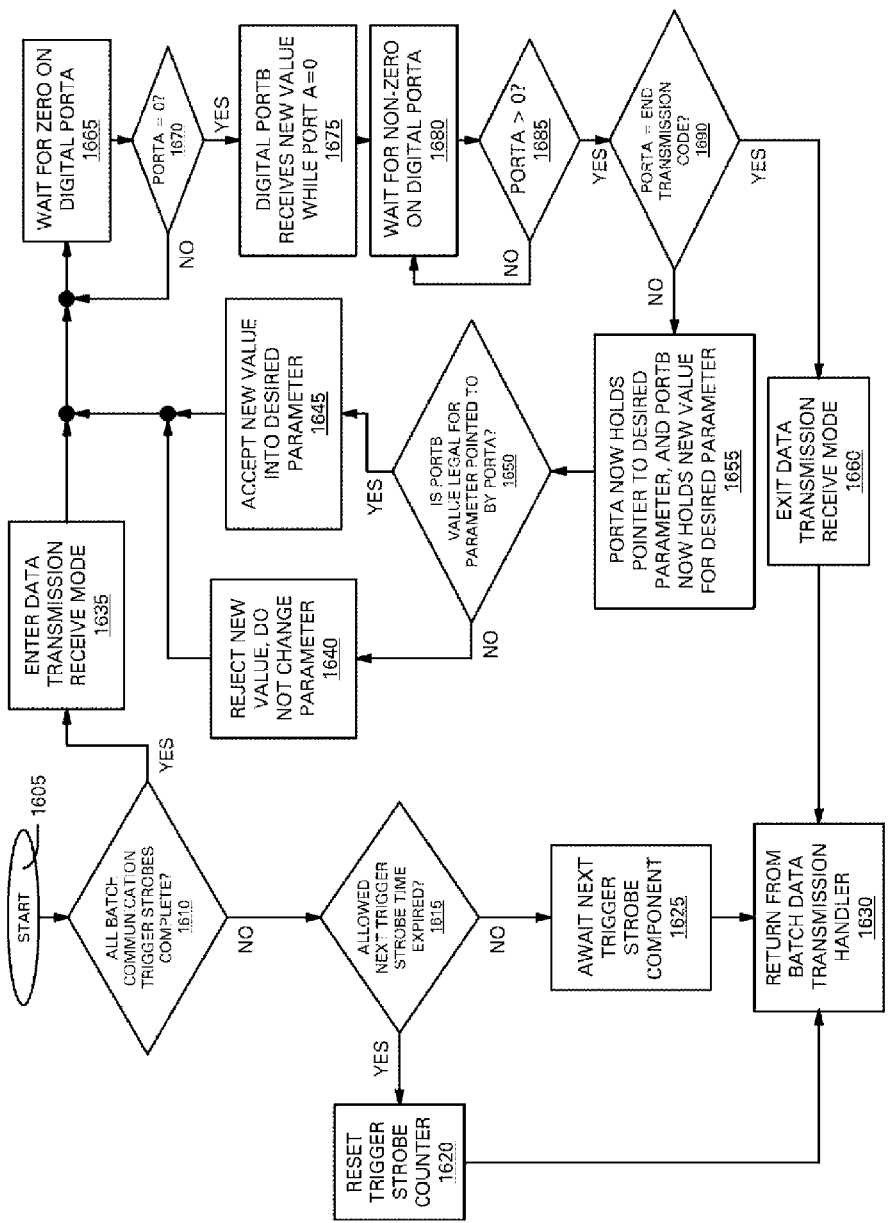
FIG. 16 is a flow chart of the batch data transmission method.

FIG. 16 is a flow chart of the batch data transmission method used in step 1035 of FIG. 10. Batch data transmissions are used to reprogram various operational parameters within the tactile feedback controller 110. The batch data transmission method is invoked by the method 1000 of FIG. 10 when a batch data transmission trigger is present on the digital input ports PORT A and PORT B. In an example embodiment, the batch data transmission trigger is composed of two alternating strobe signals that repeat four or more times. The first strobe signal is PORT A=15, PORT B=7, and the second strobe signal is PORT A=15, PORT B=8. Essentially, PORT A is set to the value 15, and PORT B alternates/ strobes between the values 7 and 8, at an approximate minimum interval of 3 milliseconds. These strobe signals can be repeated as many times as necessary to ensure that they are received by the microcontroller 320. This batch data transmission trigger could be implemented in many other ways, however, while still achieving the same end, e.g., activating the batch data transmission method's receive mode.

Returning to FIG. 16, method 1600 starts in step 1605, and proceeds to step 1610, where method 1600 checks if all the required trigger strobes have been completed. If they have not been completed, step 1615 checks to see if the next trigger strobe timer has expired. This trigger strobe timer exists as a safety to make sure that each valid trigger strobe follows the prior strobe by no more than some maximum time frame, such as 0.200 seconds. If a trigger strobe stagnates or deviates from the expected sequence before it completes the necessary strobe count, the trigger strobe counter is reset in step 1620, and subsequently returns to step 1630. This insures that the batch data transmission receive routine is not invoked unless a valid trigger set is received in a timely fashion. If the trigger strobe timer has not expired, the batch data transmission method continues to wait (e.g., does not reset the counter) for the next trigger strobe component in step 1625, and subsequently returns to the main software loop in step 1630.

Alternatively, if the batch data transmission method 1600 determines in step 1610 that all of the required trigger strobes have been received (typically 4 pairs of strobe triggers), the actual batch data transmission receive mode is entered in step 1635.

In an example embodiment, the batch data transmission method is a one way communication. To ensure the validity of the data received, a robust lock step method is used. Although an example embodiment has implemented this illustrative approach, any data transmission method could equally be used in its place, provided the appropriate corresponding method was implemented in the software that generates the actual data transmissions, and the ROM code within the microcontroller 320 that receives those same data transmissions. Example embodiments make no specific exclusion to using some other data transmission routine and/or the trigger that signifies the start of the communication.

Returning to FIG. 16, each cycle through the batch data transmission receive mode begins at step 1665, by waiting until a zero appears on PORT A. Steps 1665 and 1670 together yield an endless loop that is only broken when the external software sets PORT A equal to zero. After PORT A equals zero, the external software sets PORT B equal to the value it wishes to transfer in step 1675. In the meantime, steps 1680 and 1685 together yield an endless loop that is only broken when PORT A does not equal zero. In this way, the external software can allow PORT B to stabilize before the external software transmits a non-zero PORT A value. The next non-zero value on PORT A may be the "end transmission" code, which an example embodiment sets as 15. If this "end transmission" code is present, step 1690 recognizes it, exits the data transmission receive mode in step 1660, and ultimately returns to the main software loop via step 1630. If the end transmission code is not present, the non-zero value that appears on PORT A will be a pointer for a permanently encoded table in the ROM of the microcontroller 320. This pointer determines which reprogrammable internal parameter within the RAM of the microcontroller 320 will be changed to the PORT B value. This is illustrated in step 1655. In order to insure that the PORT B value is legal for the parameter that is pointed to by PORT A, each parameter has internal checks to make sure the PORT B value will not cause undesirable operation if and when it is implemented. If the PORT B value is illegal for the parameter pointed to by PORT A, the value is rejected in step 1640, and the entire cycle begins again in step 1665. If the PORT B value is legal for the parameter pointed to by PORT A, the value is accepted into the designated parameter in step 1645, and the entire cycle begins again in step 1665. In cases where the amount of reprogrammable parameters outnumbers the range of values capable of being transmitted on PORT B (in this case, 4 bit PORT B can transmit values 0-15, with 0 and 15 used to begin and end the transmission, respectively), each pointer (values 1-14) can be used multiple times by designating a different variable each time the same pointer is used. At any rate, the batch data transmission method ultimately ends with the previously described "end transmission" code (PORT B value 15). This "end transmission" code causes the batch data transmission method to exit the receive mode in step 1660, and ultimately return to the method 1000 via step 1630. The method 1000 then resumes at step 1040 (see FIG. 10).

Figure 17:
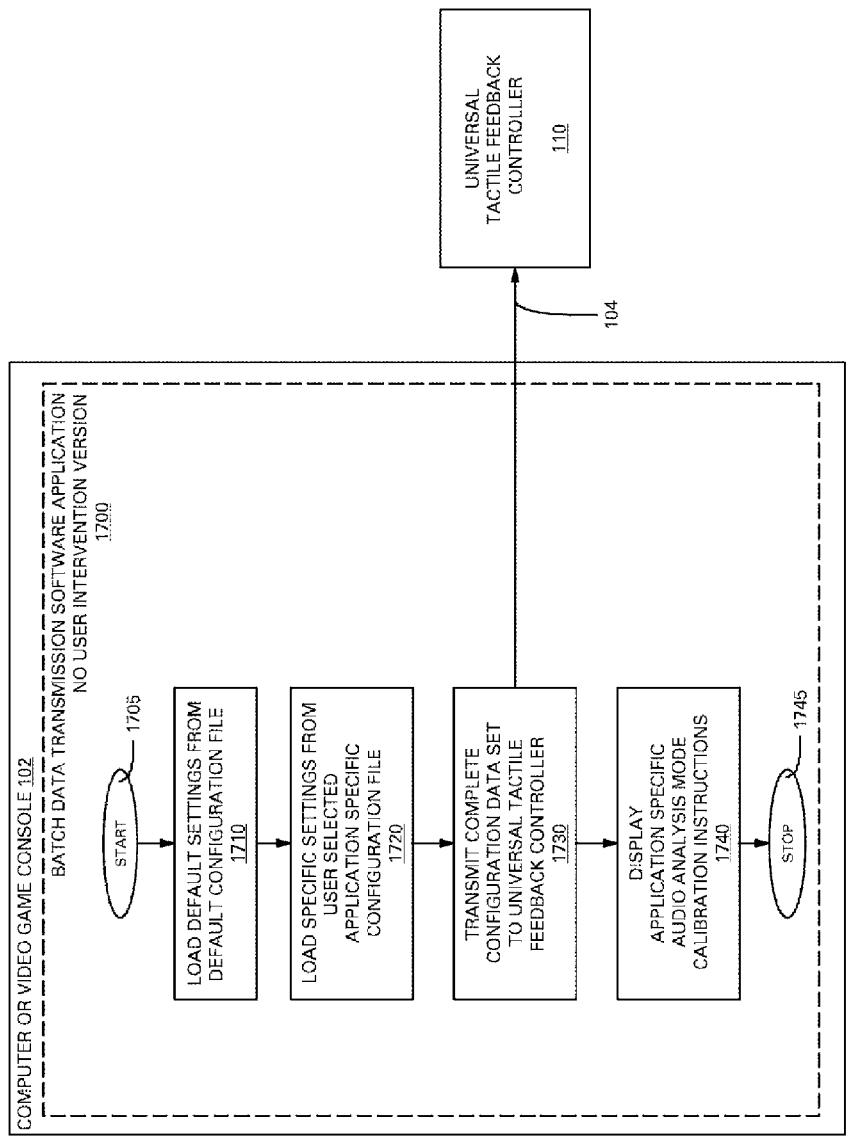
FIG. 17 is a flow chart of a "no user intervention" method to trigger the batch data transmission method.
Figure 18:
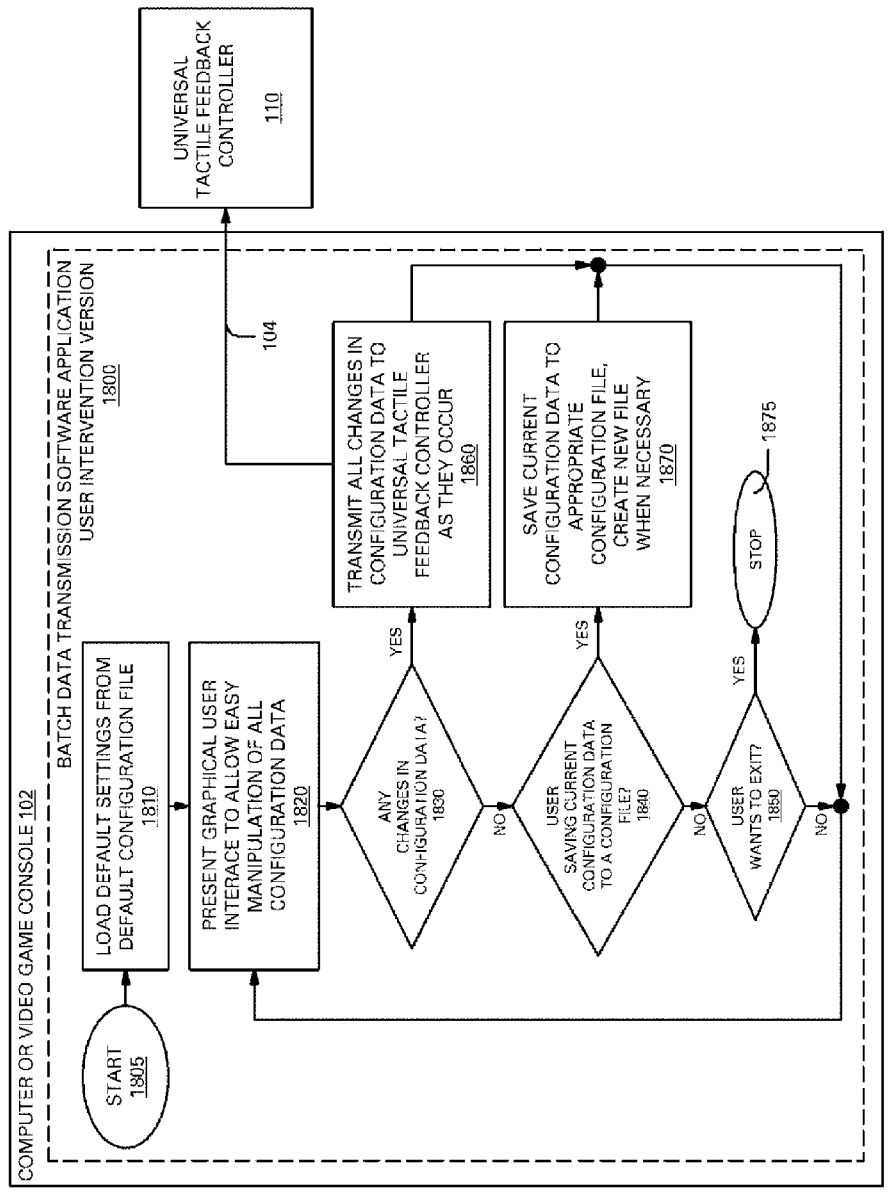
FIG. 18 is a flow chart of a "user intervention" method to trigger the batch data transmission method.
Figure 19:
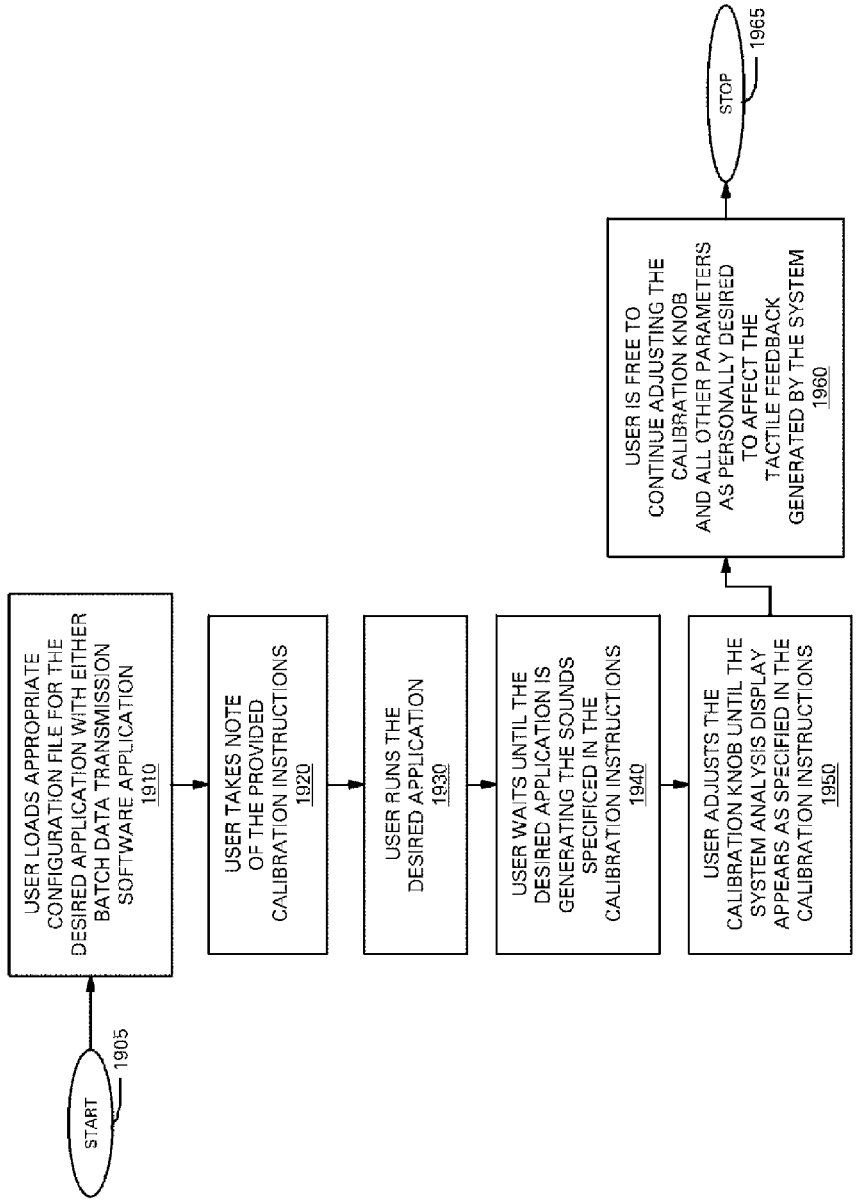
FIG. 19 is a flow chart of a host-independent audio analysis calibration method.

The batch data transmission method of FIG. 16 can be invoked by either one of two versions of external batch data transmission software applications that run on the host computer 102. The first of these two applications is the "no user intervention" version, depicted in FIG. 17. The "no user intervention" version is typically executed to quickly and easily configure the tactile feedback controller 110 for use with some specific game or simulation and the appropriate tactile sensation generators for that application, by sending preset configuration files out to the tactile feedback controller 110. The second of these two applications is the "user intervention" version, depicted in FIG. 18. The "user intervention" version is typically executed to create, modify, and save configuration files for later use with the "no user intervention" version of the batch data transmission software application. FIG. 19 depicts the host-independent audio analysis calibration method, which always incorporates one version of the two batch data transmission software applications (FIGS. 17 and 18). Referring to FIG. 17, the "no user intervention" version 1700 of the batch data transmission software application is used to send preset configuration files to the tactile feedback controller 110. In general, the user defines the preset configuration file that is to be transmitted to the tactile feedback controller 110, and that file is transmitted by the no user intervention version 1700 of the software by communicating with the batch data transmission method 1600 within the microcontroller 320. The user can designate the specific configuration file that is to be transmitted through several different means. In an example embodiment, the user enters a single command at a standard DOS command line. The single DOS command consists of the name of the executable file that actually is the no user intervention software program, and follows it with the name of the preset configuration file that is to be transmitted. Alternatively, the user can click an icon within their graphical user interface operating system (e.g., Windows 3.1, 95, 98, NT, etc.), which will eliminate the need to enter a DOS command. The icon can be linked to both the preset configuration file, and the application that it is intended for, such that clicking the single icon transmits the preset configuration file to the tactile feedback controller 110 and subsequently launches the desired application. The no user intervention version 1700 of the batch data transmission software application can be implemented in many ways, and therefore, these illustrative solutions do not intend to limit how this may be accomplished. Every specific configuration file contains configuration data that is specific for some given application. The default configuration file, however, contains configuration data for some given implementation of the entire tactile feedback system 100. The default configuration file is used as a basis for the specific configuration files, such that the default configuration file is always loaded first, and the specific configuration file is loaded on top of the default file. Generally, only specific configuration data that differs from the settings in the default configuration file are saved into the specific configuration files. In this manner, the user can change the configuration data for the tactile feedback system 110 without having to change every single specific configuration file that exists, by simply changing the data in the default configuration file.

Referring to FIG. 17, method starts in step 1705 and proceeds to step 1710, where the no user intervention method 1700 of the batch data transmission software application loads the default settings from the default configuration file. Then, in step 1720, it loads the specific settings from the user designated application specific configuration file. The default configuration settings, together with the application specific configuration settings, comprise a complete configuration data set that step 1730 transmits to the tactile feedback controller 110. This transmission occurs via the parallel cable 104 and the protocol outlined in the batch data transmission method (see FIG. 16). If application specific audio analysis calibration instructions were contained within the application specific configuration file, those audio analysis calibration instructions are displayed in step 1740. These displayed calibration instructions are utilized by the host-independent audio analysis calibration routine 1900 (see FIG. 19).

The calibration instructions are typically displayed until the user presses some designated key to terminate the calibration instructions display. If the user is already familiar with the calibration instructions for any given application (and/or has printed them out for reference), and therefore does not need to see them each time the specific configuration file that contains them is loaded, a command line switch can be used to keep the calibration instructions from being displayed. Generally, the loading and transmission of configuration data takes no more time than a fraction of a second. Method 1700 then ends in step 1745.

FIG. 18 is a flow chart of a "user intervention" method 1800 to trigger the batch data transmission method. Method 1800 starts in step 1805 and proceeds to step 1810 where method 1800 loads the default settings from the default configuration file. Then, step 1820 presents a graphical user interface so the user can easily manipulate all of the configuration data. Included in this "manipulation of configuration data" is loading both specific and default configuration files. In order to load any given configuration file, the user will typically select the file from a directory listing, which can be browsed with a mouse or other pointing device. Loading a given configuration file, or changing any single configuration parameter, are both interpreted as changes in the configuration data in step 1830. While both versions 1700 and 1800 of the batch data transmission software application can transmit the complete configuration data set, the graphical user interface user intervention method 1800 can transmit individual parameters as they are manipulated by the user in step 1860. By transmitting changes in configuration data to the tactile feedback controller 110 as they occur in step 1860, the user can efficiently discover optimal specific configuration data settings while the tactile feedback system 100 is in use. This is especially useful for discovering the best audio analysis parameters. When the configuration data is acceptable, the user can save the current configuration data in step 1840. The method then saves the appropriate type of configuration file (default or application specific), creating new files when necessary in step 1870. The user can terminate the user intervention version 1800 by using an exit option in step 1850 to arrive at step 1875.

When application specific configuration files are created for use with the host-independent audio analysis mode of operation, audio analysis calibration instructions are provided within the application specific configuration files. In order for the audio analysis mode to be most effective, the audio signal produced by the host computer 102 may be consistent with the audio signal that was used to set the audio analysis parameters that are contained within a given specific configuration file. This consistency between the audio signal from the host computer 102 and the audio signal that was used to set the audio analysis parameters is achieved with the host-independent audio analysis calibration routine 1900 of FIG. 19.

Referring to FIG. 19, the calibration method 1900 begins with step 1905 and proceeds to step 1910, wherein the user loads the desired application specific configuration file with either batch data transmission software 1700, 1800. In the case of the no user intervention version 1700, the provided audio analysis calibration instructions are displayed for the user on screen 1740 (see FIG. 17). In the case of the user intervention version 1800, the provided audio analysis calibration instructions may be selected for display by selecting them from a graphical pull-down menu. In either case, the user takes note of the provided calibration instructions in step 1920. This can include printing the provided instructions. After the user has taken note of the calibration instructions, the user runs the desired application in step 1930.

The calibration instructions were created, at some point in time, typically with the user intervention method 1800 of the batch data transmission software application. Within that method 1800, a text editor is provided so calibration instructions can be recorded. When an application specific audio analysis calibration file is being created, and the audio analysis settings are acceptable to the person creating the file, the calibration potentiometer (component part R8 of FIG. 6) within the variable gain pre-amplifier 420 of the analog audio signal pre-processing section would have been previously adjusted to the satisfaction of the person creating the configuration file. The calibration potentiometer adjusts the signal strength of the audio signal such that the audio signal is neither too weak, nor too strong. When the audio analysis parameters are yielding good results, the person creating the calibration instructions looks to find a relatively common sound effect occurring within the simulation. When the person who is creating the calibration instructions hears a common sound effect, they observe the status of the LEDs within the system analysis display. Within the calibration instructions, they describe what common sound effect to listen for, and the number of LEDs on the system analysis display that are illuminated in response to the common sound effect (when the calibration potentiometer is properly set).

Figure 24:
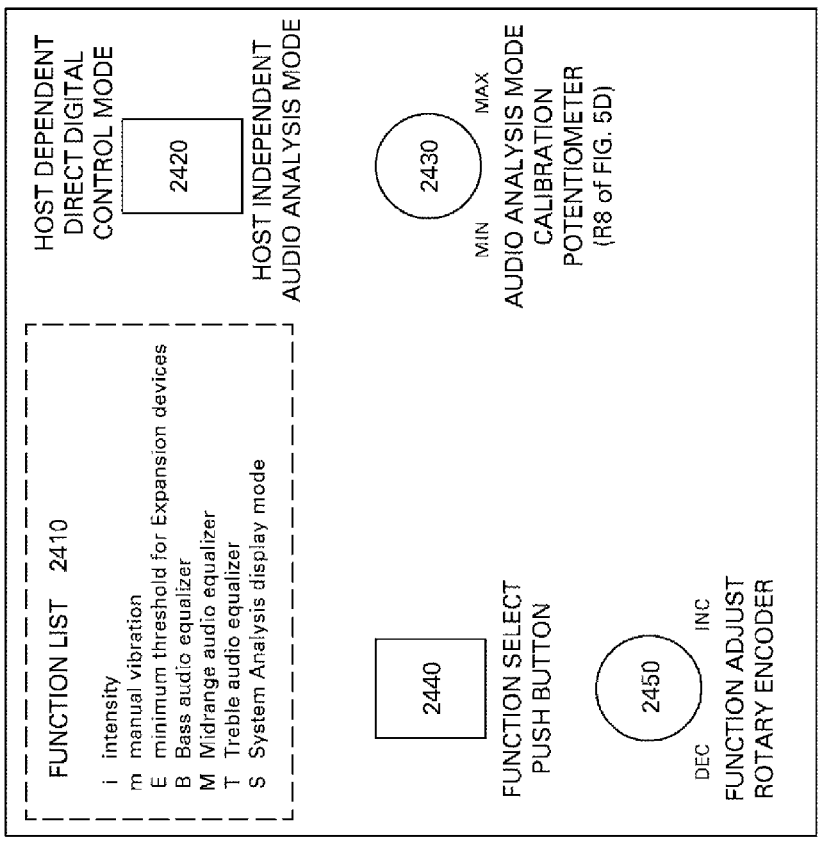
FIG. 24 is an illustration of the user input switches on the tactile feedback controller.

Referring again to FIG. 19, the user waits until the desired application is generating the common sound effect that was specified in the calibration instructions. When the specified sound effect is heard in step 1940, the user adjusts the calibration potentiometer (via knob 2430 of FIG. 24) until the LEDs within the system analysis display appear approximately as specified within the calibration instructions. When the LEDs within the system analysis display 370 appear approximately as specified in the calibration instructions, indicated by step 1950, it means the audio signal generated by the host computer 102 is occurring at the same approximate amplitude as the audio signal that was used to set the application specific audio analysis parameters. Once the audio signal from the host computer 102 is an approximate match to the original audio signal that was used to set the audio analysis parameters, the tactile feedback resulting from the audio analysis mode of operation will be substantially similar to the results perceived by the person who created the corresponding specific configuration file. In other words, the audio signal will have been calibrated successfully. In step 1960, the user can continue to fine adjust the calibration potentiometer (and all other parameters) as personally desired to tweak and otherwise change the tactile feedback produced by the system. Method 1900 ends in step 1965.

Figure 20:
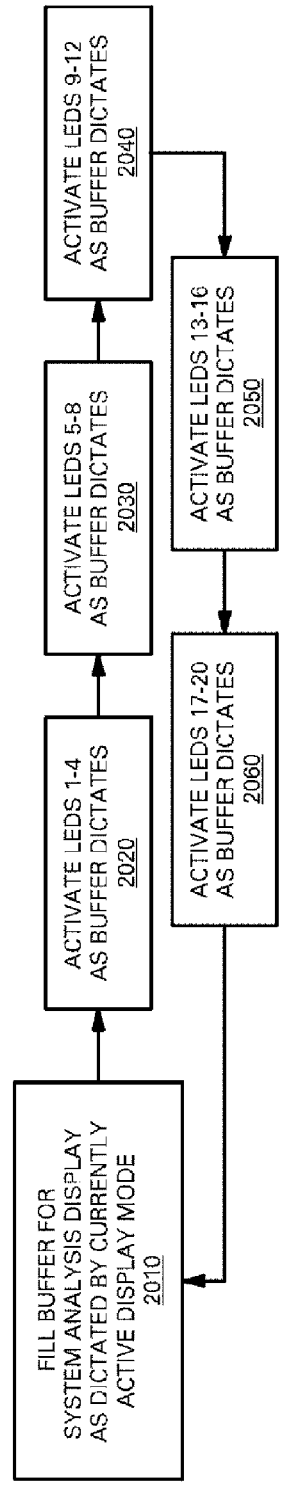
FIG. 20 is a flow chart that illustrates a method of activating LEDs via a multiplexing method.
Figure 22:
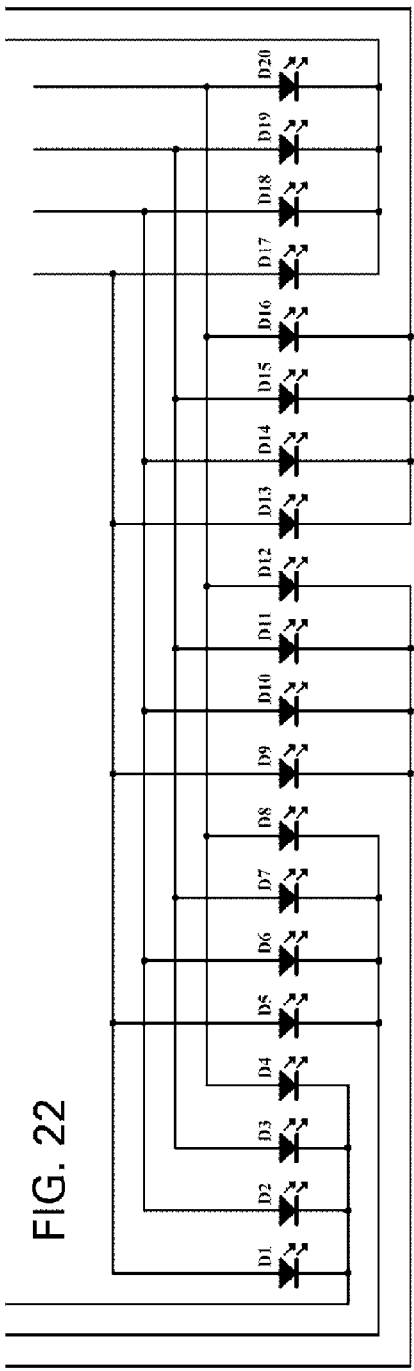
FIG. 22 is a circuit diagram of the LED display of FIG. 23.
Figure 23:
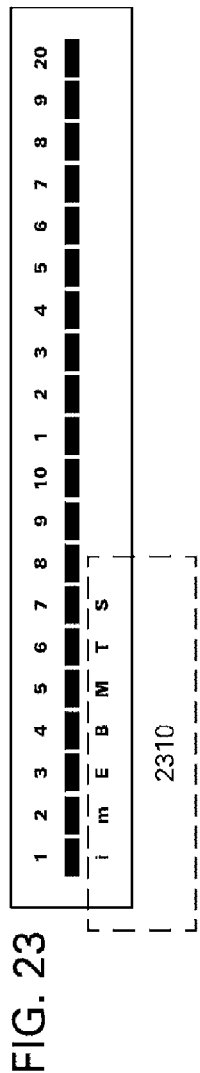
FIG. 23 is an illustration of a LED display with the circuit of FIG. 22.

FIG. 20 is a flow chart that illustrates a method 2000 of activating LEDs. Referring to FIG. 20, the first step fills a RAM buffer for the system analysis display as determined by the currently active display mode (see box 2410 of FIG. 24). The display mode parameter determines the configuration of the 20 LEDs, the method by which data is to be displayed, and the actual data that is to be displayed. When the system analysis display mode parameter is changed, either from a batch data transmission or from new input from the hardware switch multiplexer, a special temporary identification mode of blinking LEDs is implemented on the LED display, in order to inform the user what display mode is about to be engaged. Each display mode has its own unique blinking LEDs indicator, which identifies the display mode that is about to take over the entire LED display 370. The duration of the blinking LEDs system analysis display mode identifier can be set to last anywhere between 0.20 and 25.0 seconds. When this variable timer expires, the requested display mode is subsequently engaged. The display buffer is loaded with a digital representation of the physical display, which is illuminated on the actual LEDs in a multiplexed manner. The 20 LED system analysis display 370 is composed of 5 groups of 4 LEDs, that together compose a horizontal strip of 20 LEDs (see FIGS. 22 and 23). In order to save both power and I/O pins on the microcontroller 320, only 1 multiplexed group of LEDs is illuminated at any given time. As a result, when all 20 LEDs appear to be illuminated at once, only 4 LEDs are actually illuminated. However, because the switching of these LEDs via multiplexing occurs at a very rapid rate (e.g., 60-120 Hz or higher), human persistence of vision provides the illusion that all 20 LEDs are illuminated at once. This multiplexing occurs as each step 2020-2060 in the system analysis display multiplexer is executed. Step 2020 illuminates LEDs 1-4 as the display buffer dictates. Step 2030 illuminates LEDs 5-8 as the display buffer dictates. Step 2040 illuminates LEDs 9-12 as the display buffer dictates. Step 2050 illuminates LEDs 13-16 as the display buffer dictates. Step 2060 illuminates LEDs 17-20 as the display buffer dictates. Then, the system analysis display repeats steps 2010-2060, with one individual step being executed each time the multiplexer is invoked.

Figure 21:
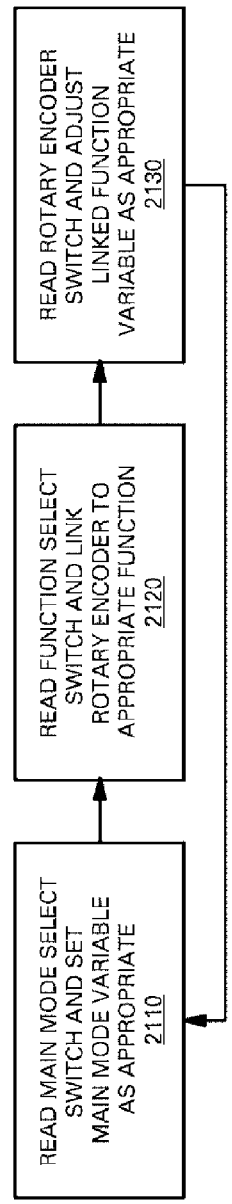
FIG. 21 is a flow chart that illustrates a method of reading hardware switches via a multiplexing method.

FIG. 21 is a flow chart that illustrates a hardware switch multiplexing method 2100. Referring to FIG. 21, these three steps read the physical state of all three hardware switches of FIG. 24 on the tactile feedback controller 110, and alter internal variables as necessary to reflect the state of those switches. The first step 2110 reads the main mode select switch (2420 of FIG. 24) and sets the main mode variable as appropriate. The main mode switch is a toggle switch that has two possible positions which are mutually exclusive. The position of this switch selects the main operating mode of the tactile feedback controller 110. With switch 2420 in a first position, the tactile feedback controller 110 operates in its host-independent audio analysis mode. With switch 2420 in a second position, the tactile feedback controller 110 operates in its host-dependent direct control mode. The second step 2120 reads the function select switch (2440 of FIG. 24) and links the third switch (2450 of FIG. 24) to some specific function. The function select switch is a spring loaded, short travel, normally open push button switch. Each time this switch is pressed, the rotary encoder is linked to a different function. The functions that are available to this process are some small subset of the many reprogrammable parameters that can be manipulated by the two external batch data transmission software applications. This subset of reprogrammable parameters is listed in box 2410 of FIG. 24. The item in the list that is currently linked to the rotary encoder has its own indicator LED, as shown in box 2310 of FIG. 23. The letters 2310 beneath the indicator LEDs correspond to the function list 2410. At that time, LEDs 11-20 illuminate to display the value of the selected parameter. Each time the function select push button 2440 is pressed, the next function in the function list 2410 is linked to the function adjust rotary encoder 2450, the appropriate indicator LED 2310 is illuminated, and the value associated with that parameter is shown on the LEDs 11-20. The third step 2130 reads the multi-purpose rotary encoder 2450 and adjusts the linked function 2410 as appropriate. The rotary encoder is a forty-position digital encoder that spins freely in both directions. It generates what is known as "gray code" a simple binary data stream that indicates its direction and speed of rotation. Generally, when rotated in a clockwise fashion, it increases the value that it is adjusting. Alternatively, when rotated in a counter-clockwise fashion, it decreases the value that it is adjusting. The numerical steps it uses when adjusting some variable within the RAM of the microcontroller 320 are subject to arbitrary limits set within the ROM code within the microcontroller 320. These limits keep the adjusted values from causing undesirable operation. The function select push button 2440, and the function adjust rotary encoder 2450, both work together as a multi-purpose pair. By providing these two switches, a single rotary encoder can replace many potentiometers and other rotary encoders by allowing the single rotary encoder switch to adjust many individual variables. This process (including switches 2440 and 2450, and the LED display 370) allows important values to be manipulated directly from the tactile feedback controller 110 itself, without external software running. Although an example embodiment has implemented these three switches, example embodiments are not limited to how these switches can be implemented, if at all. Furthermore, additional switches may prove useful, and no specific implementation is declared to limit some other set of switches, or lack thereof. This set of hardware switch multiplexer method 2100 repeats steps 2110-2130.

FIG. 25 is a functional block diagram of both the multiple independent PWM control signal generation component 2504, and the PWM outputs 2540 of microcontroller 320. Each of the eight individual PWM independent control signal output pins 2541-2548 renders a PWM signal as dictated by its corresponding value in the multiple independent PWM control signal table. Each of these independent PWM output signals 2541-2548 controls a corresponding independent transistor switch circuit 2551-2558. The eight transistor switch circuits 2551-2558 together comprise the transistor switch circuits 360 component of FIG. 3. Each microcontroller PWM output pin 2541-2548 is used by one transistor switch circuit 2551-2558 to turn on and off one or more tactile sensation actuators 501 within some independent tactile sensation generator (depicted as 502, 503, 504). A given transistor switch circuit 2551-2558, in response to the output of its corresponding PWM output pin 2541-2548, becomes activated, e.g., conducts current, such that the appropriate transistor switch circuit 2551-2558, once activated, allows current to pass through one or more actuators 501 to ground. In response, the actuators 501, e.g., DC motors with offset weights attached to their shafts, vibrate. As a PWM signal 2541-2548 that drives a DC motor increases its pulse width, the DC motor receives more current and spins faster, thereby yielding more powerful tactile sensation (e.g., vibration). Although the PWM output signals 2541-2548 provide a wide range of pulse widths, some actuators 501 (such as solenoids) may require only a digital type signal composed of two pulse widths: ON (e.g., 100% pulse width), and OFF (0% pulse width), which correspond to binary 1 and binary 0, respectively. In such a case, the PWM output signals can be limited accordingly, when necessary. Furthermore, the microcontroller 320 does not necessarily have to use the Pulse Width Modulation technique to control the transistors 2550 and actuators 501 it controls. Many other techniques can readily be implemented by those skilled in the art.

In an example embodiment, each single tactile feedback controller 110 provides eight independent outputs 2541-2548 that are driven in the previously described manner. However, there is no specific limitation imposed on how many such outputs are to be provided within any single tactile feedback controller 110. The only limiting factor is the number of I/O pins available on the microcontroller 320. Furthermore, many microcontrollers 320 can be working in parallel to provide as many I/O pins as are necessary to sustain any imagined implementation. Additionally, many tactile feedback controller 110 units can be daisy chained together, theoretically allowing as many tactile feedback controller 110 units to provide as many desired outputs as the electrical properties of the connections in the host computer 102 allow, until the total resistance and capacitance of the cables in such a configuration prohibitively degrade the transmission of that information. Even in such a case, analog and digital signal hubs can be used to boost the signals carried over the connections.

Ultimately, the PWM signals 2541-2548 that control the outputs from the transistor switch circuits 2551-2558 can be used to control any electromechanical device. Each transistor switch circuit 2551-2558 can use its own power supply and transistor type that is appropriate for the actuator or actuators that it is intended to drive. There should be no inferred limitation regarding the power consumption of any given actuator based upon the PWM signal 2541-2548 that controls it. However, for simplicity, this disclosure generally implies DC motors with offset weights for its tactile sensation actuators 501. As a PWM signal 2541-2548 that drives a DC motor increases its pulse width, the DC motor receives more current and spins faster, thereby yielding more powerful tactile sensation (e.g., vibration).

The illustrated independent tactile sensation generators 502, 503, 504 can contain one or more independent tactile sensation actuators 501, with each independent tactile sensation actuator 501 containing one or more individual actuators working in series or parallel. For example, independent tactile sensation generator 502 contains one set of tactile sensation actuators 501 which responds to one transistor switch circuit 2551. Independent tactile sensation generator 503 contains three sets of tactile sensation actuators 501 which independently respond to three transistor switch circuits 2552, 2553, 2554. Independent tactile sensation generator 504 contains four sets of tactile sensation actuators 501 which independently respond to four transistor switch circuits 2555, 2556, 2557, 2558. Each tactile sensation actuator 501 can be composed of many individual actuators that are wired in series or parallel, that function as a single tactile sensation actuator by responding to the same PWM signal. Ultimately, tactile sensation actuators 501 can be arranged in any number and configuration, with one or more tactile sensation actuators 501 existing within one or more independent tactile sensation generators 502, 503, 504. 460 represents the set of independent power distribution wires that carry the 5 current that is switched by the transistor switch circuits 2550, and ultimately utilized by the various tactile sensation actuators 501. In an example embodiment, the digital logic TTL level PWM signals 2549 enter the transistor switch circuits 2550 that are provided within the universal tactile feedback controller 110. Within box 460, the independent power distribution lines from transistor switch circuits 2551-2558 can contain power connectors of many different types, such that the actuators 501 can be plugged into those connectors.

In order to illustrate the many possible configurations of multiple independent tactile sensation generators 120 that can be managed by the tactile feedback controller 110, and the various scenarios where such tactile sensation generators 120 may be implemented within an example embodiment, FIGS. 26A-26D have been provided. Although there is a constantly growing library and wide range of game and simulation software available, most applications for which tactile feedback is of high importance can be categorized by two main genres: vehicle based simulations, and open-body combat games. Vehicle based simulations include flight simulations, tank simulations, driving simulations, space flight simulations, and so on, where the game player navigates through the simulation or game via some type of simulated vehicle. Generally, the main tactile sensation generator in the example embodiment system for any vehicle based simulation is a tactile feedback seating unit 510. Open-body combat games include games that occur in the first person perspective, where the display apparatus generates a view of a simulated world, wherein the simulation attempts to represent what one would see if they were actually standing within the simulated world. These games may also occur in a third person "over the shoulder" view, or an "above and to the side ¾ perspective" view, and other perspectives as well. In these games, the game player is typically a human being that runs, walks, and otherwise navigates throughout the simulated world, without a vehicle. Generally, the main tactile sensation generator in an example embodiment for an open-body combat game is a vest-based tactile sensation generator 595. In both the vehicle case and open-body case, additional tactile sensation generators are equally important to convincingly portray the simulation as realistically as possible.

To illustrate scenarios with these and other tactile sensation generators, and common implementations of control input devices, FIGS. 26A-26D are referenced below. The scenarios depicted in FIGS. 26A-26D are illustrative only, and by no means specifically imply any limitations regarding other possible scenarios and implementations of tactile sensation generators and/or control input devices. Each of the four illustrative scenarios, FIGS. 26A-26D, depicts one of four common control input device hardware suites. However, any given implementation of the four illustrative control input device hardware suites may use only a subset of the illustrated control input devices. The actual implementation of control input devices varies widely.

The first scenario (FIG. 26A), typical of military flight simulations, consists of a left-handed stand alone throttle and weapons controller, a right-handed joystick, and a rudder pedal unit. This first scenario is generally used for many other vehicle based games, such as modern tank simulations and futuristic mechanized robot combat games. Most simulated vehicles (other than cars) are controlled with this hardware setup. The second scenario (FIG. 26B), typical of civilian flight simulations, consists of a two-handed flight yolk, and a rudder pedal unit. The third scenario (FIG. 26C), typical of driving simulations, consists of a steering wheel, a gear shifter, and a pedal unit typically providing gas and brake pedals. The fourth scenario (FIG. 26D), typical of first person perspective shooters, can use just about any combination of control input devices, such as keyboards, mice, joysticks, 3D controllers, and more.

Referring to FIGS. 26A-26D, the host computer 102 provides signals to the universal tactile feedback controller 110 via cable set 103, 104. The universal tactile feedback controller 110, in turn, sends current through power distribution cables 461-468 to activate the tactile sensation actuators 501 within the depicted tactile sensation generators.

In FIGS. 26A-26D, the tactile feedback seating unit 510 is a semi-rigid foam structure, sealed with a cloth or vinyl layer, with a leg portion and a back portion, substantially shaped to easily rest upon any given seat, with a plurality of actuators embedded within the foam structure, such that the actuators in the pad produce localized vibration. These actuators are laid out in several independent zones within the foam, providing a left leg tactile sensation generator, a right leg tactile sensation generator, and a back tactile sensation generator (which may itself be divided into left back and right back tactile sensation generators), such that these independent tactile sensation generators exist within the single tactile feedback seating unit 510. Furthermore, each tactile sensation generator zone within the seat may itself be made up of one or more tactile sensation actuators 501. Illustrative examples of tactile feedback seating units are depicted later in this disclosure.

In FIGS. 26A-26D, the tactile sensation actuator(s) for a chest harness 520 are one or more vibratory actuators that are embedded within or attached to apparatus that places the actuators in contact with the user's chest, such that tactile sensation can be felt on the game player's chest. Illustrative examples of this are depicted later in this disclosure. In cases where this device is ignored by the host computer 102, the appropriate "minimum activation value" power output parameter can be set such that this device only produces tactile sensation upon a crash event, for example. In this way, the illusion of restraint by a seat belt or safety harness can be produced.

Figure 26A:
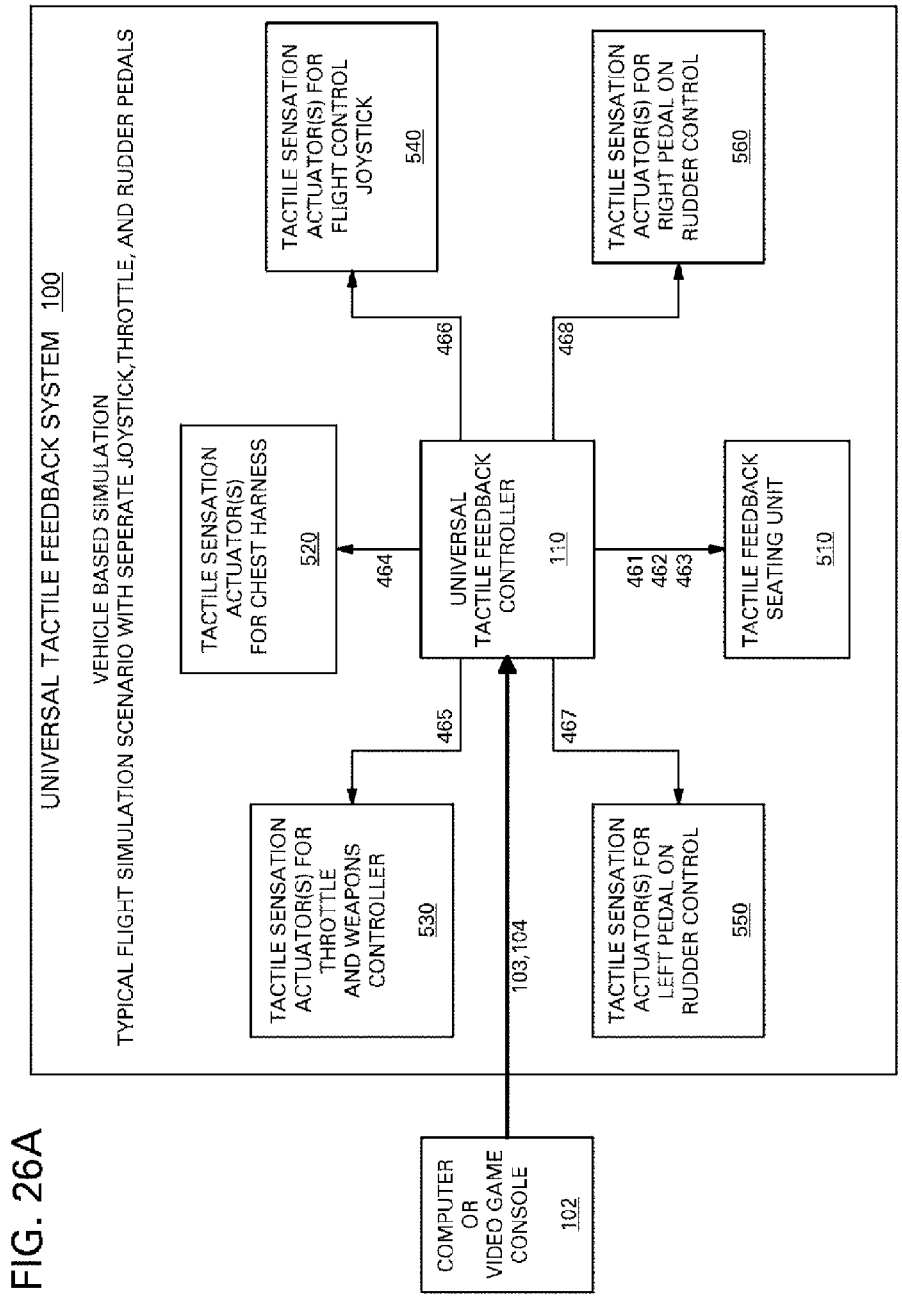
FIG. 26A depicts the first of four common control input device hardware suites.

In FIGS. 26A-26B, both the tactile sensation actuators) for the left pedal on a rudder control 550, and the tactile sensation actuator(s) for the right pedal on a rudder control 560, together comprise a pair of independent tactile sensation generators that can be affixed to or embedded within both pedals on a rudder pedal unit. Generally, these actuators may be attached to pre-existing rudder pedal units, or may be embedded within the plastic or metal structure that comprises the rudder pedals during their manufacture. In one implementation, vibratory actuators are embedded within corresponding plastic pedal overlays, such that when the plastic overlays are laid on top of the existing foot pedals, and affixed in place with hook and loop fasteners or two sided adhesive foam tape (or some other readily available attachment means), the new surfaces of the foot pedals contain the tactile sensation actuators. In another implementation, tactile sensation actuators are affixed to the bottom of the existing foot pedals, with hook and loop fasteners or two sided adhesive foam tape, if there is sufficient space for the actuators beneath the pedals. These approaches are illustrated later in this disclosure. In addition to allowing specific tactile sensations to be perceived via the rudder pedal control input device, the rudder pedal unit will be afforded the illusion that it is affixed to the same structure to which the seating unit is affixed. This begins to provide the illusion that there is a continuity of structure among the disparate control input devices that is important for suspending the disbelief of the simulation user.

In FIG. 26A, the tactile sensation actuator(s) for a stand alone throttle and weapons controller 530 will generally be comprised of two possible forms. In the illustrative form, a vibratory actuator can be attached to outer side of the throttle handle with hook and loop fasteners or two sided adhesive foam tape (or some other readily available attachment means), such that the actuator is substantially out of the way, and therefore will not interfere with the motion of the throttle body or the ergonomics of the throttle handle. In a second illustrative form, small vibratory actuators can be affixed to or embedded within the throttle's handle, such that the hand of the user, in holding the throttle, will come into direct or indirect contact with these small vibratory motors. If these motors are attached to the outer surface of the throttle handle, they may be sized small enough to not substantially disrupt the ergonomics of the throttle handle. A preferable location may be the underside (bottom) of the throttle handle. They may be attached in a temporary fashion via small elastic straps, or they may be embedded within a small plastic housing that is specifically designed to fit precisely upon the surface of a specific location of a specific throttle handle. Alternatively, small motors may be inserted into the palm area of a padded glove that is to be worn by the user. In another illustrative form, larger actuators can be affixed to the base of the throttle unit, by Velcro or two sided adhesive foam tape, which will generally alleviate possible size and ergonomic restraints. Larger actuators can be more powerful, and therefore, will vibrate the handle of the throttle by sympathetic vibration. Additionally, both of these implementations of actuators may be used simultaneously. The tactile sensation actuator(s) for a flight control joystick 540 are implemented in a similar fashion to the actuators for the throttle and weapons controller 530. In the illustrative form, vibratory actuators can be affixed to or embedded within the joystick's handle, such that the hand of the user, in holding the joystick, will come into direct or indirect contact with these vibratory motors. If these motors are attached to the outer surface of the joystick handle, they may be small enough to not substantially disrupt the ergonomics of the joystick handle. A readily available solution are small 5 mm micro-motors, typically used as vibrators for pocket size pagers. These micro-motors can be mounted to the palm side of the joystick handle. The actuators may be attached in a temporary fashion via small elastic straps, or they may be embedded within a small plastic template/housing that is specifically designed to fit upon the relatively flat surface of the palm area of a joystick handle. Many force-feedback joysticks have optical sensors on the joystick handle to determine when the joystick is being held. In these cases, the template may accommodate the optical sensor, by being made of transparent plastic, or by providing an appropriate hole, such that light can strike the optical sensor when the joystick handle is not being held. Alternatively, small motors may be inserted into the palm area of a padded glove that is to be worn by the user. In a second illustrative form, a vibratory actuator can be attached to lower side of the joystick handle opposite the user's palm, with Velcro hook and loop fasteners or two sided adhesive foam strips, such that the actuator is substantially out of the way, and therefore will not interfere with the motion of the joystick or the ergonomics of the joystick handle. If sufficient room does not exist in this location, the very top of the joystick usually has sufficient area to attach an actuator. However, this area is more conspicuous, and therefore, the size and shape of the actuator housing may be especially limited by aesthetic considerations.

Ultimately, in the typical flight simulation scenario depicted in FIG. 26A, comprised of a joystick, throttle, and rudder pedals, where tactile sensation actuators are distributed throughout these control input devices 530, 540, 550, 560, and simultaneously within a seating unit 510 and a chest harness 520, or some subset thereof, the simulation user will be exposed to tactile sensations that help to convince his or her senses that the simulation is real. Furthermore, due to the substantially unified manner of operation these disparate tactile feedback devices, the flight simulation user will benefit from the illusion that these disparate devices are all attached to the same physical structure.

In FIG. 26B, a two-handed flight control yolk, typical for civilian aircraft simulations, replaces the left-handed throttle and right handed flight control joystick of FIG. 26A. In this case, tactile sensation actuators can be attached to or embedded within both the left handle of the control yolk 535, and the right handle of the control yolk 545. Additionally, one or more larger actuators can be mounted on various locations on the flight control yolk's body, in lieu of the other two actuators 535,545, or in addition to them. These actuators can be attached to the flight control yolk with elastic straps, Velcro hook and loop fasteners, two sided adhesive foam, or some other readily available attachment means. In all other aspects, FIG. 26B is equivalent to FIG. 26A.

Figure 26C:
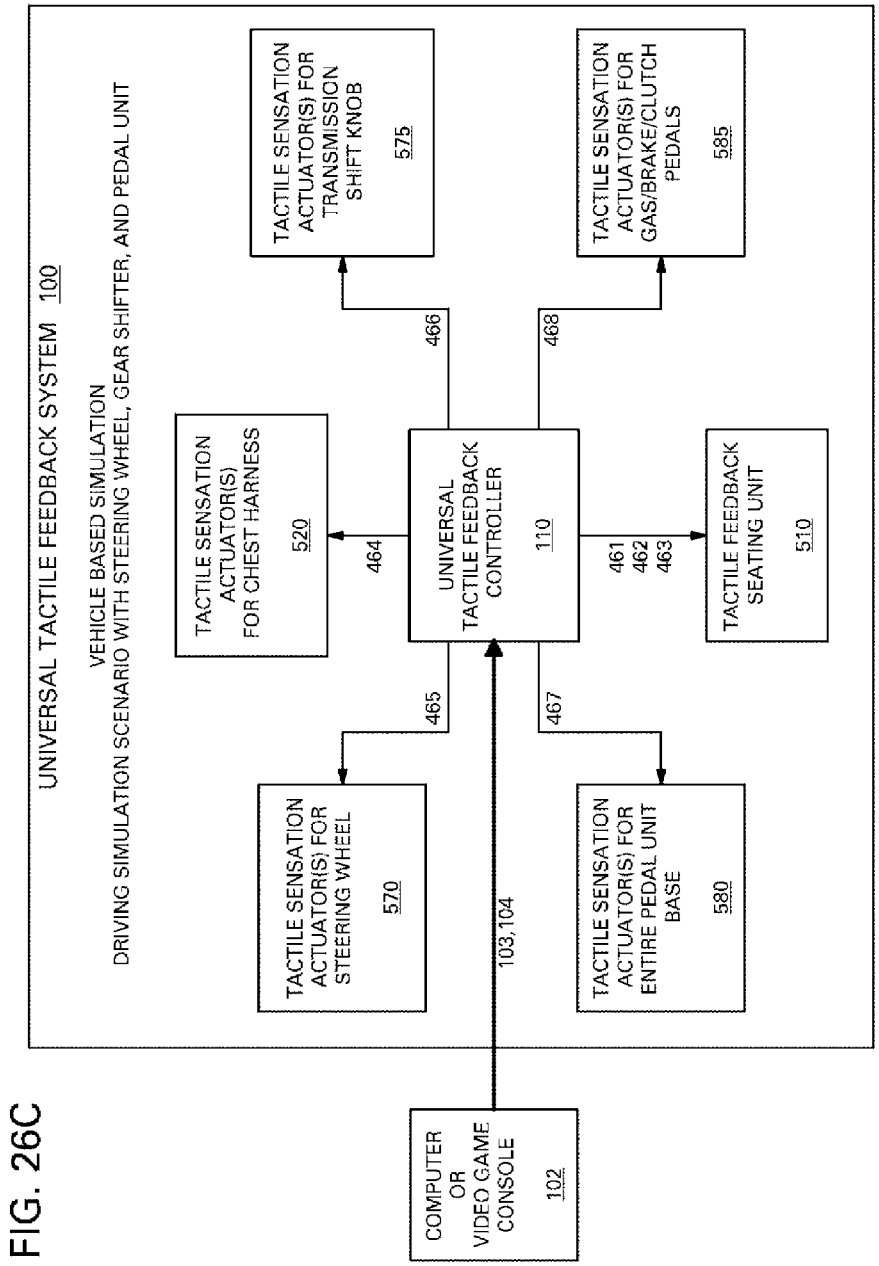
FIG. 26C depicts a third of four control input device hardware suites.

In FIG. 26C, the driving simulation scenario consists of a steering wheel, a gear shifter, and a pedal unit. The same tactile feedback seating unit 510 and chest harness 520 that are used in the flight are the peripheral tactile sensation actuators and the control input devices that they are applied to. In an example implementation, the tactile sensation actuators for the steering wheel 570 are attached to one or more of the spokes that connect the steering wheel to its hub. These actuators can be attached with a two part housing, the two parts of which sandwich any given steering wheel spoke, with one of the two parts containing a vibratory motor. The two parts can be fastened together with screws and screw receptacles, or with some commonly implemented equivalent, such as nuts and bolts or mating snap connectors. These connectors could be made to specifically match any given specific steering wheel spoke design, or can be implemented as a general purpose attachment. In other possible implementations, actuators could be mounted on the center hub of the steering wheel, or within the steering wheel itself. Additionally, small motors may be inserted into the palm area of a pair of padded driving gloves that are worn by the user.

Where possible, a tactile sensation actuator is embedded within the shift knob itself 575. This is accomplished with a plastic replacement shift knob, which contains an internal vibratory motor. The replacement knob can be fashioned with two halves that screw or snap together, where an internal cavity can accommodate an vibratory actuator. Alternatively, it can be a one piece unit with an internal cavity within which a vibratory actuator is placed. Additionally, the shift knob may also contain a solenoid that can strike the knob internally, in order to simulate the knocking and grinding of gears within the simulated transmission that would result from poorly timed shifts. To accommodate the various shaft diameters upon which the replacement shift knob fits, the hole for the shaft in the bottom of the knob can accommodate horizontal screws that can be tightened to solidly attach the knob to the varying shafts. Alternatively, the hole for the shaft in the bottom of the knob can be lined with dense, elastic foam, such that the knob can be twisted onto a shaft, so that the knob will not readily come off the shaft without a direct intention to remove it. The knob may also be designed to be substantially equivalent to the knob it replaces, such that it can fit directly upon the provided shaft just as the original knob does.

Tactile sensation actuators are mounted to the pedal base unit 580, thereby simulating vibration that would normally be felt through the floor of the vehicle. Essentially, a vibratory actuator within a plastic housing can be attached to the pedal base unit with hook and loop fasteners or two sided adhesive foam tape. One or more actuators can be used as desired. Tactile sensation actuators can be implemented within the provided pedals that protrude from the base of the pedal unit, such as gas, brake, and clutch pedals 585. Alternatively, actuators can be attached to the pedals with hook and loop fasteners or adhesive foam tape. The brake pedal actuator(s) can simulate such things as braking resistance, wheel lock-up, and anti-lock brakes, with vibratory motors or solenoids, or both. The clutch pedal actuator(s) can simulate such things as clutch slippage and poorly timed shifts in a similar manner.

Ultimately, in the typical driving simulation scenario depicted in FIG. 26C, comprised of a steering wheel, gear shift, and floor pedal base with individually functioning pedals, where tactile sensation actuators are distributed throughout these disparate control input devices 570, 575, 580, 585, and simultaneously within a seating unit 510 and a chest harness 520, or some subset thereof, the simulation user will be exposed to tactile sensations that help to convince his or her senses that the simulation is real. Furthermore, due to the substantially unified manner of operation these disparate tactile feedback devices, the driving simulation user will benefit from the illusion that these disparate devices are all attached to the same physical structure.

Figure 26D:
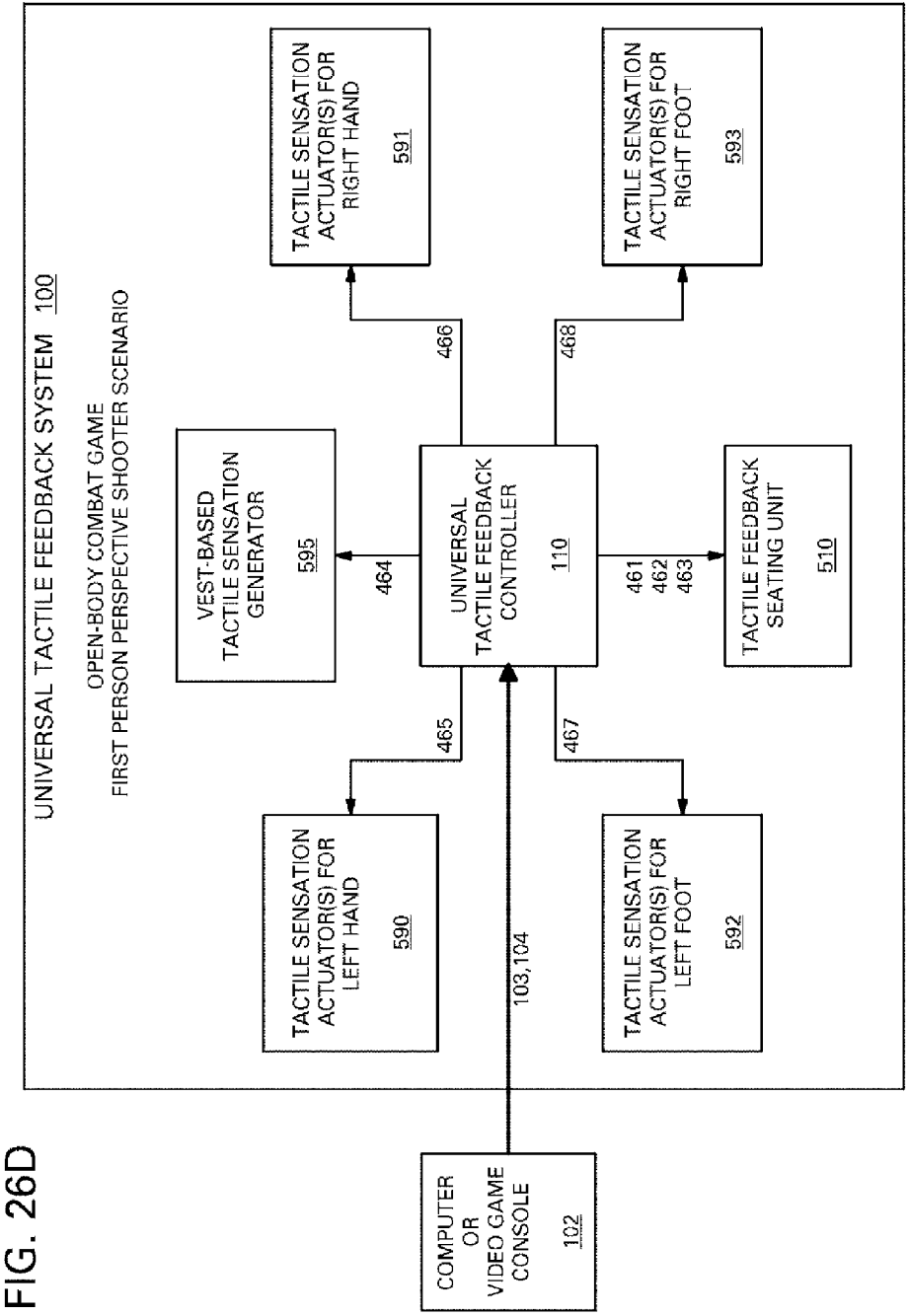
FIG. 26D depicts a fourth of four common control input device hardware suites.
Figure 39:
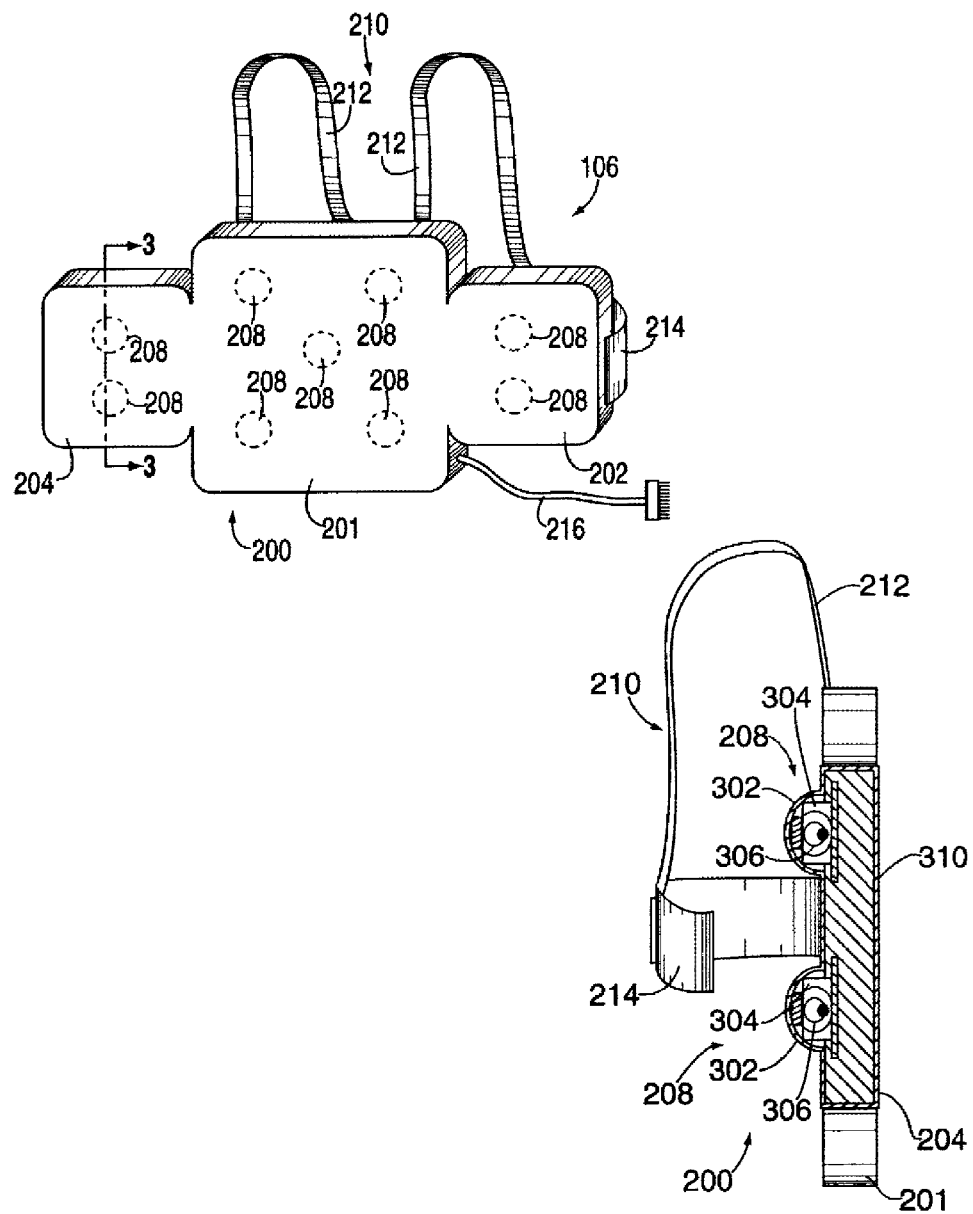
FIG. 39 depicts a front and side view of a vest-based tactile sensation generator.

In FIG. 26D, the first person perspective open-body combat game, the central tactile feedback device is a vest-based tactile sensation generator 595. This vest-based tactile sensation generator can apply localized tactile sensation, typically via vibratory and solenoid based actuators, to many areas around the game player's torso. In this manner, environmental stimuli (e.g., bullet strikes, weapon strikes, energy fields, and so on) can be rendered in a directional manner. This can provide the game user with information regarding the location of the source, and the strength and direction of the attacks or stimuli. FIG. 39 illustrates a front and side view of a vest-based tactile sensation generator, respectively. U.S. Pat. No. 5,565,840 "Tactile Sensation Generator" is such a device. The vest-based tactile sensation generator 595 has additional uses as well. In vehicle simulation scenarios, such as those illustrated in FIGS. 26A-26C, the vest based tactile sensation generator 595 can render directional G forces during vehicle maneuvering. FIG. 26D also includes a tactile feedback seating unit 510 as previously described. As games and simulations get more complex, it is becoming more common to have games where the mode of transportation changes from a simulated character who is walking, running, or otherwise navigating through the simulated environment, who then jumps into some available vehicle, and then proceeds to drive the vehicle. In this case, the tactile feedback seating unit 510 can generate appropriate tactile feedback as necessary. Therefore, in many cases, the vest-based tactile sensation generator 595 and the tactile feedback seating unit 510 can work interchangeably, or simultaneously, in a synergistic fashion.

The number of control input devices that can be used to control any given first person perspective shooter are as numerous as the types of controllers that exist in the marketplace. Joysticks, 360 degree spin controllers, gamepads, mice, trackballs, light guns, and 3D controllers, are some of the types of controllers that are available. In FIG. 26D, for simplicity, the peripheral tactile sensation actuators are described by the human appendage they are intended for. The tactile sensation actuator for the left hand 590 and right hand 591 can exist within the appropriate device or devices, within a pair of gloves worn by the user, or can be attached to the appropriate device or devices with elastic straps. The tactile sensation actuators for the left foot 592 and right foot 593 can be worn by the user via elastic straps, or, where applicable, can be attached to or embedded within the appropriate control input device or devices.

Generally, all of the peripheral tactile sensation actuators of FIGS. 26A-26D are vibratory motors enclosed in plastic housings that have some simple attachment means for attaching the vibratory motors to a given control input device. The vibration produced by any given motor can effectively transmit through its hard plastic housing and the attachment means, ultimately causing vibration within the attached control input device. The size and shape of the motor and its plastic housing are determined by the control input device they are meant to be attached to. The attachment means is most often hook and loop fasteners, although many other attachment means are readily available. In most cases, a peripheral tactile sensation actuator will be comprised of a DC motor with an offset weight on its shaft, a capacitor and diode across the motor's terminals, with a four to eight foot power distribution cable, that ends in some appropriate power connector. The electronic apparatus within each actuator is very simple, and the housing and attachment means can be readily adapted to accommodate any given device. All four scenarios depicted in FIGS. 26A-26D, and the tactile sensation apparatus within those scenarios, are illustrative. The provided scenarios should not be interpreted to imply any specific limitations on possible tactile sensation actuators, tactile sensation generators, and the control input devices that they are applied to or embedded within.

In FIGS. 26A-26D, the tactile feedback seating unit 510 is a semi-rigid flexible foam structure, sealed with a cloth or vinyl layer, with a leg portion and a back portion, substantially shaped to easily rest upon any given seat, with a plurality of actuators embedded within the foam structure, such that the actuators in the pad produce localized vibration. These actuators are laid out in several independent zones within the foam, providing a left leg tactile sensation generator, a right leg tactile sensation generator, and a back tactile sensation generator (which may itself be divided into left back and right back tactile sensation generators), such that these independent tactile sensation generators exist within the single tactile feedback seating unit 510. Furthermore, each tactile sensation generator zone within the seat may itself be made up of one or more tactile sensation actuators 501. Illustrative examples regarding tactile feedback seating units are depicted in FIGS. 27A, 27C, 28A, and 28C.

Figure 27A:
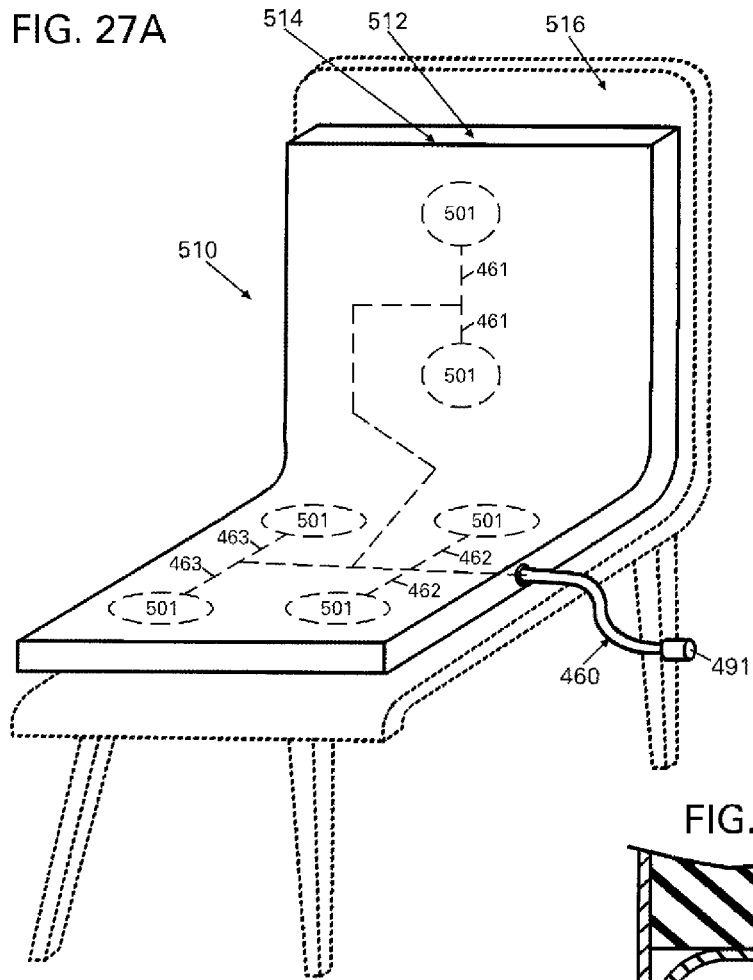
FIG. 27A illustrates a tactile feedback seating unit with six actuators.

In FIG. 27A, the tactile feedback seating unit 510 is composed of a semi-rigid flexible foam structure 512, within which six actuators 501 are embedded. The embedded actuators are arranged into three pairs, providing a back tactile sensation generator zone containing two actuators connected to power distribution line 461, a left leg tactile sensation generator zone containing two actuators connected to power distribution line 462, and a right leg tactile sensation generator zone containing two actuators connected to power distribution line 463. These three power distribution lines 460 are terminated by a DIN8 connector 491. The power distribution wiring 461, 462, 463, the foam structure 512, and the actuators 501, are all sealed within the tactile feedback seating unit 510 by a fabric or vinyl layer 514.

Figure 27B:
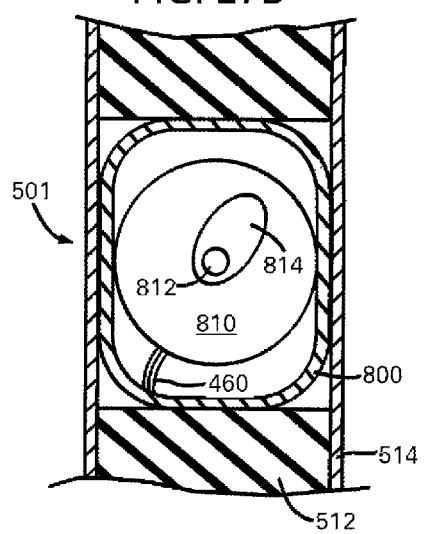
FIG. 27B illustrates the tactile sensation actuators that are embedded within the tactile feedback seating unit.

FIG. 27B illustrates the tactile sensation actuators 501 that are embedded within the tactile feedback seating unit 510. A power distribution line 460 powers a DC motor 810 that has an offset weight 814 attached to its shaft 812. When the shaft 812 of the motor 810 rotates, the offset weight 814 induces vibration. Each motor 810 is enclosed in a housing 800, which can be made of metal or plastic. The housing is embedded within the foam 512, and ultimately sealed inside the tactile feedback seating unit 510 by a fabric or vinyl layer 514.

In FIG. 27C, the tactile feedback seating unit 510 is composed of a semi-rigid flexible foam structure 512, within which eight actuators 501 are embedded. The embedded actuators are arranged into four pairs, providing a left back tactile sensation generator zone containing two actuators connected to power distribution line 461, a right back tactile sensation generator zone containing two actuators connected to power distribution line 464, a left leg tactile sensation generator zone containing two actuators connected to power distribution line 462, and a right leg tactile sensation generator zone containing two actuators connected to power distribution line 463. These four power distribution lines 460 are terminated by a DIN8 connector 491. The power distribution wiring 461, 462, 463, 464, the foam structure 512, and the actuators 501, are all sealed within the tactile feedback seating unit 510 by a fabric or vinyl layer 514.

In the case of site-based entertainment (arcades, theme parks, trade shows, and so on), where a more permanent seating surface is used, the tactile feedback seating unit 510 can be built into any given seating surface, obviating the need for a portable, self contained unit. In this case, the actuators 501 can be affixed to the underside of a plastic seat, producing localized vibration. Alternatively, heavy duty industrial materials could be used to fashion a foam based seating unit that would be permanently affixed to a given arcade game chassis, for example. Essentially, the seating unit would be similar to those depicted in FIGS. 28A and 28C, but more specifically designed for a given application and increased duty cycle.

Figure 28A:
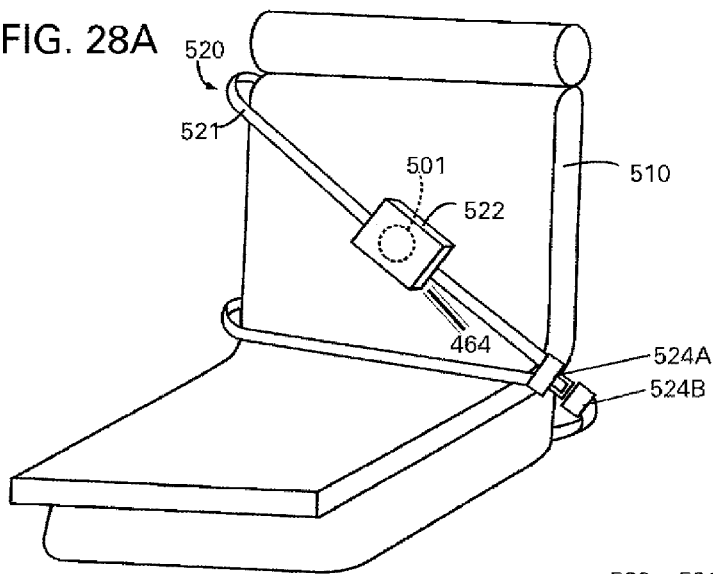
FIG. 28A is a diagram of a chest tactile sensation generator.
Figure 28B:
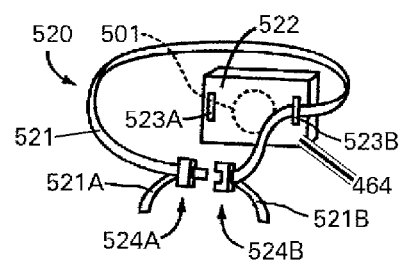
FIG. 28B is a diagram of a chest tactile sensation generator.
Figure 28C:
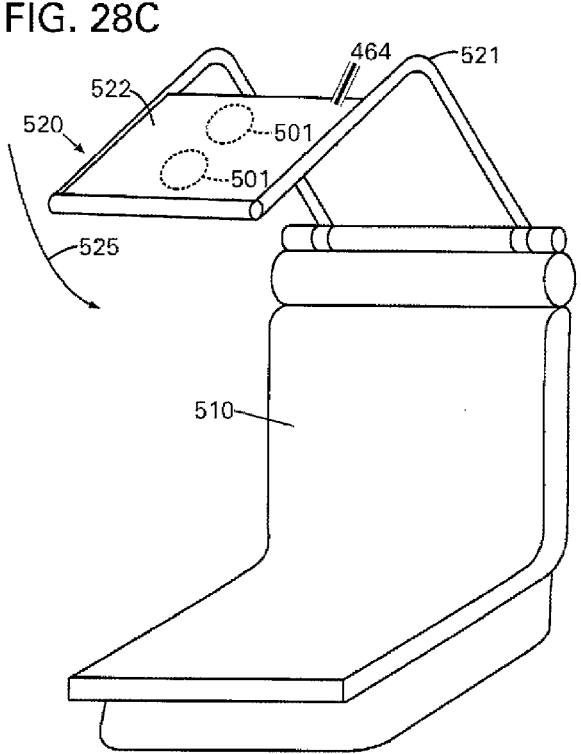
FIG. 28C is a diagram of a chest tactile sensation generator.

In FIGS. 26A-26D, the tactile sensation actuator(s) for a chest harness 520 are one or more vibratory actuators that are embedded within or attached to apparatus that places the actuators in contact with the user's chest, such that tactile sensation can be felt on the game player's chest. Illustrative examples of this are depicted in FIGS. 28A-28C. In cases where this device is ignored by the host computer 102, the appropriate "minimum activation value" power output parameter can be set such that this device only produces tactile sensation upon a crash event, for example. In this way, the illusion of restraint by a seat belt or safety harness can be produced.

FIG. 28A is a diagram of a chest tactile sensation generator 520 in a seat belt configuration. An actuator 501 is mounted within a pad 522 that is attached to a seat belt style strap 521, which terminates in a seat belt style connector 524A, that ultimately connects with its corresponding mate 524B. This system generally approximates the seat belt in a typical automobile. Alternatively, this system could be implemented as a five-point racing harness. FIG. 28B is a diagram of a chest tactile sensation generator 520 in a separate chest pad unit. An actuator 501 is mounted within a pad 522 that has loops 523A and 523B that accommodate an elastic strap 521 that has corresponding buckles 524A and 524B on each end of the strap 521. Generally, the user would strap this assembly around his or her chest. The strap 521 can be tightened by pulling on the ends of the strap 521A and 521B after buckle 524A is connected to buckle 524B. FIG. 28C is a diagram of a chest tactile sensation generator 520 in a drop-down safety harness configuration. The actuators 501 are mounted within the part of the drop-down restraint 522 that lays upon the chest of the person sitting in the tactile feedback seating unit 510. The arm 521 of the drop-down safety harness moves the chest restraint 522 along path 525 until it contacts the chest of the person in the seat. In FIGS. 28A-28C, the actuators are powered by power distribution cable 464.

Generally, all of the peripheral tactile sensation actuators of FIGS. 26A-26D are vibratory motors enclosed in plastic housings that have some simple attachment means for attaching the vibratory motors to a given control input device. This is illustrated in FIGS. 29A-29D. In some cases, solenoids can be used, as illustrated in FIG. 29E. In FIGS. 29A and 29B, a DC motor 810 has an offset weight 814 attached to its shaft 812. A power distribution cable 460 powers the motor 810 in order to induce vibration. In FIGS. 29C and 29D, the DC motor 810 is enclosed in a housing 800 that is typically composed of plastic, although metal or other housing material can be used as well. In an example embodiment, plastic is used for the housing 800 because it can be molded into any desirable shape to accommodate any given application. In order to enclose the motor 810 in the custom plastic housing 800, the housing 800 has two parts 800A and 800B, that can be screwed, glued, or snapped together to solidly seal the motor within the housing 800. In FIG. 29E, a solenoid 820 uses its plunger 822 to strike the housing 800 when the solenoid is energized by its power distribution cable 460. A return spring 824, and a spring restraint pin 826 (or equivalent) force the plunger 822 to return to its initial position when the solenoid is de-energized. In other implementations, the solenoid plunger can actuate a lever that pushes through an opening in the housing 800, such that the lever can strike an object outside of the plastic housing 800. Generally, any number of applications can be derived from the productivity of motors 810 and/or solenoids 820. The activity of any given motor or solenoid can effectively transmit through its hard plastic housing and an attachment means, ultimately causing sympathetic vibration or other tactile event within the attached control input device. The size and shape of the motor 810 and/or solenoid 820, and the plastic housing 800, are determined by the control input device they are meant to be attached to, and the desired effect. In any case, the housing 800 is attached to the desired control input device by some attachment means.

Figure 30A:
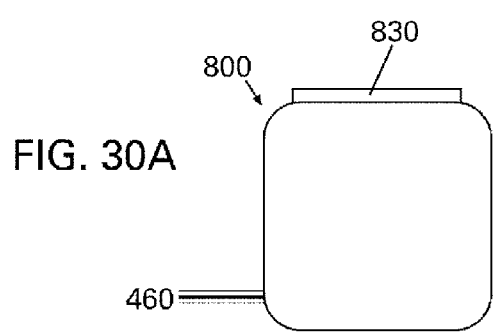
FIG. 30A illustrates the housing having an attachment means of a two-sided adhesive strip.
Figure 30B:
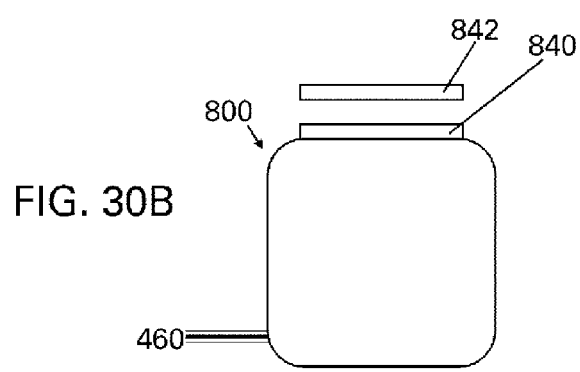
FIG. 30B illustrates the housing having an attachment means of two corresponding halves of hook and loop fasteners.
Figure 30C:
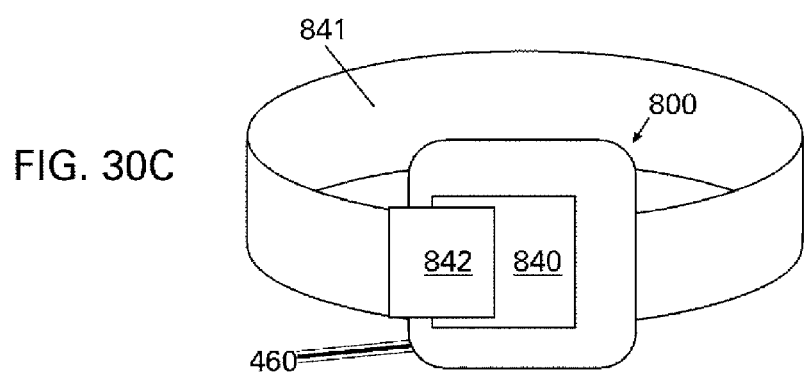
FIG. 30C illustrates a hook and loop fastening means affected upon a strap.

In FIG. 30A, the housing 800 has an attachment means of a two-sided adhesive strip 830. In FIG. 30B, the housing 800 has an attachment means of two corresponding halves of hook and loop fasteners. Typically, the hook half 840 of the attachment means is attached to the housing 800, and the loop half 842 of the attachment means is attached to the desired control input device. This yields a less permanent attachment means than two sided adhesive strips. In FIG. 30C, the loop fastener 842 is not attached to the desired control input device, but is instead attached to one end of a strap 841 of elastic fabric, non-elastic fabric, rubber, or some other material. The other end of the strap 841 is permanently attached to the housing 800. This allows the strap 841 to hold the housing 800 tightly against the desired control input device. This solution is the least permanent attachment means.

The attachment means is most often the hook and loop fasteners of FIG. 30B, although many other attachment means are readily available and can be substituted as necessary. Generally, a peripheral tactile sensation generator will be comprised of a DC motor with an offset weight on its shaft, all within a plastic housing, with an eight to ten foot power distribution cable 460, that ends in some appropriate power connector for the power jacks illustrated in FIG. 26. Essentially, the electronic apparatus within each peripheral tactile sensation generator is very simple, and the housing and attachment means can be readily adapted to accommodate any given device. All four scenarios depicted in FIGS. 26A-26D, and the tactile sensation apparatus within those scenarios, are illustrative. The provided scenarios should not be interpreted to imply any specific limitations on possible tactile sensation actuators, tactile sensation generators, and the control input devices that they are applied to or embedded within.

In FIG. 26A, the tactile sensation actuator(s) for a stand alone throttle and weapons controller 530 will generally be comprised of two possible forms. In one form, small vibratory actuators can be affixed to or embedded within the throttle's handle, such that the hand of the user, in holding the throttle, will come into direct or indirect contact with these small vibratory motors. In one illustrative form, a vibratory actuator can be attached to outer side of the throttle handle with hook and loop fasteners or two sided adhesive foam tape (or some other readily available attachment means), such that the actuator is substantially out of the way, and therefore will not interfere with the motion of the throttle body or the ergonomics of the throttle handle. This is illustrated in FIGS. 31A-31H.

Figure 31A:
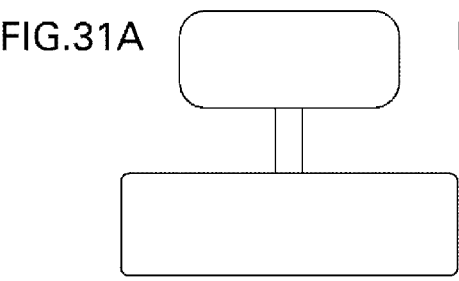
FIG. 31A is a rear side view of a center-mounted throttle.
Figure 31B:
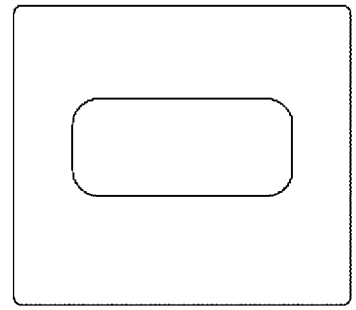
FIG. 31B is a top down view of a center-mounted throttle.
Figure 31C:
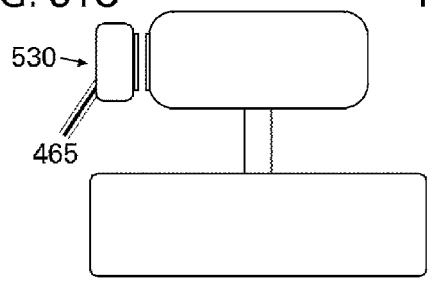
FIG. 31C depicts a throttle tactile sensation generator.
Figure 31D:
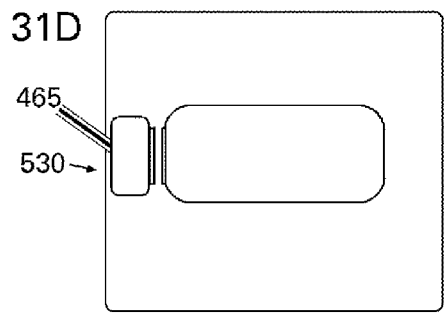
FIG. 31D is a top down view of the apparatus of FIG. 31C.
Figure 31E:
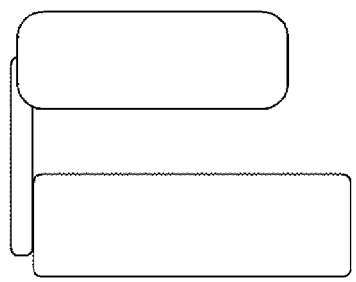
FIG. 31E is a rear side view of a side-mounted throttle.
Figure 31F:
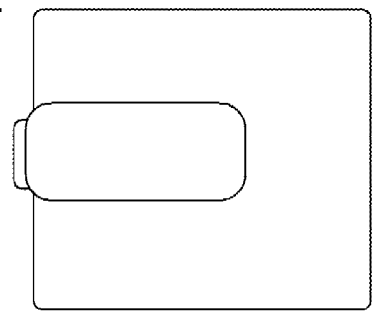
FIG. 31F is a top down view of a side-mounted throttle.
Figure 31G:
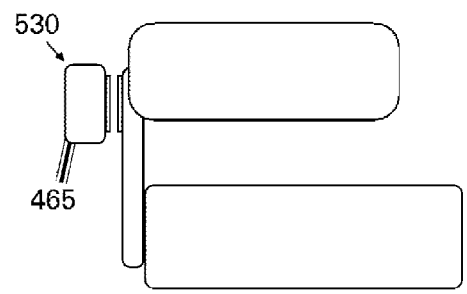
FIG. 31G depicts a throttle tactile sensation generator.
Figure 31H:
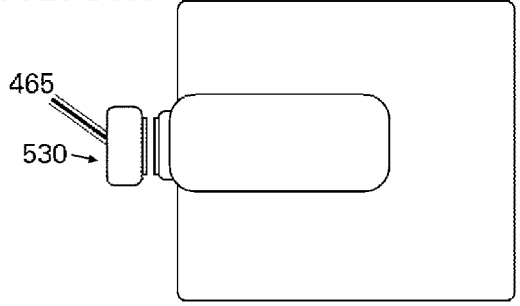
FIG. 31H is a top down view of the apparatus of FIG. 31G.

FIG. 31A is a rear side view of a center-mounted throttle. FIG. 31B is a top down view of a center-mounted throttle. FIG. 31C depicts a throttle tactile sensation generator 530 attached to the outer side of the throttle handle with the attachment means of FIG. 30B, such that when the throttle is moved through its range of motion, the tactile sensation generator 530 does not interfere with the motion of the throttle or the ergonomics of the throttle handle. FIG. 31D is a top down view of the apparatus of FIG. 31C, showing the position of the throttle tactile sensation generator 530. FIG. 31E is a rear side view of a side-mounted throttle. FIG. 31F is a top down view of a side-mounted throttle. FIG. 31G depicts a throttle tactile sensation generator 530 attached to the outer side of the throttle handle with the attachment means of FIG. 30B, such that when the throttle is moved through its range of motion, the tactile sensation generator 530 does not interfere with the motion of the throttle or the ergonomics of the throttle handle. FIG. 31H is a top down view of the apparatus of FIG. 31G, showing the position of the throttle tactile sensation generator 530. In the case of the illustrated throttle tactile sensation generator 530 of FIGS. 31C, 31D, 31G, and 31H, power distribution cable 465 is used to power the illustrated tactile sensation generator.

One solution for the placement of the throttle tactile sensation generators, however, is inside the throttle handle itself at the point of manufacture. This will make the tactile sensation generators invisible. If implemented at the point of manufacture, a small housing for the actuator can be molded directly into the structure of the throttle handle, such that the actuator can be readily affixed to the inside surface of the throttle handle. If implemented as an after market solution, the end user would have to open the throttle handle with a screwdriver or hex tool (or similar means as necessary), and affix an actuator to the inside of the throttle with two sided adhesive tape (see FIG. 30A), epoxy resin, or some other means. To accommodate the power distribution cable 465, a small hole may have to be drilled in the throttle's handle such that the cable 465 can pass through.

Referring again to FIG. 26A, the tactile sensation actuator(s) for a flight control joystick 540 are implemented in a similar fashion to the actuators for the throttle and weapons controller 530.

Figure 32A:
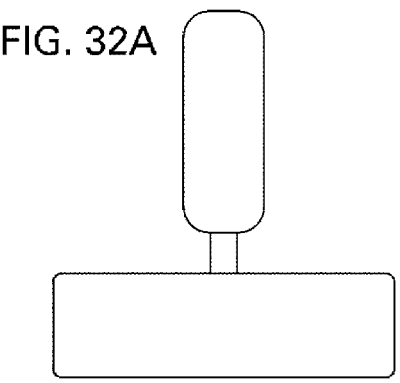
FIG. 32A is a rear side view of a joystick.
Figure 32B:
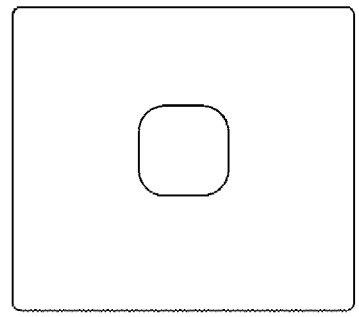
FIG. 32B is a top down view of a joystick.
Figure 32C:
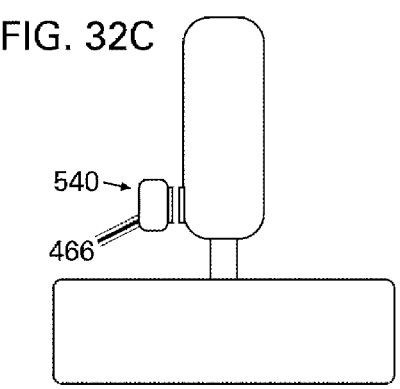
FIG. 32C is a rear side view of a joystick, with a tactile sensation actuator attached to its shaft.
Figure 32D:
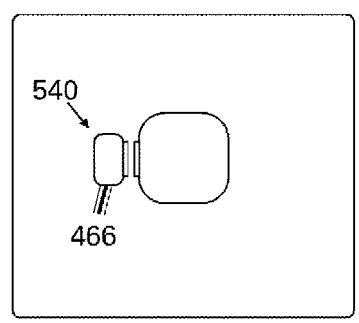
FIG. 32D is a top down view of the apparatus of FIG. 32C.
Figure 32E:
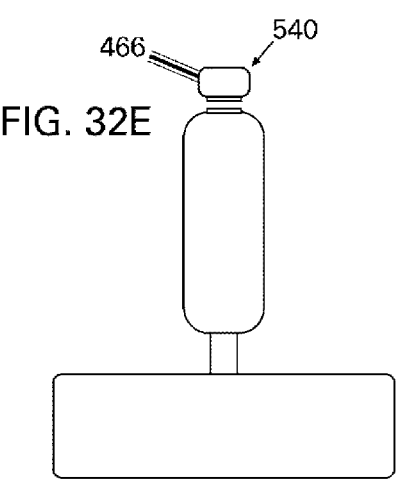
FIG. 32E is a rear side view of a joystick, with a tactile sensation actuator attached to its shaft.
Figure 32F:
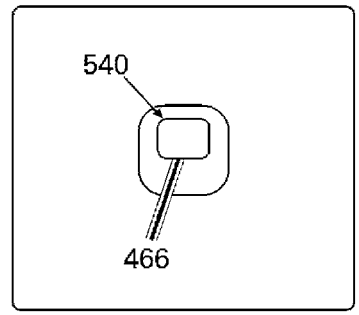
FIG. 32F is a top down view of FIG. 32E.

FIG. 32A is a rear side view of a joystick. FIG. 32B is a top down view of a joystick. FIG. 32C is a rear side view of a joystick, with a joystick tactile sensation generator 540 attached with the attachment means of FIG. 30B, in a position opposite and below the user's palm. This area is generally available, and can be utilized without substantially disrupting the function of the joystick, or the ergonomics of the joystick's handle. FIG. 32D is a top down view of the apparatus of FIG. 32C. FIG. 32E is a rear side view of a joystick, with a joystick tactile sensation generator 540 attached to the top of the joystick with the attachment means of FIG. 30B. FIG. 32F is a top down view of FIG. 32E. In the case of the illustrated joystick tactile sensation generator 540 of FIGS. 32C-32F power distribution cable 466 is used to power the illustrated tactile sensation generator.

One solution for the placement of the joystick tactile sensation generators, however, is inside the joystick handle itself at the point of manufacture.

Referring to FIGS. 26A-26B, both the tactile sensation actuator(s) for the left pedal on a rudder control 550, and the tactile sensation actuator(s) for the right pedal on a rudder control 560, together comprise a pair of independent tactile sensation generators that can be affixed to or embedded within both pedals on a rudder pedal unit.

Figure 33A:
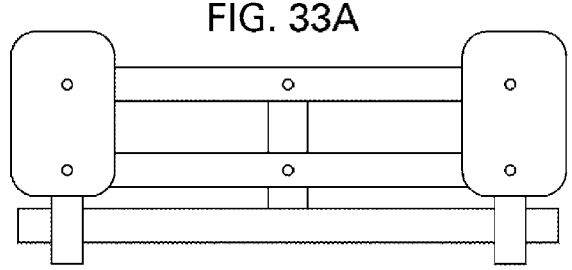
FIG. 33A is a top down view of a rudder pedals control input device.
Figure 33B:
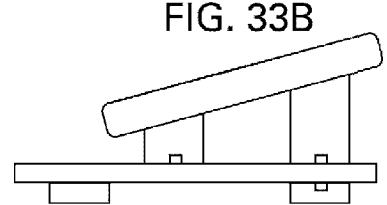
FIG. 33B is a right side view of a rudder pedals control input device.
Figure 33C:
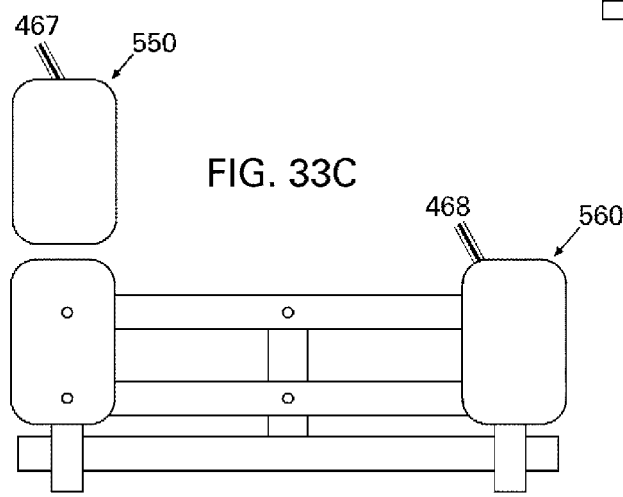
FIG. 33C illustrates tactile sensation enhanced replacement pedal surfaces.
Figure 33D:
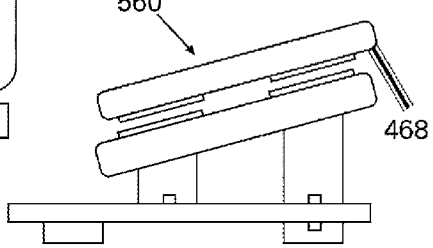
FIG. 33D is a right side view of the apparatus of FIG. 33C.
Figure 33E:
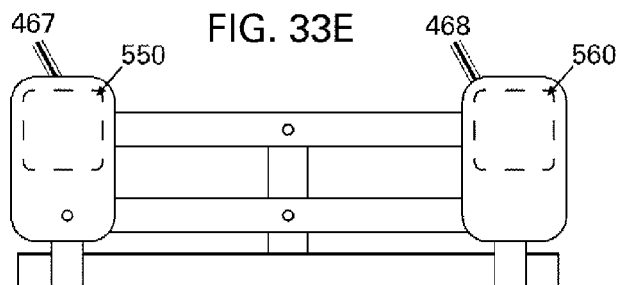
FIG. 33E illustrates tactile sensation generators affixed to the underside of each rudder pedal.
Figure 33F:
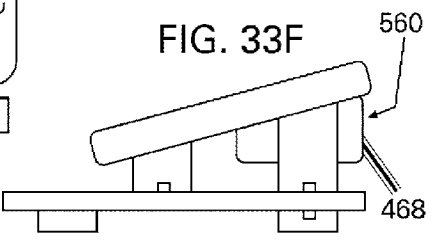
FIG. 33F is a right side view of the apparatus of FIG. 33E.

Referring to FIG. 33A, a top down view of a rudder pedals control input device is depicted. FIG. 33B is a right side view of a rudder pedals control input device. In FIG. 33C, replacement pedal surfaces 550,560 contain tactile sensation actuators, such that when the new pedal surface is affixed to the existing pedals, the new pedal surface contains tactile sensation generation capability. FIG. 33D is a right side view of the apparatus of FIG. 33C. In FIG. 33E, tactile sensation generators 550,560 are affixed to the underside of each rudder pedal. This is one solution, as the ergonomics of the rudder pedals remain unaffected. These tactile sensation generators may be attached to the rudder pedals at their point of manufacture as well. FIG. 33F is a right side view of the apparatus of FIG. 33E. In FIGS. 33C-33F, the attachment means of FIG. 30B is used. Additionally, the left foot 550 and right foot 560 tactile sensation generators are powered by power distribution cables 467 and 468, respectively.

In FIG. 26B, a two-handed flight control yolk, typical for civilian aircraft simulations, replaces the left-handed throttle and right handed flight control joystick of FIG. 26A.

Figure 34A:
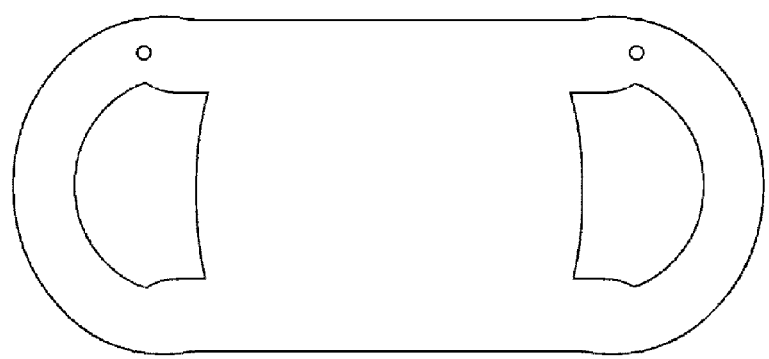
FIG. 34A is a front view of a flight control yolk's handle.
Figure 34B:
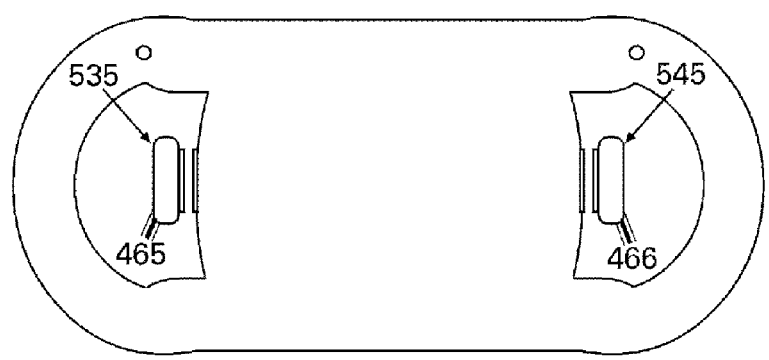
FIG. 34B is the apparatus of FIG. 34A, wherein left and right hand control yolk tactile sensation generators are applied.
Figure 34C:
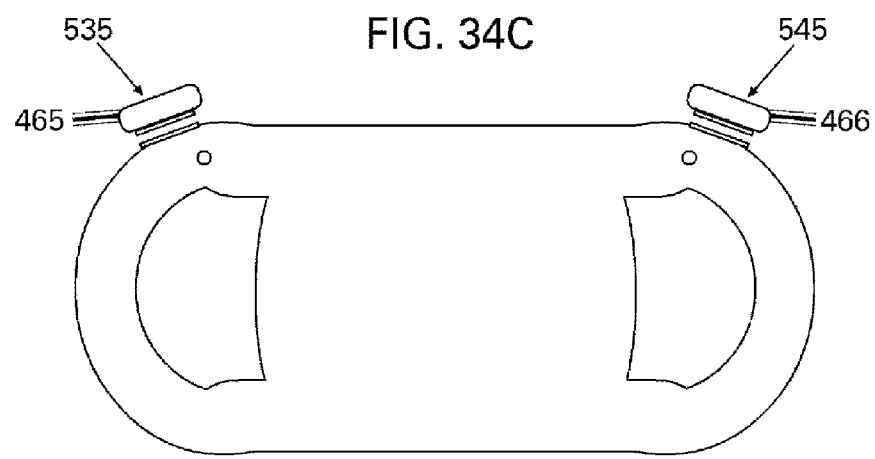
FIG. 34C is the apparatus of FIG. 34A, with left and right hand tactile sensation generators applied in upper outside positions on the control yolk's two handles.
Figure 34D:
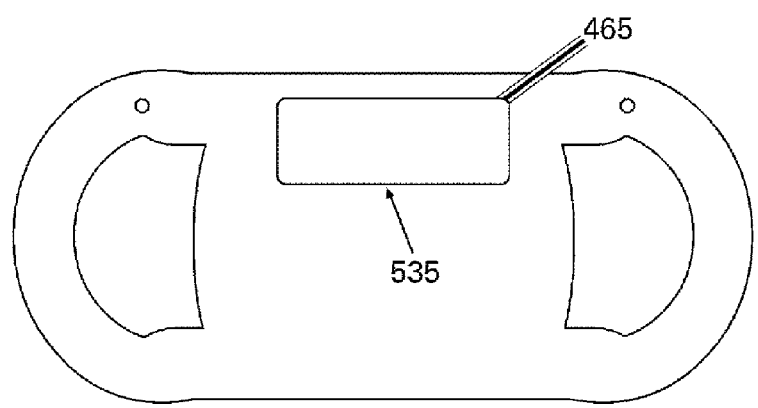
FIG. 34D is the apparatus of FIG. 34A, with a larger, single tactile sensation generator applied.

Referring now to FIG. 34A, a front view of a control yolk's handle is depicted. FIG. 34B is the apparatus of FIG. 34A, wherein a left hand control yolk tactile sensation generator 535 is applied to the main body of the control yolk near the left handle of the control yolk, and a right hand control yolk tactile sensation generator 545 is applied to the main body of the control yolk near the right handle of the control yolk. FIG. 34C is the apparatus of FIG. 34A, with left and right hand tactile sensation generators 535,545 applied in upper outside positions on the control yolk's two handles. FIG. 34D is the apparatus of FIG. 34A, with a larger, single tactile sensation generator 535 replacing or augmenting the tactile sensation generators of FIGS. 34B and 34B. In FIGS. 34B-34D, the attachment means of FIG. 30B are used. Furthermore, power distribution cables 465 and 466 are used to power the control yolk tactile sensation actuators. In an example embodiment, the tactile sensation generators of FIGS. 34B-34D would be implemented within the control yolk's handle at the point of manufacture.

Ultimately, in the flight simulation scenarios depicted in FIG. 26A (comprised of a joystick, throttle, and rudder pedals) and FIG. 26B (a control yolk and rudder pedals), where tactile sensation generators are distributed throughout these control input devices 530, 540, 550, 560, and simultaneously within a seating unit 510 and a chest harness 520, or some subset thereof, the simulation user will be exposed to tactile sensations that help to convince his or her senses that the simulation is real. Furthermore, due to the substantially unified manner of operation these disparate tactile feedback devices, the flight simulation user will benefit from the illusion that these disparate devices are all attached to the same physical structure.

Referring to FIG. 26C, the driving simulation scenario consists of a steering wheel, a gear shifter, and a pedal unit. The same tactile feedback seating unit 510 and chest harness 520 that are used in the flight simulation scenarios (FIGS. 26A and 26B) are also implemented in the driving scenario. What has changed are the peripheral tactile sensation actuators and the control input devices that they are applied to. In an example embodiment, the tactile sensation generators for the steering wheel 570 are attached to one or more of the spokes that connect the steering wheel to its hub, as depicted in FIGS. 35A-35D.

Figure 35A:
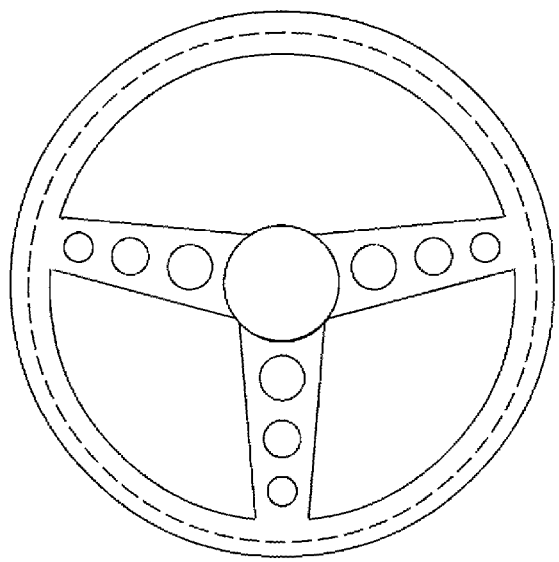
FIG. 35A is a front view of a steering wheel.
Figure 35B:
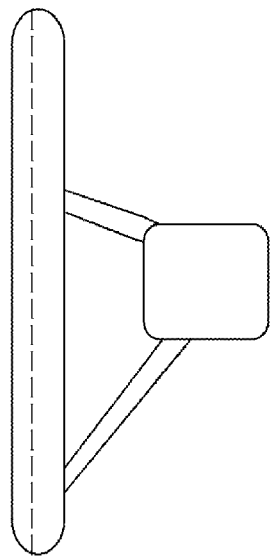
FIG. 35B is a side view of a steering wheel.
Figure 35C:
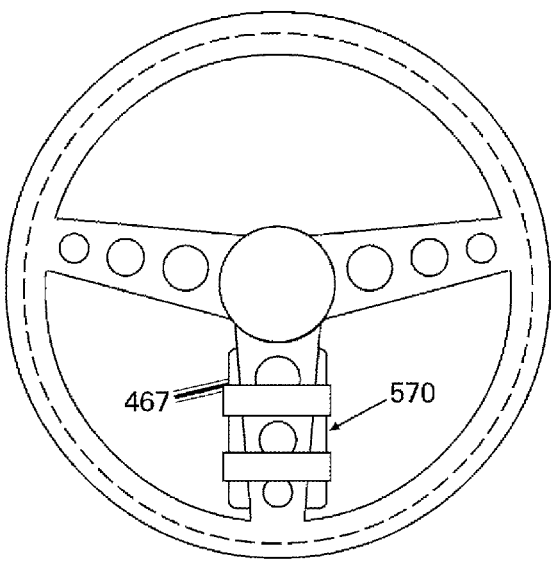
FIG. 35C is a front view of a steering wheel with tactile sensation generator attached to one spoke on the steering wheel.
Figure 35D:
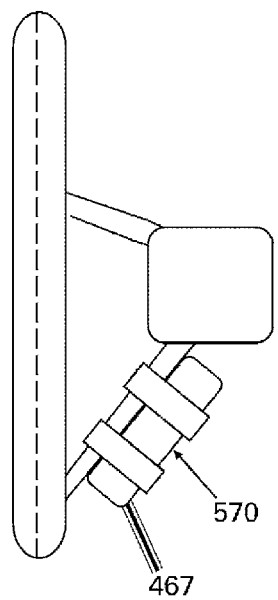
FIG. 35D is a side view of the apparatus of FIG. 35C.

FIG. 35A is a front view of a steering wheel. FIG. 35B is a side view of a steering wheel. FIG. 35C is a front view of a steering wheel, with tactile sensation generator 570 attached to one spoke on the steering wheel with the attachment means of FIG. 30C. FIG. 35D is a side view of the apparatus of FIG. 35C. In this way, the activity of the tactile sensation generator can propagate through the steering wheel. In another implementation, the tactile sensation generator housing of the steering wheel tactile sensation generator 570 can be implemented as a two part housing, the two parts of which sandwich a given steering wheel spoke, with one of the two parts containing a vibratory motor. The two parts can be fastened together with screws and screw receptacles, or with some commonly implemented equivalent, such as nuts and bolts or mating snap connectors. These connectors could be made to specifically match any given specific steering wheel spoke design, or can be implemented as a general purpose attachment. In other possible implementations, tactile sensation generators could be mounted on the center hub of the steering wheel, or within the steering wheel itself. Additionally, small motors may be inserted into the palm area of a pair of padded driving gloves that are worn by the user.

Referring again to FIG. 26C, tactile sensation generators are mounted to the pedal base unit 580, thereby simulating vibration that would normally be felt through the floor of the vehicle. Essentially, a vibratory actuator within a plastic housing can be attached to the pedal base unit with Velcro hook and loop fasteners or two sided adhesive foam tape. One or more actuators can be used as desired. Tactile sensation actuators can be implemented upon the provided pedals that protrude from the base of the pedal unit, such as gas, brake, and clutch pedals 585. Brake pedal actuator(s) can simulate such things as braking resistance, wheel lock-up, and anti-lock brakes, with vibratory motors or solenoids, or both. Clutch pedal actuator(s) can simulate such things as clutch slippage and poorly timed shifts in a similar manner. These items are illustrated in FIGS. 36A-36D.

Figure 36A:
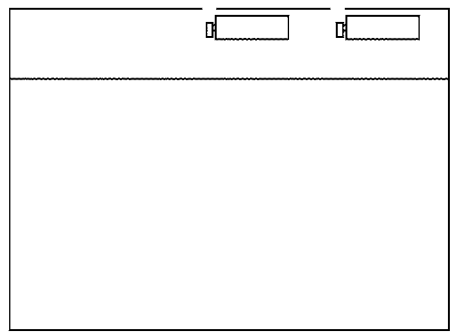
FIG. 36A is a top down view of a pedal unit control input device.
Figure 36B:
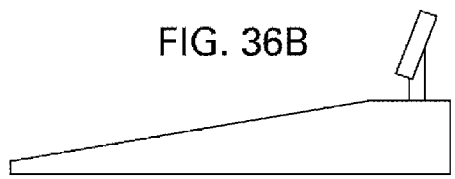
FIG. 36B is a side view of a pedal unit control input device.
Figure 36C:
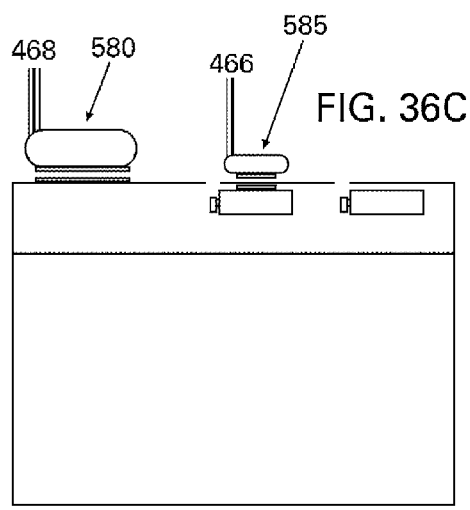
FIG. 36C is a top down view of a pedal unit control input device with tactile sensation actuators attached.
Figure 36D:
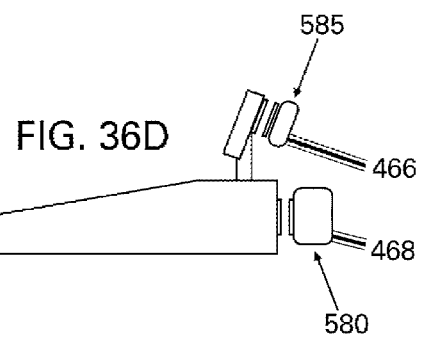
FIG. 36D is a side view of the apparatus of FIG. 36C.

FIG. 36A is a top down view of a pedal unit control input device. FIG. 36B is a right side view of a pedal unit control input device. FIG. 36C is a top down view of a pedal unit control input device, with a pedal base tactile sensation generator 580 attached to the base of the pedal unit, and a brake pedal tactile sensation generator 585 attached to the brake pedal. FIG. 36D is a side view of the apparatus of FIG. 36C. In FIGS. 36C and 36D, the attachment means is that of FIG. 30B, while power distribution cable 468 powers the pedal unit tactile sensation generator 580, and power distribution cable 466 powers the brake pedal unit tactile sensation generator 585. In the brake pedal tactile sensation generator 585, a solenoid (see FIG. 29E) and/or a vibratory motor (see FIG. 29C) can be used.

Figure 37A:
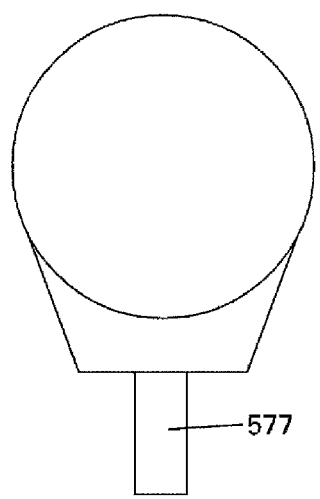
FIG. 37A is a side view of a shift knob upon a shaft.
Figure 37B:
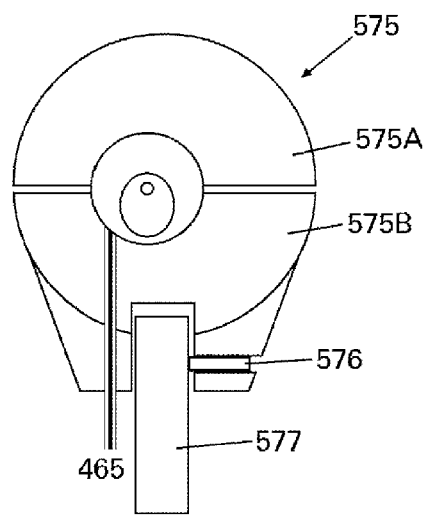
FIG. 37B is a shift knob with an embedded tactile sensation generator.
Figure 37C:
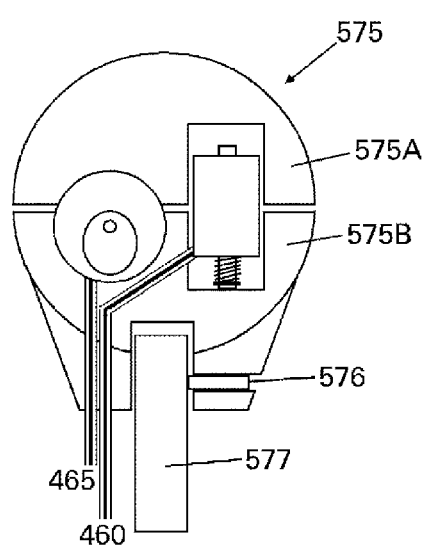
FIG. 37C is the shift knob of FIG. 37B, additionally with an embedded solenoid.
Figure 37D:
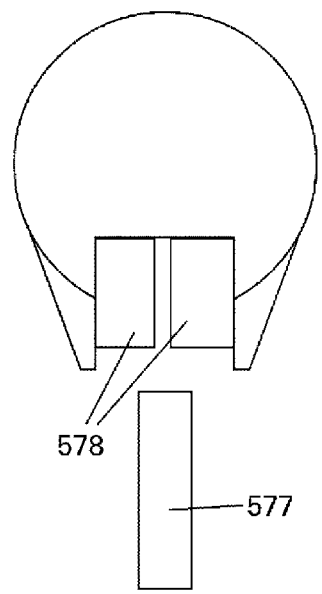
FIG. 37D illustrates a dense foam insert in the interior of the shift knob.

Referring again to FIG. 26C, a tactile sensation actuator is embedded within the shift knob itself 575, when possible. FIG. 37A is a side view of a shift knob upon a shaft. FIG. 37B is a shift knob tactile sensation generator 575, comprised of a housing with two halves 575A and 575B, such that the two halves can accommodate a vibratory motor (see FIG. 29C). A horizontal tightening screw 576 can be tightened such that the shift knob tactile sensation generator 575 becomes firmly attached to the shaft 577. Power distribution cable 465 powers the vibratory motor within the shift knob tactile sensation generator 575. FIG. 37C is equivalent to FIG. 37B in all respects, except that a solenoid (see FIG. 29E) is also contained within the shift knob tactile sensation generator 575. The solenoid is powered by some power distribution cable 460. In FIG. 37D, a dense foam insert 578 lines the interior of the shift knob, such that the shift knob can be twisted upon shafts of varying diameters, and generally remain firmly upon the shaft 577 until twisted off.

Ultimately, in the typical driving simulation scenario depicted in FIG. 26C, comprised of a steering wheel, transmission shift knob, and floor pedal base with individually functioning pedals, where tactile sensation actuators are distributed throughout these disparate control input devices 570, 575, 580, 585, and simultaneously within a seating unit 510 and a chest harness 520, or some subset thereof, the simulation user will be exposed to tactile sensations that help to convince his or her senses that the simulation is real. Furthermore, due to the substantially unified manner of operation these disparate tactile feedback devices, the driving simulation user will benefit from the illusion that these disparate devices are all attached to the same physical structure.

Figure 38A:
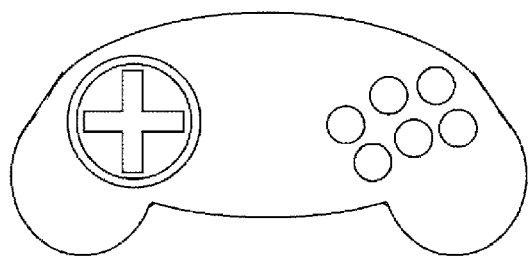
FIG. 38A depicts a front view of an illustrative hand-held control input device.
Figure 38B:
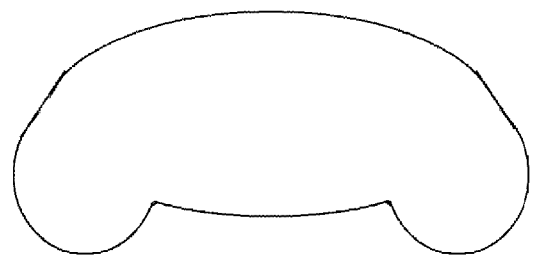
FIG. 38B is the back of the controller as depicted in FIG. 38A.
Figure 38C:
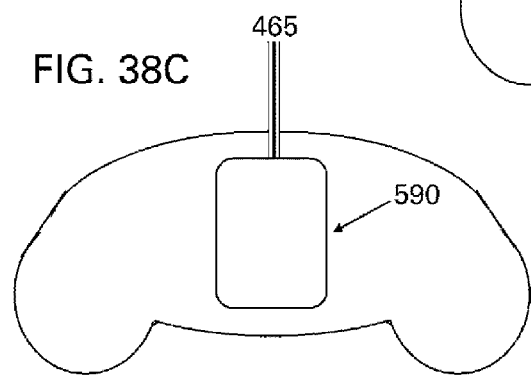
FIG. 38C illustrates a vibratory tactile sensation generator attached to the back of the hand-held control input device.
Figure 38D:
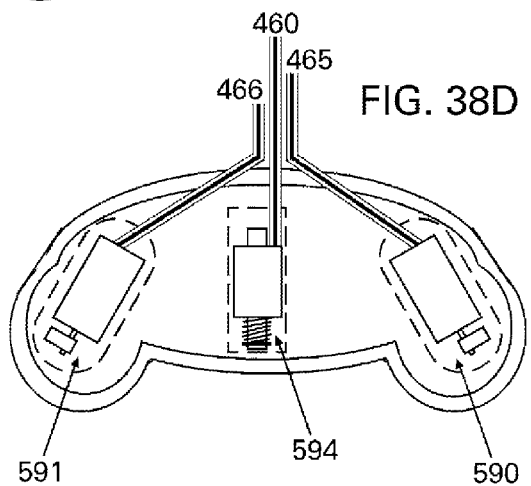
FIG. 38D illustrates tactile sensation generators for the left hand and right hand contained within a single housing, where two motors and one solenoid are embedded within or attached to the hand-held control input device.

In FIG. 26D, the first person perspective open-body combat game, the central tactile feedback device is a vest-based tactile sensation generator 595. One very common control input device used for 1st person perspective combat games, and for most console games, is a hand-held game pad. FIG. 38A depicts a front view of an illustrative hand-held control input device. FIG. 38B is the back of the controller of FIG. 38A. Vibratory motors and/or solenoids can be attached to the hand-held game pad as depicted in FIGS. 38C and 38D. In FIG. 38C, a vibratory tactile sensation generator 590 is attached to the back of the hand-held control input device. The single tactile sensation generator is effective for both hands, due to the small size of the hand-held game controller. In FIG. 38D, tactile sensation generators for the left hand 590 and right hand 591 are contained within a single housing. A first vibratory motor 590 predominantly services the left hand, and a second vibratory motor 591 services the right hand. Additionally, a solenoid 594 rattles the hand-held controller (see FIG. 29E). These tactile sensation generators may be embedded within the hand-held controller at its point of manufacture.

In all cases where small relatively small motors and solenoids are used, batteries can be used as power supplies. In this way, simple digital TTL signals can be used to activate the various tactile sensation actuators. Furthermore, digital signals can be transmitted over wireless communication means, such as infrared and radio links, which would obviate the need for power distribution cables 460. Therefore, it is possible that a given set of distributed tactile sensation generators can be self powered and wireless, while not departing from the incorporated teachings.

Figure 40:
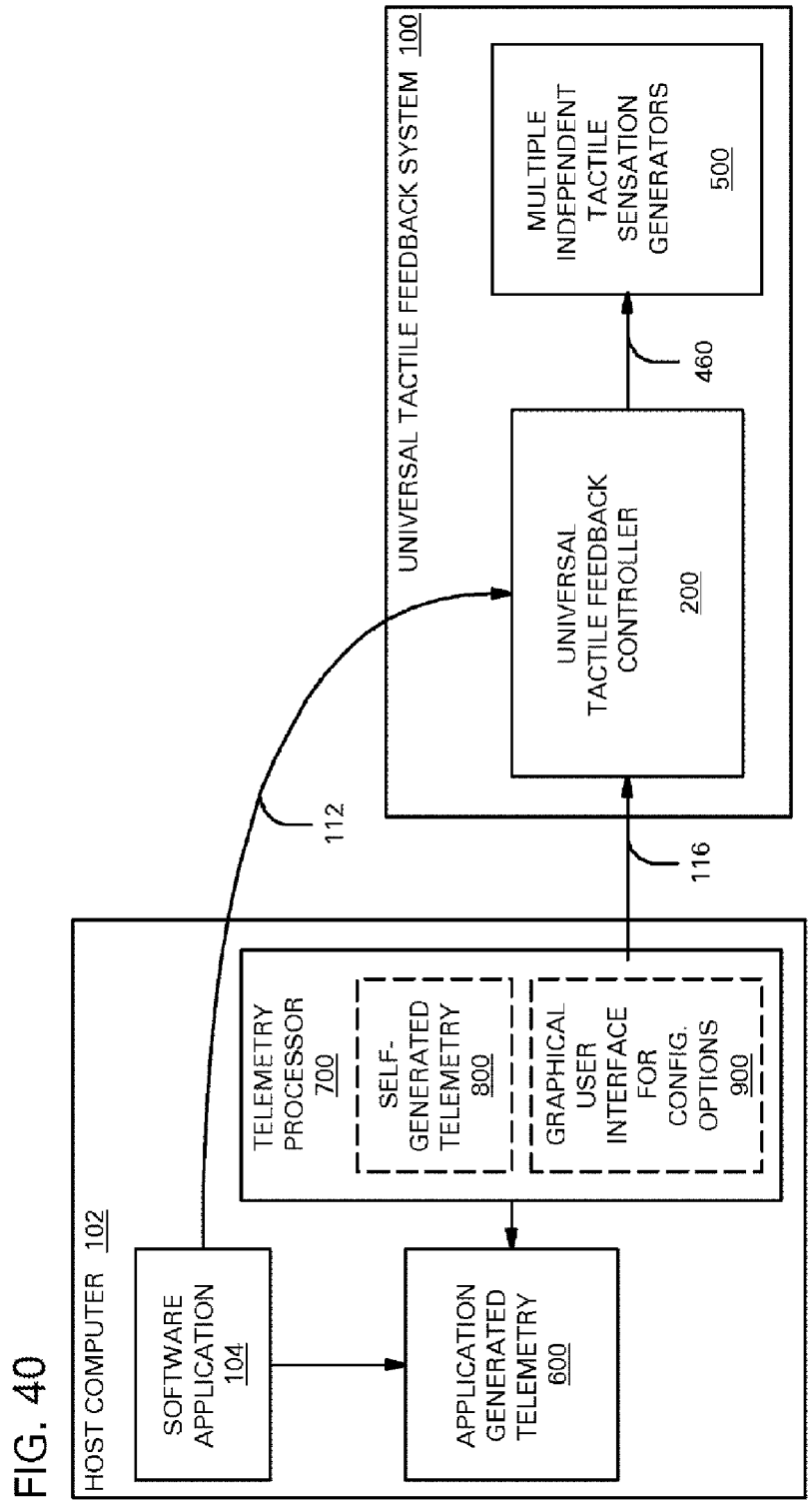
FIG. 40 depicts a block diagram of another example embodiment system.

FIG. 40 depicts a block diagram of another example embodiment system. In FIG. 40, a universal tactile feedback system 100 may interact with a host computer 102. The host computer 102 is connected to the universal tactile feedback controller 200 by an audio connection 112 and/or digital connection 116. The universal tactile feedback controller 200 is connected to multiple independent tactile sensation generators 500 by connection 460. The tactile sensation generators 500 collectively refer to hardware that produces physical sensations that one can feel while interacting with the software application 104. In this illustrative embodiment, no specific limitation is intended for any or all of the connections 112, 116,460 with regard to their particular form, whether analog, digital, wired, wireless, and so on. The host computer 102 is presumed to be the host for some desired software application 104. The software application 104 is the application for which an example embodiment system may generate tactile feedback. If the developers of the given software application 104 have supported the simple telemetry requirement, there will exist application generated telemetry 600. This application-generated telemetry 600 is a simple data structure that contains information about the state of operation of said software application 104. For example, if the software application 104 is a car racing simulation or car racing game, typical telemetry would include the car's engine RPM, the car's MPH, the car's throttle position, lateral G-forces, acceleration, deceleration, brake pedal position, steering wheel deflection, current gear, surface type (e.g., is the car currently on asphalt, dirt, gravel, sand, wet asphalt, icy asphalt, snow, mud, etc.), and damage flags (e.g., are there any flat tires, deformations of the vehicle's body panels, or equipment failures, etc.). This illustrative telemetry is by no means comprehensive, but should be sufficient to illustrate the type of data common to car racing games and/or simulations. It is easy for developers to provide this type of telemetry because they already calculate these variables (and most often many more variables than these) to make their software function properly. Each different game or simulation will have a unique set of telemetry data. The telemetry is entered into a shared data structure by a common memory mapping technique readily understood by those skilled in the art. In the illustrative embodiment, the computer host is running on a Microsoft Windows platform wherein a predetermined shared memory area name is agreed and known to both the software application 104 and the telemetry processor 700. The software application 104 creates the telemetry area by opening a shared memory area with the predetermined shared memory are name. The telemetry processor detects the shared memory area by said predetermined name, and uses the standard Windows coding "Map View Of File" to map the application-generated telemetry 600 into the memory of the telemetry processor 700. This simple operation affords the telemetry processor 700 access to the real-time state data (telemetry) of the software application 104. In short, it allows the telemetry processor 700 to know what is going on inside the software application 104, to the extent and detail inherent in the data structure provided by the software application 104 for the benefit of the application generated telemetry 600 shared memory structure, and ultimately for the benefit of the owners of the universal tactile feedback system 100 and the users of the software application 104. Providing the application generated telemetry 600 is a very simple operation for any reasonably skilled software developer, and even if new to the entire concept, most often it is a process of only several tens of minutes to effectuate the shared memory area once the data structure that is to be mapped there is known.

Continuing with FIG. 40, if a given software developer does not provide the necessary application generated telemetry 600, the telemetry processor 700 can examine the state of the host computer 102 in real time and generate useful telemetry by eavesdropping on the state of the host computer's 102 keyboard, mouse, joystick, and the like. This raw self-generated telemetry 800 is an effective substitute for application-generated telemetry; however, the application-generated telemetry may be advantageous if it is available. When there is no application generated telemetry available, the universal tactile feedback system runs in its host-independent audio analysis mode of operation, which is known by the registered trademark name AudioSense® (U.S. Trademark Registration Number 2261526, registered Jul. 14, 1999). In this case, AudioSense® autonomously generates useful "base level" tactile feedback, which is then "directionally scaled" by the self-generated telemetry 800 that is culled by the telemetry processor 700 from the host computer 102. AudioSense® has no capabilities as of this writing to apply left, and/or right, and/or front, and/or back directional scaling based upon its audio analysis. While an effective technology, it is greatly enhanced by directional scaling from self-generated telemetry 800. The presumption is that if the software application 104 provides application-generated telemetry 600 for the benefit of the telemetry processor, most often AudioSense® will ideally be disabled while such telemetry is available. However, AudioSense® can work simultaneously and cooperatively with application generated telemetry 600 as well, sometimes lending an "analog flavor" to the tactile feedback produced by the universal tactile feedback system 100.

Further in FIG. 40, the telemetry processor 700 provides a graphical user interface 900 for configuring and adjusting the way the available telemetry is utilized. The telemetry processor 700 is itself a software application that manages the available telemetry and performs the processing that converts said telemetry into a useful data stream for generating and/or shaping tactile feedback. More detail will be provided on this later in this disclosure.

Figure 41:
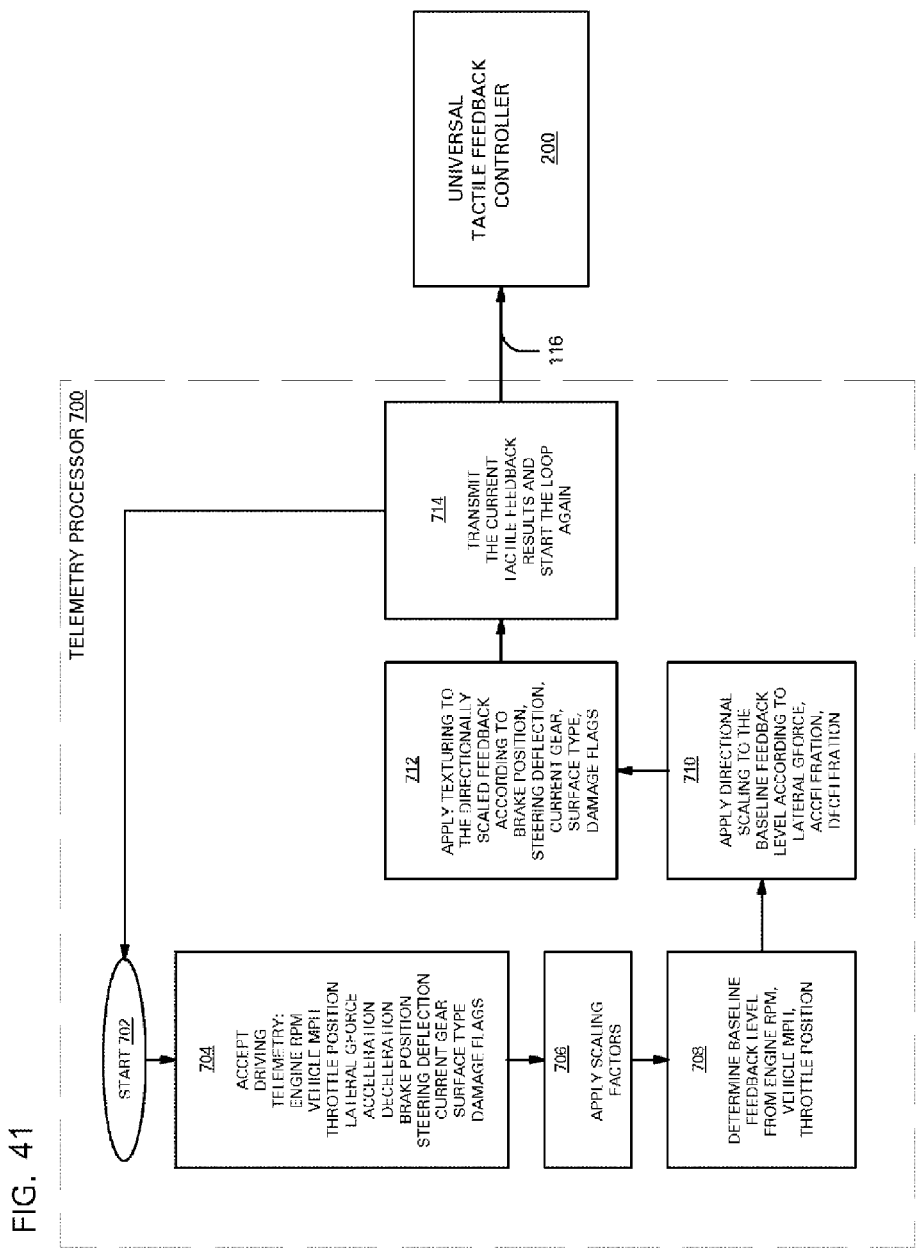
FIG. 41 is a flow chart for using illustrative application generated telemetry to generate tactile feedback for a driving simulation.

Continuing on to FIG. 41, an illustrative flow chart is shown wherein the telemetry processor 700 will process telemetry from a typical car based game or simulation. The telemetry processor 700 begins at the START 702. In step 704, the telemetry processor 700 accepts the telemetry via a shared memory mapped data structure. In the illustrative data set, the telemetry processor 700 is given the following illustrative values: the simulated car's engine RPM, vehicle MPH, throttle position, lateral g-force, forward acceleration and deceleration, the car's brake position, the car's steering wheel deflection, the current transmission gear, the surface type that the vehicle is currently on, and damage flags that might indicate various damage typical of cars, such as flat tires, body damage, engine failure, transmission failure, and the like. All of the received telemetry is in a "raw" state, that is, in a format native to the software application 104 that generated it. In step 706, scaling factors are applied to "normalize" the telemetry. For example, in one car simulation, the engine might idle at 700 RPM and might redline at 5500 RPM. However, in another car simulation, the engine might idle at 1500 RPM and redline at 9000 RPM. A specific constant RPM scaling factor might be used to always scale the RPM range for any given simulated car to a range of o to 100, and then, a baseline constant may be added, for example, 20. This would mean as long as the engine is started, the lowest scaled RPM value would be 0+20, or 20, where the highest RPM value would be 100+20, or 120. In this way, the "raw" telemetry will have been scaled into a useful range of 20 to 120. If the raw RPM value is 0, however, the baseline RPM constant +20 would be skipped, thereby leaving the RPM at O. In this way, a useful RPM value is created. Now, once the initial scaled RPM value is rendered, another scaling layer is applied from a graphical user interface 900 that is provided by the telemetry processor 700. The graphical user interface 900 allows the user to make the RPM value more or less prevalent in the tactile feedback that is perceived. Typically, the RPM scaling factor would be a floating-point decimal value from 0.00 up to 2.00, including all interim values. Let's say the user leaves the RPM scaling factor in the graphical interface 900 at 1.00. In that case, the final scaled RPM range would be 20-120, or zero if the simulated car's engine was off or disabled. If the user set the graphical RPM scaling value to 1.50, the final scaled RPM range would be 20 times 1.5, or 30, up to 120 times 1.5, or 180, giving a final range of 30 to 180. In this way, by adjusting a simple control, the original unadulterated raw RPM value as generated by the simulation is converted to a useful and desired strength. A similar process is used for all the telemetry variables, such that the relative strength of each can be tweaked to produce useful results. However, all the final results descend directly from the raw telemetry as calculated by the original software application 104 as mapped into the application generated telemetry 600 shared memory area. More detail will be examined later in this disclosure.

Continuing with FIG. 41, in step 708, we determine the baseline feedback level from the fundamental telemetry variables engine RPM, vehicle MPH, and throttle position. These are non-directionally scaled forces, which is why they together comprise what is known as the "baseline" tactile feedback level. In much the same process as above, the final scaled engine RPM value is calculated. With regard to MPH, lets assume in one game the given car has a speed range of 0 to 130 MPH, and in another game or simulation, the car has a speed range of 0 to 236 MPH. In the case where the top speed is 130 MPH, a constant scaling factor would be the current speed always divided by 1.3 (or rather multiplied by 0.769) such that the speed range was reduced to 0 to 100. Likewise, in the case where the car's top speed was 236 MPH, the constant scaling factor would be the current speed divided by 2.36 (or rather multiplied by 0.424), thereby yielding the same range 0 to 100. This makes the scaled MPH range consistent from game to game and simulation to simulation. Then, in the graphical interface 900 within the telemetry processor 700 application, a MPH scaling factor is provided where the user can increase or decrease the importance of the MPH by adjusting a multiplier with a graphical scroll bar, where the scaled MPH range now from 0 to 100 would be multiplied by any selected number 0.00 to 2.00, in the same way was the RPM was previously.

The next step is to compare the final RPM result and MPH result, and to accept the highest value as the baseline tactile feedback value for that cycle through the telemetry processor 700, which typically runs at hundreds of cycles second. This way, if you are going 0 MPH but your simulated engine has produced a final RPM vibration value of 88, you'll feel tactile feedback at a "strength" of 88. Again, this is illustrative only. Likewise, if you are traveling at a velocity of 150 MPH, and your MPH scaling factor is 0.70, but you've just blown your engine up and are at 0 (zero) engine RPM, you'll still feel 150 MPH times 0.70, for a vibration "strength" of 105. In this way, RPM and MPH are constantly fighting each other depending on which is the higher value at each and every single pass through the code in the telemetry processor 700 (which may be running at several hundred cycles per second).

Now the telemetry processor factors in the throttle position, because RPM or MPH should both feel stronger if you are full on the throttle, or not on the throttle at all. For example, if your throttle position runs from 0.00 at no throttle to 1.00 at full throttle, we may set a first scaling factor of "plus 0.60", that is, adding 0.60 to each end of the throttle range, which changes the throttle scaling factor from 0.00-1.00 to 0.60-1.60. Now, the graphical scaling factor is utilized to change that range yet again according to the user's preference. If the user sets the graphical scaling factor for the throttle to 0.82, the final throttle scaling factor becomes 0.82 times 0.60 (or 0.492) at the low end. and 0.82 times 1.60 (or 1.312) at the high end, so the final range is 0.492 to 1.312, depending on the position of the throttle.

From this very simple basis, the raw telemetry calculated by the software application 104 has produced tactile feedback that is indicative of the engine RPM, vehicle MPH, and driver's throttle position. This is the "baseline" tactile feedback. Were the application generated telemetry 600 not provided, the AudioSense® audio analysis mode of operation of the universal tactile feedback controller 200 would have provided this baseline tactile feedback level. The importance of this cannot be stressed enough, because directional scaling is completely worthless if it is not based on an effective "baseline".

Continuing on to step 710, the baseline tactile feedback values are now scaled according to the lateral gforce, acceleration, and deceleration telemetry. The unique nature of this example embodiment is that the tactile feedback seat in the parent cases has multiple zones, that is, a back zone, a left leg zone, and a right leg zone. Much like stereo speakers can create the illusion of a sound originating from any point between only two speakers by biasing the amplitude of the broadcast sound toward one speaker, and reducing it at the other, the tactile feedback seat functions in much the same way. If we are in a left turn, simple math is applied to increase the tactile feedback felt in the right leg zone, and to decrease the tactile feedback in the left leg zone. For example, if the lateral g-force is 2.3 g's, the tactile feedback for the right leg is be multiplied by 2.3, while the left leg is divided by 2.3. The scaling factors would change the numerical range of the G's to bring them into a useful range. In this way, the driver of the simulated car feels tactile cues that indicate he or she is being thrown to the outside of the turn, in direct proportion to the lateral g-forces involved. Likewise, upon acceleration, tactile feedback in the back zone is increased (e.g., multiplied by the scaled telemetry acceleration value) while tactile feedback in the legs is simultaneously reduced (e.g., divided by the scaled telemetry acceleration value), such that the illusion is provided that the driver is being thrown backward into the seat. Likewise, on deceleration, tactile feedback is increased at the legs and simultaneously reduced at the back, such that the illusion is provided that the driver is being thrown forward in the seat, as previously in direct proportion to the g-force values involved. The first layer of scaling factors work in the same way to bring the raw telemetry into a useful range, while the graphical interface is used to set the user's preference as to how strong this directional scaling is to be perceived. By changing any given scaling factor, the math that is applied to the raw scaled data is change accordingly. In this way it is very easy to dial in excellent tactile feedback, because all the calculations are based on the mathematics that are already built into the simulation due to the nature of the shared telemetry.

Continuing on to step 712, tactile feedback texturing is applied to the now directionally scaled tactile feedback values. Texturing adds choppiness and other characteristics to the tactile feedback. For example, if a "damage flag" indicates that there is a flat tire on the left side of the car, there may be a "flat tire scaling factor" provided in the graphical user interface 900 within the telemetry processor 700 that sets the flat tire scaling factor as 1.5 times (1.5×). The texturing to the left leg zone in the tactile feedback seat (the side of the vehicle with the simulated flat tire) would now be periodically multiplied by 1.5× in some time period that is directly proportional to the current MPH of the car. Again, very simple math is used to create dramatic effects, all directly descending from the raw telemetry and the same general-purpose algorithms in place for most games or simulation of the car type genre. In other tactile feedback technologies, the effects for flat tires are canned periodic cycles of bumping that has no correspondence with the speed of the given vehicle because there is no telemetry shared between the application and the tactile feedback algorithms.

In the case of the car's current gear (the vehicle's transmission) telemetry data element, simple math can yield a brief skip in the tactile feedback throughout the tactile feedback seat any time the gear changes. For example, if the gear has just changed from 2 to 3, the telemetry processor may have two factors associated with gear changes, that is, a percent reduction value, and a time value in milliseconds. If the gear change scaling factors indicate that the tactile feedback throughout the seat should be multiplied by 0.25 and that condition should last for 100 milliseconds every time a gear changes, then each gear change will cause a direct self-generating effect of a 75% reduction in perceived tactile feedback for 0.10 seconds at every gear change. For the brake pedal position telemetry data, hard braking at fast speeds can make other very brief scaling factors take effect. Surface type can layer additional scaling factors upon the baseline vibration. The end result is that the telemetry data itself carries the information about what is happening, and all perceived tactile feedback descend directly from the actual state of the simulation or game.

In step 714, we transmit the current tactile feedback results to the universal tactile feedback controller 200 with the standard intelliVIBE® protocol, but no limitation should be inferred about which types of tactile feedback devices can benefit from this telemetry based approach.

Figure 42:
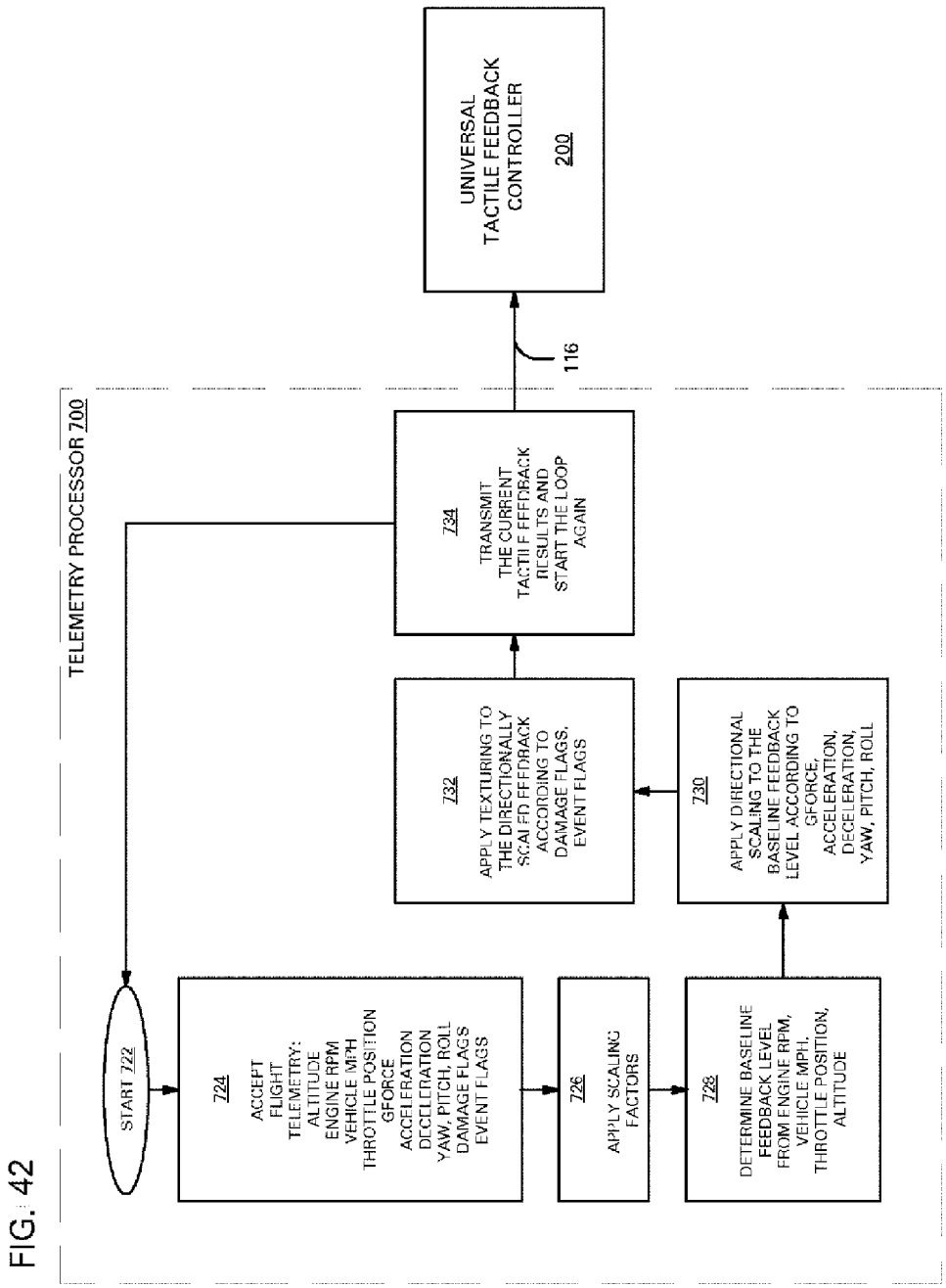
FIG. 42 is a flow chart for using illustrative application generated telemetry to generate tactile feedback for a flight simulation.

Continuing on to FIG. 42, it is nearly identical to FIG. 41, but the telemetry carries data relevant to flight simulations instead of car simulations. Steps 722, 724, 726, 728 are analogous to steps 702, 704, 706, 708 of FIG. 41. However, for step 730, we refer now to FIG. 45.

The major difference here is the way the telemetry processor handles g-forces, pitch, and roll, which are data typical of flight simulations. The innovative approach here allows new possibilities for rendering aircraft rolls, that is, when an aircraft such as a modern military jet rolls on its center axis in a continuous right or left turn. In reality, when a jet enters a continuous roll to the right, the passengers get pushed to the left side and stay there due to the g-forces involved that are stable for the duration of the rightward roll. This is calculated just like the lateral g-forces of the car of FIG. 41. However, an aircraft's roll can be divided into four quadrants, each of which affects the rendering of the roll in a different way.

Rather than a continuous push to one side, which is a realistic and readily available but perhaps a dull representation, we can artificially induce additional aircraft orientation data in the tactile feedback that is produced.

Figure 45:
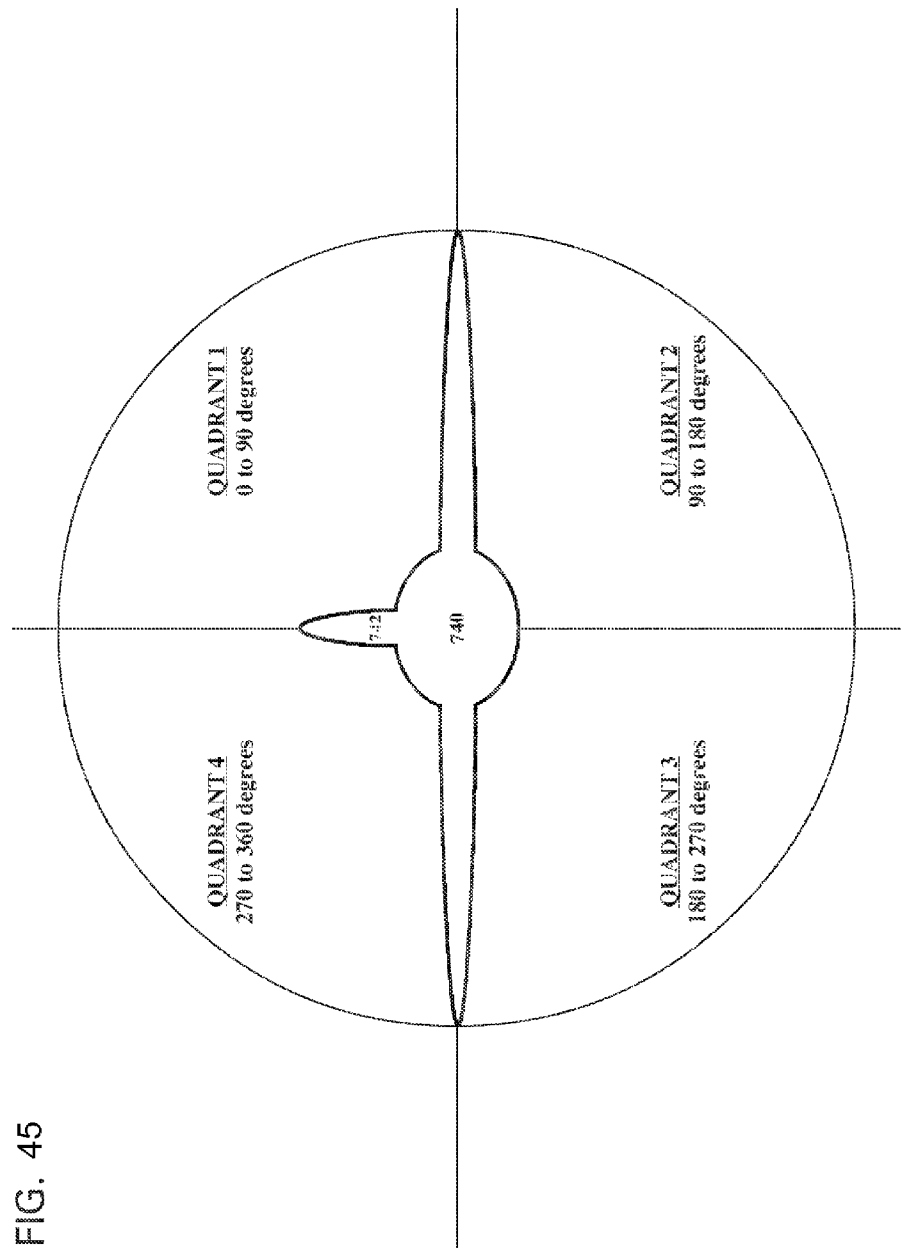
FIG. 45 depicts an aircraft and the 4 quadrants used as the basis for an innovative aircraft roll algorithm.

Referring now to FIG. 45, an aircraft 740 is depicted with its tail 742 pointing straight up, that is, the aircraft is perfectly level. The current quadrant is determined by the orientation of the aircraft's tail 742. Whichever quadrant 1, 2, 3 or 4 the aircraft's tail 742 points to, that is the quadrant the aircraft is considered to be in for the purposes of rendering the "roll" effect upon the baseline vibration. Referring now to FIG. 46, the quadrants 1, 2, 3 and 4 are analogous to the same quadrants of FIG. 45. However, FIG. 46 explains the simple algorithm by which the right leg tactile feedback value and the left leg tactile feedback value are scaled depending in which quadrant the aircraft's tail is oriented. With this simple math applied to the telemetry derived "baseline" vibration values, the user gets a excellent feel of the aircraft's orientation while interacting with any given aircraft simulation or game. With the innovative algorithm of FIG. 46, a continual roll to the right in the aircraft does not produce a static leftward bias as would be the case if driving a car, but rather, the left-right leg bias actually rolls around the seat in direct proportion to the simulated aircraft's orientation. When fully inverted, that is, upside-down, the bias disappears and the legs tactile feedback scaling is nullified. This is a completely artificial effect, having no basis in reality; however, the effect is remarkable and highly effective.

When in any vehicle, positive and negative g-forces are experienced. Some vehicles induce more positive and negative g-forces than others, but nonetheless, because of the telemetry offered by a given simulation or game, the same mathematics apply and are effective across the board. When experiencing positive g-forces, one gets the feeling of weighing more than they actually weigh, in direct proportion to the positive g-forces that are experienced. Therefore, with the telemetry based system, positive g-forces are mathematically multiplied against the leg section (both left and right legs), thereby making the user feel "heavier", while simultaneously used as a divisor to mathematically reduce the tactile feedback to the back zone. Most often the raw g-forces are scaled into the range of 1.000 to 2.000. Of course, as with all scaling factors, the users have additional scaling factors to augment of reduce the prevalence of the g-forces. Likewise, when experiencing negative g-forces, one gets the feeling of being more weightless than is normal. Therefore, when negative g-forces are present, the negative g-force value is multiplied by the back value to increase the back zone tactile feedback, while simultaneously used as a divisor to mathematically reduce the tactile feedback to the legs, making one feel like they are rising out of the tactile feedback seat.

When the roll of an aircraft is simultaneously layered with the positive and negative g-forces, one gets to experience a very tactile and informative representation of the aircraft's flight envelope. Similarly, pitch and yaw, and any and all other telemetry, can be layered into the calculations as well. The forces so calculated are not arbitrary, yet are based upon the actual math occurring in real time in the shared telemetry memory area. The only subjective element to all these forces are the user's adjustment of the graphical scaling factors in order to make any particular effect more or less prevalent in comparison to all the other forces for which telemetry data is available.

Figure 43:
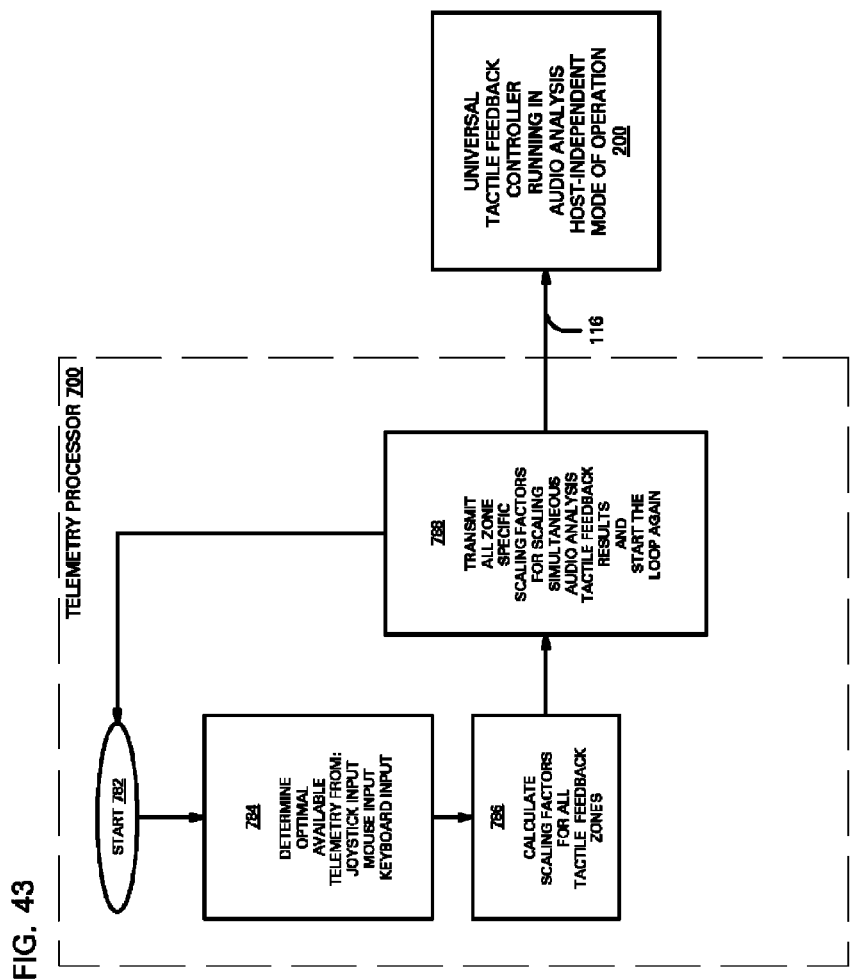
FIG. 43 is a flow chart for using illustrative self-generated telemetry to generate scaling factors for directionally scaling tactile feedback simultaneously produced via audio analysis.

Referring now to FIG. 43, the telemetry processor 700 does not have the benefit of application-generated telemetry. Therefore, the universal tactile feedback controller 200 will run in its audio analysis mode of operation (AudioSense®). When in AudioSense®, the baseline tactile feedback is produced without capabilities for directional biasing, regardless as to the forces acting on the user's vehicle or person in any particular application. Simply put, the tactile feedback system has no awareness as to the specific calculations that are necessarily taking place in any particular application. When this is the case, the telemetry processor begins in step 782 and in step 784 examines the telemetry it can derive from the host computer's 102 control input devices. If, for example, the user of a non-telemetry supportive title (I.e., no intelliVIBE® support) is running in AudioSense®, they can give specific scaling instructions to the telemetry processor 700 so that it can generate real time tactile feedback zone-specific scaling factors that will introduce real time scaling upon the AudioSense® audio analysis results. For example, if the user is playing a car racing simulation that offers no intelliVIBE® support, the telemetry processor can track the movement of the player's joystick and can know its deflection from center on both the X and Y axes, that is, left and right (steering) and forward and back (acceleration and brake) of the simulated vehicle. Certainly this is not as good as real time telemetry, but the telemetry processor 700 will do the best it can with what data it can find. In this case, the user will adjust the joystick scaling factors such that the longer the accelerator axis (presumably the Y axis, but configured as such by the user) is pressed forward, the more speed the telemetry processor will assume will have been gained by the simulated vehicle. As the simulated vehicle is assumed to be going faster, it will automatically adjust the X-axis scaling factors (the car's steering) to make the lateral g-forces more prevalent. Likewise, if the Y axis indicates that the user has stepped on the brake of the simulated vehicle, the telemetry processor will indicate this in the stream of scaling factors that are being broadcast to the universal tactile feedback controller 200 such that a deceleration effect is produced by directionally biasing the tactile feedback in the seat to the legs section of the tactile feedback seating unit, and away from the back section.

The scaling factors are calculated in real time based upon assumed data, so they do not have the finesse of real-time accurate telemetry that would ideally be available. The scaling factors are 8 bit values, (0-255), wherein whatever value given as a scaling factor is divided by 32 within the universal tactile feedback controller 200. The scaling factors exist in a data table, where each single scaling factor is applied to only one of eight zones: back, left leg, right leg, chest, left hand, right hand, left foot, right foot. These zones are illustrative and not assumed to match this example embodiment. Sending a scaling factor of 32 yields no change to a particular tactile feedback zone because of the subsequent divide by 32 that occurs within the universal tactile feedback controller 200 (e.g., 32 divided by 32 equals 1.0). However, a scaling factor of 16 sent to the left leg will cut the tactile feedback there in half, because 16/32 yields a scaling factor of 0.5×. The divide by 32 algorithm is used to yield very fast mathematical performance by using a shortcut rather than full floating point math which would impede the performance of AudioSense® if the microcontroller inside the universal tactile feedback controller 200 does not offer full hardware multiply and divide.

By monitoring the joystick input over time, fairly accurate assumptions can be made about a particular game or simulation, but this requires more complicated help by way of predetermined application-specific telemetry processor 700 configuration files. For example, in the real F16 Falcon military aircraft, the main cannon only has capacity enough for approximately 2.3 seconds of trigger time before it runs out of 30 mm cannon shells. Therefore, the telemetry processor 700 for an accurate F 16 simulation with limited ammunition can assume from its configuration data that the main joystick trigger (or some corresponding keyboard key) fires the main cannon. Without proper telemetry being given, the telemetry processor will keep track of the time the cannon trigger is active. During the presumed activation of the cannon, an effect will be rendered according to the scaling parameters in effect for the cannon. After approximately 2.3 seconds of trigger time, the intelliVIBE® cannon effect will be disabled until reset by the user. However, AudioSense® will still do its best to render the cannon by interpreting the sound of it firing if the cannon is not yet depleted of ammunition. Additionally, if the throttle has been active and at a high power, and the joystick has tended to be pulled back, the telemetry processor can assume that the aircraft is airborne, and can then do its best to use the joystick position to send scaling factors to the left leg, right leg, and back zones of the tactile feedback seat in order to simulate the G-forces and bank roll effects that would ideally be more accurately prompted by fully supported telemetry. Even with the slightly less than-ideal implementation of AudioSense® audio analysis and assumed game state data by way of brute force self-generated telemetry via game-specific control input analysis, the combination of cooperative AudioSense® with intelliVIBE® scaling is a very effective means of self-generating very appropriate tactile feedback, regardless of the lack of support by any given application.

Figure 44:
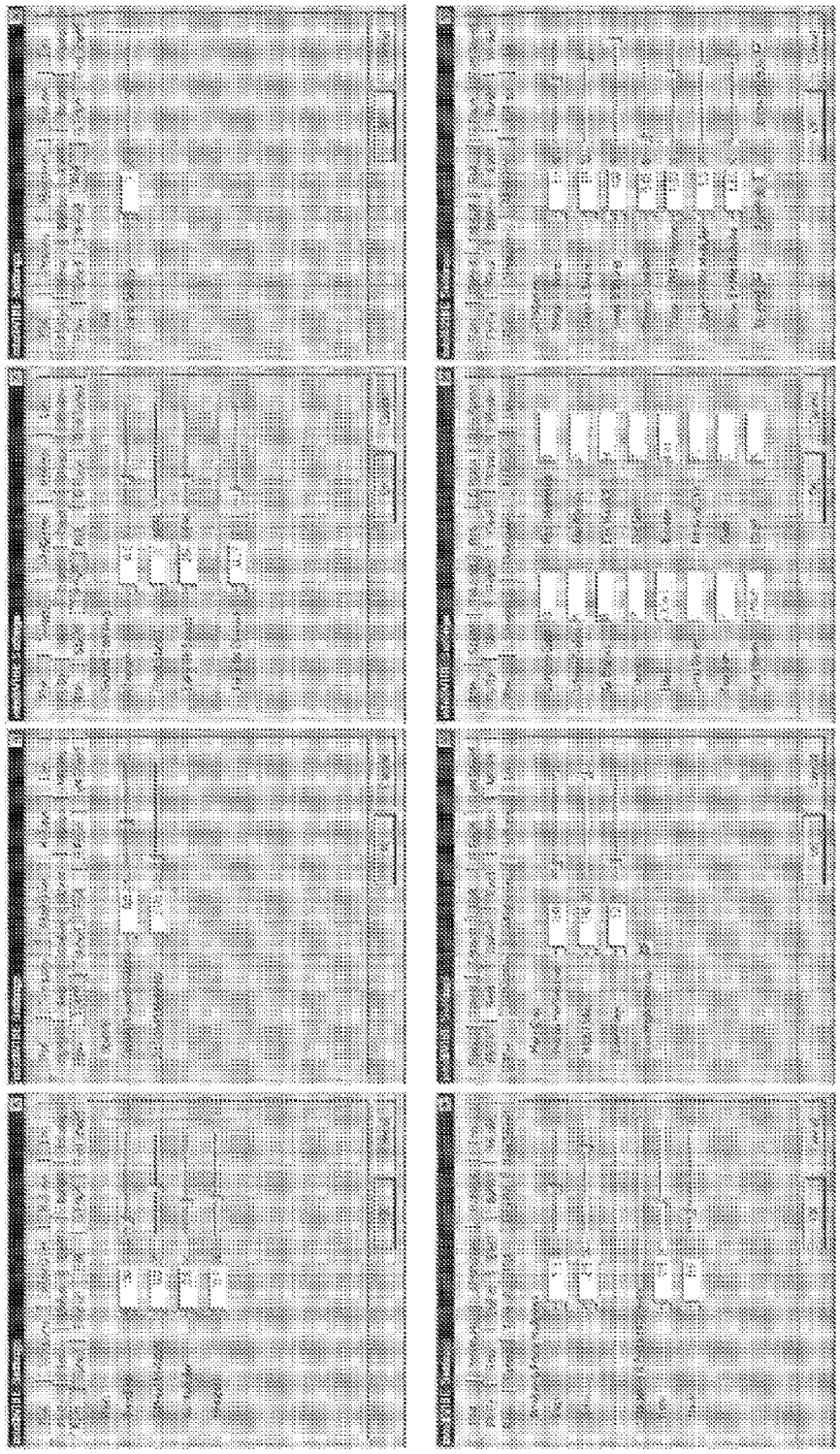
FIG. 44 shows an illustrative group of graphical controls for adjusting various telemetry scaling factors.

Referring now to FIG. 44, a group of user adjustable telemetry scaling factors is presented. These controls are illustrative only for the purposes of understanding. Getting a closer look at FIG. 44A, the RPM baseline tactile feedback generator is presented. The baseline setting of 30 establishes the basic level of prevalence of engine RPM induced tactile feedback. The multiplier at the bottom shows 0.7, which is used to scale the 30 baseline setting. If the aircraft is known to be on the ground, the engine RPM setting is multiplied by 0.9, whereas if the aircraft is in the air, the engine RPM is multiplied by 0.6, thereby making the engine RPM feel weaker once in the air.

Figure 44B:
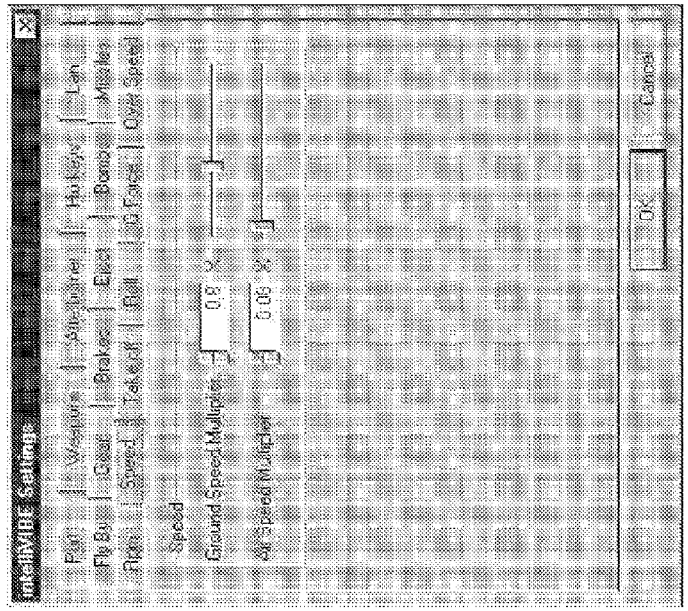
FIG. 44B depicts the graphical controls of FIG. 44, specifically illustrative SPEED telemetry scaling factors.
Figure 44A:
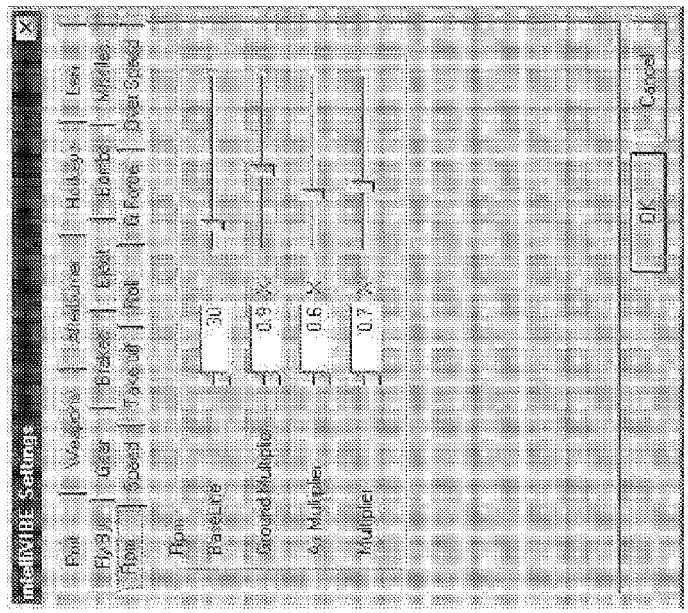
FIG. 44A depicts the graphical controls of FIG. 44, specifically illustrative RPM telemetry scaling factors.

Referring now to FIG. 44B, the speed value is multiplied by 0.8 if the aircraft is on the ground, while it is multiplied by 0.08 if the aircraft is in the air. This has the effect of making the speed tactile effect ten times weaker when the aircraft is airborne, but the typical maximum speed when on the ground might be only 180 MPH, but when airborne, a modern military aircraft can travel at 1,300 MPH and higher. These scaling factors allow the tactile feedback to be matched to a useful range regardless as to the performance envelope of any particular aircraft, simply by adjusting the slider knob of the corresponding scaling factor control.

Figure 44D:
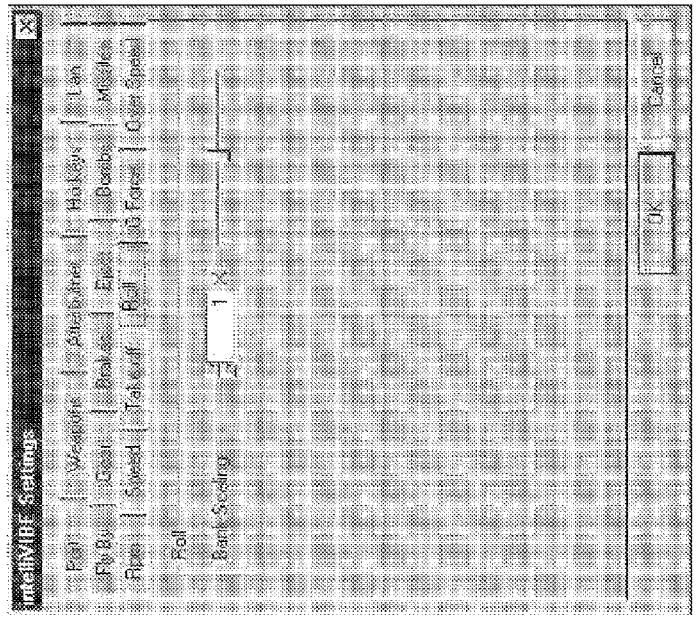
FIG. 44D depicts the graphical controls of FIG. 44, specifically illustrative ROLL telemetry scaling factors.
Figure 44C:
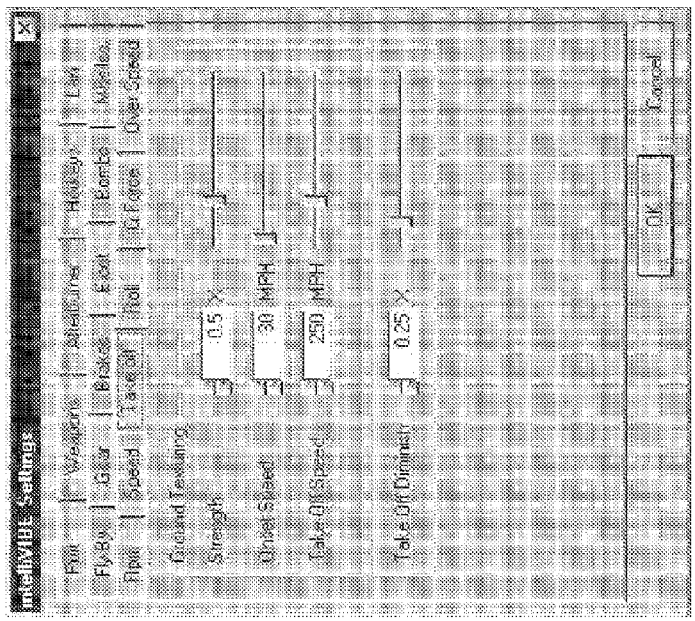
FIG. 44C depicts the graphical controls of FIG. 44, specifically illustrative TAKE OFF telemetry scaling factors.

Looking now at FIG. 44C, we have a compound effect called ground texturing. Ground texturing is set to begin at 30 MPH and end at 250 MPH, which is well past a conservative take-off speed. Ultimately as the aircraft goes faster, the ground will create more and more texturing, that is, bumpiness in the tactile feedback. Upon takeoff, the ground texturing will be reduced to 25% (multiplied by 0.25×) until the take off speed is surpassed, which then nullifies the ground texturing, until the aircraft comes in for a landing, at which time the ground texturing will automatically take effect yet again.

FIG. 44D presents the bank scaling value. The 1.0 as shown lets the bank scaling take place just as the calculations in FIG. 46 indicate. However, if the user wants the bank scaling to be stronger, they only need to increase the corresponding 1.0 scale factor setting. To reduce bank scaling, setting bank scaling to toward 0 will nullity the effect accordingly.

Figure 44F:
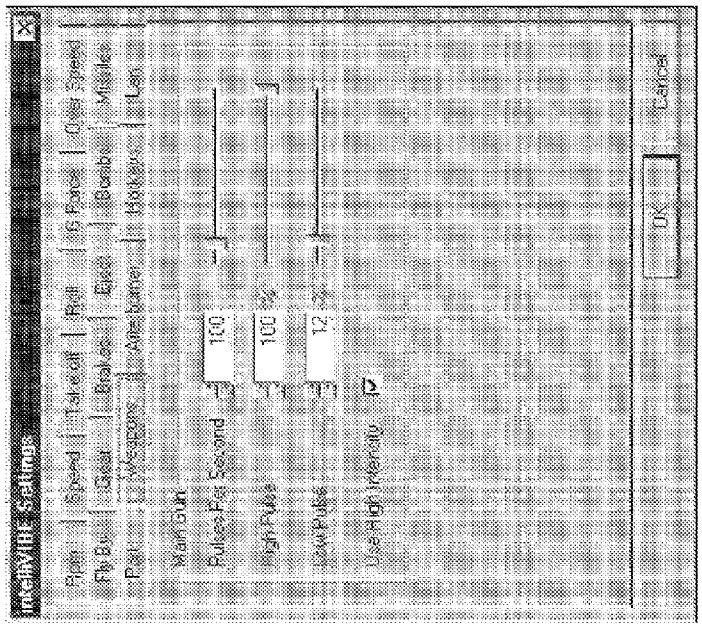
FIG. 44F depicts the graphical controls of FIG. 44, specifically illustrative WEAPONS telemetry scaling factors.
Figure 44E:
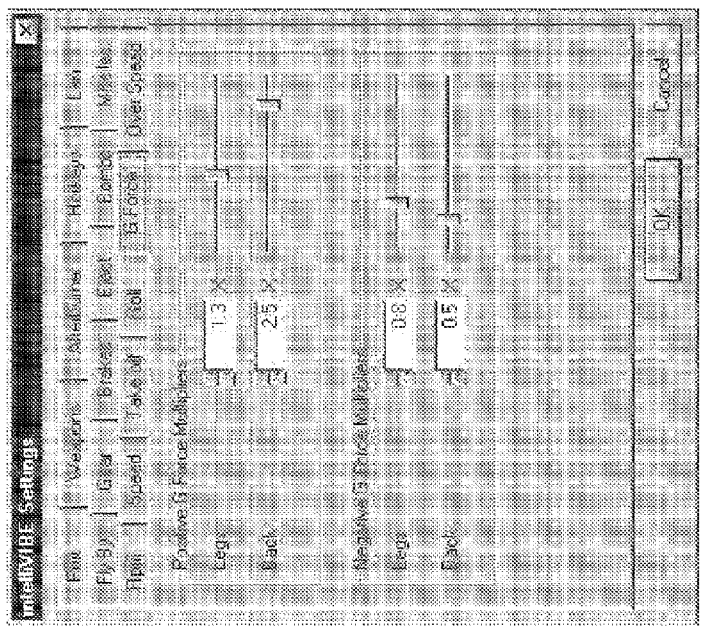
FIG. 44E depicts the graphical controls of FIG. 44, specifically illustrative G-FORCE telemetry scaling factors.

FIG. 44E presents the positive and negative G-force multipliers. In positive g-force conditions, these settings multiply the legs by 1.3 times the g-force value, and multiply the back by 2.5 times the g-force value. In negative G-force conditions, the back is reduced by half and the legs are scaled to 80% for the duration of the negative G-force condition.

In FIG. 44F, the scaling factors for the main gun are available. During the firing of the main gun, 100 pulses per second will occur in the tactile feedback, alternating between a high pulse percentage of 100% and a low pulse percentage of 12% as determined by the scaling factors. The "use high intensity" check box allows the main gun to temporarily over-ride the current intensity setting for the duration of the main gun being fired. Knowing that the main gun is being fired can be given to us by application generated telemetry 600 or self-generated telemetry 800, same as with all the effects and scaling factors of FIG. 44A through FIG. 44H.

Figure 44H:
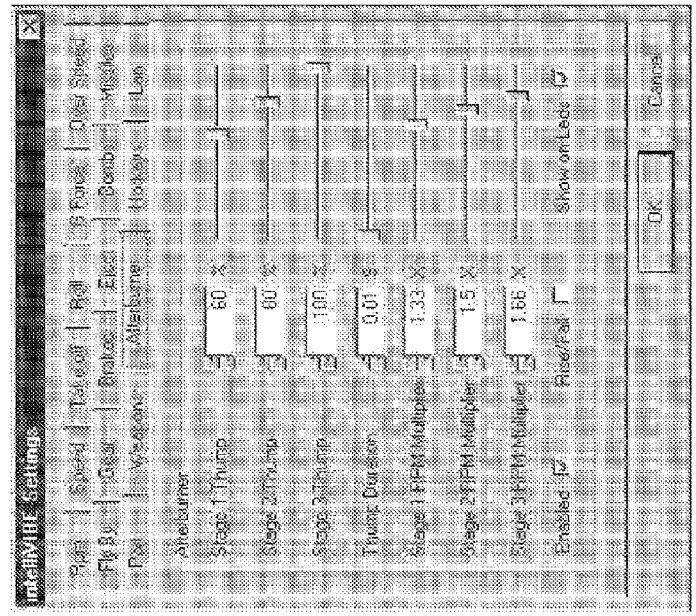
FIG. 44H depicts the graphical controls of FIG. 44, specifically illustrative AFTERBURNER telemetry scaling factors.
Figure 44G:
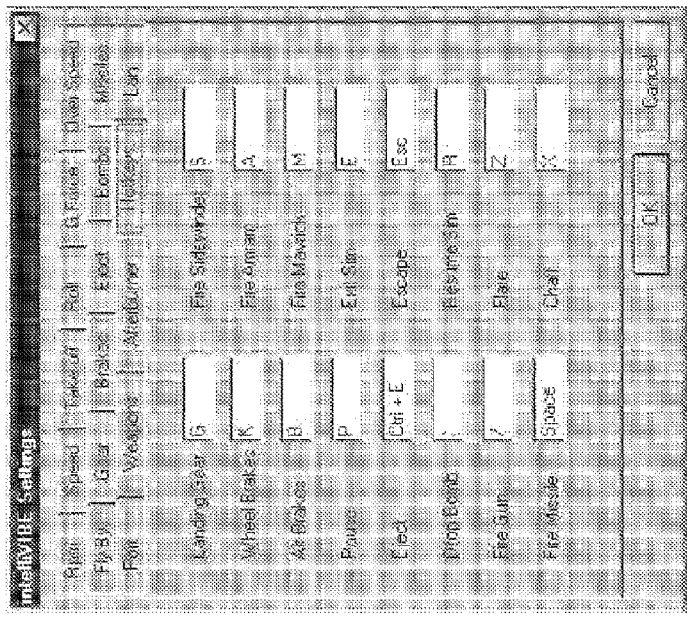
FIG. 44G depicts the graphical controls of FIG. 44, specifically illustrative HOTKEYS telemetry scaling factors.

In FIG. 44G, the telemetry processor 700 is told what key press equals what known effect. This is configured by the user. For example, we can see in the upper left corner that the "G" key activates the landing gear. This way, if the user presses the G key to deploy the landing gear, the telemetry processor can run a simple effect representing the landing gear. If telemetry is not provided that indicates the true state of the landing gear, the telemetry processor 700 will fall back on its self-generating capability and keep track of the G key presses on its own and will do its best to stay in sync with the simulation in question.

In FIG. 44H, an illustrative afterburner effect is shown. Many modern jets have multiple stages of afterburner. In FIG. 44H, there are 3 stages of afterburner, where stages one, two, and three yield tactile "thumps" at 60%, 80%, and 100% strength, respectively, each lasting only 0.01 seconds, but also incorporating an RPM scaling factor of 1.33×, 1.5×, or 1.66× respectively, which will increase the prevalence of the engine RPM according to what level of afterburner the aircraft is in, for as long as the afterburner is active.

Ultimately, the innovative example methods and embodiments allow for the most versatile tactile feedback results to be produced, both with and without support of any kind by the host computer 102 and the executing software application 104. The best condition is for fully detailed low-burden telemetry to be provided for the benefit of the universal tactile feedback controller 200 by a given developer. However, in the absence of given telemetry via a shared data structure by standard windows memory mapping, the telemetry processor 700 is able to generate data on its own to supplement the AudioSense® audio analysis mode of operation with real time directional biasing of all tactile feedback, in the end producing effective zero-burden feedback from the point of the game developer... in the end eliminating the fundamental problem of lack of quality developer support.

Although various embodiments have been shown and described in detail herein, those skilled in the art can readily devise many other varied embodiments that still incorporate these teachings and/or other. Accordingly, the described embodiments are to be considered in all respects only as illustrative and not restrictive. Therefore, it is to be understood that nothing shall be construed as an absolute limitation of the present invention, other than the subject matter recited in the appended claims.

What is claimed is:

1. An apparatus for providing vibratory tactile sensations to a user, the apparatus comprising:
    a hand-held game pad controller configured to be held by both of a user's hands simultaneously, wherein the controller includes,
        a first motor and a second motor, wherein,
            each of the first and the second motor includes a mass secured to only a shaft,
            the mass and shaft move relative to the controller only via rotation, such that when the shaft rotates vibrations are generated via the rotation of the attached mass, and
            the vibrations are transmitted to both hands of the user holding the controller,
        control circuitry coupled to and controlling the first and the second motors independently, wherein,
            the control circuitry controls the motors in response to control signals received from a computer,
            the control signals include instructions for vibrating the controller and are not audio signals, and the control circuitry is configured to control the first and the second motors to each have a speed of rotation changeable in real time such that the first and the second motors generate vibrations simultaneously with independent intensities, and a battery for powering the first and the second motor, wherein the first and the second motor are remote from the computer and operable without electrical connection to the computer.

2. The apparatus of claim 1, wherein the control signals are received through at least one of bi-directional communications, uni-directional communications, wireless communications, and wired communications.

3. The apparatus of claim 1, wherein the first and the second motor are different from each other in at least one size, shape, power rating, vibration type, and location within the hand-held game pad.

4. The apparatus of claim 1, wherein the first motor is in a left hand side of the hand-held game controller, and wherein the second motor is in a right hand side of the hand-held game controller.

5. The apparatus of claim 1, wherein each of the first and the second motors are configured to operate differently in at least one of vibration duration, vibration speed, vibration intensity, vibration duty cycles, power output, activation by pulse-width modulation, activation by varying electric current, and activation with varying electric voltage.

6. The apparatus of claim 1, wherein the first and the second motors are attached to the hand-held game pad controller by at least one of fasteners, adhesive, press fitting, snap fitting, and friction fitting.

7. The apparatus of claim 1, further comprising:
the computer.

8. The apparatus of claim 7, wherein the computer is a video game console.

9. An apparatus for providing vibratory tactile sensations to a user, the apparatus comprising:
a processor-based computer, wherein the computer includes,
a connector configured to connect to a hand-held game pad controller held by both of a user's hands simultaneously, wherein the hand-held game pad controller includes control circuitry and two motors configured to generate vibration in the controller independent of one another simultaneously with independent intensities, and
a signal generator configured to generate and transmit control signals and configuration data to the hand-held game pad controller, wherein the control signals include instructions for vibrating the controller through independent operation of each of the two motors and the control signals are not audio signals.

10. The apparatus of claim 9, wherein the computer is a video game console.

11. The apparatus of claim 9, wherein the computer is configured to transmit the control signals through at least one of bi-directional communications, uni-directional communications, wireless communications, and wired communications.

12. The apparatus of claim 9, wherein the control signals include instructions for each of the two motors to operate differently in at least one of vibration duration, vibration speed, vibration intensity, vibration duty cycles, and power output.

13. The apparatus of claim 9, further comprising:
the hand-held game pad controller.

14. A method for providing vibratory tactile sensations to a computer user, the method comprising:
generating, with a computer, control signals corresponding to a video game being executed on the computer;
transmitting, from the computer to a hand-held game pad controller, the control signals, wherein the hand-held game pad controller is held by both of the user's hands simultaneously, and wherein the hand-held game pad controller includes control circuitry, two motors configured to generate vibration in the hand-held game pad controller independent of one another, and a battery for powering the first and the second motor remote from the computer and without electrical connection to the computer; and
vibrating the hand-held game pad controller based on the control signals, wherein the vibrating includes independently operating the two motors to generate vibrations simultaneously with independent intensities.

15. The apparatus of claim 1, wherein the hand-held game pad controller is configured to connect to the computer through a wireless connection.

16. The apparatus of claim 1, wherein the control circuitry is configured to exchange configuration data with the computer.

17. The apparatus of claim 16, wherein the control circuitry is configured to transmit configuration data to the computer, and wherein the configuration data includes at least one of status data, verification data, and operating data.

18. The apparatus of claim 9, wherein the connector includes a wireless connection with the hand-held game pad controller.

19. The apparatus of claim 9, wherein the configuration data includes parameters for processing of the control signals.

20. The apparatus of claim 9, wherein the computer is configured to receive at least one of status data, verification data, and operating data from the control circuitry.

* * * * *